(12) United States Patent
Lauer et al.

(10) Patent No.: US 10,657,636 B1
(45) Date of Patent: May 19, 2020

(54) METHODS AND SYSTEMS TO ENSURE CORRECT PRINTING PLATE USAGE FOR ENCODED SIGNALS

(71) Applicant: Digimarc Corporation, Beaverton, OR (US)

(72) Inventors: Stephen A. Lauer, Hillsboro, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 142 days.

(21) Appl. No.: 15/786,374

(22) Filed: Oct. 17, 2017

Related U.S. Application Data

(63) Continuation-in-part of application No. 15/597,086, filed on May 16, 2017, now Pat. No. 10,460,161.

(Continued)

(51) Int. Cl.
  *G06T 7/00* (2017.01)
  *H04N 1/32* (2006.01)
  *G06K 19/06* (2006.01)
  *G06T 7/90* (2017.01)
  *G06K 7/14* (2006.01)
  (Continued)

(52) U.S. Cl.
  CPC .............. *G06T 7/0004* (2013.01); *G01J 3/50* (2013.01); *G06K 7/12* (2013.01); *G06K 7/1456* (2013.01); *G06K 19/0614* (2013.01); *G06K 19/06028* (2013.01); *G06T 7/90* (2017.01);
  (Continued)

(58) Field of Classification Search
  None
  See application file for complete search history.

(56) References Cited

U.S. PATENT DOCUMENTS

| 5,138,667 A | 8/1992 | Roch |
| 5,388,517 A | 2/1995 | Levien |

(Continued)

OTHER PUBLICATIONS

Printing registration, Wikipedia, Internet Archive«Jun. 12, 2015, https://web.archive.org/web/20150612210147/https://en.wikipedia.org/wiki/Printing registration>.

(Continued)

*Primary Examiner* — Nancy Bitar
(74) *Attorney, Agent, or Firm* — Digimarc Corporation

(57) ABSTRACT

Substrates and technology for detecting printing plate misuse or mismatch. Such misuse or mismatch may result in multiple, different encoded signal being erroneously included in packaging. One claim generally recites a substrate for a package, hang tag or label, the substrate including: barcode including check digit; printed control icon, the printed control icon comprising a design printed with each of four (4) ink separations, the design comprising plurality of design elements, the plurality of design elements comprising a central element, rotation indicator corresponding to the check digit, and a plurality of registration indicators, the four (4) ink separations comprising Cyan (C) color channel, Magenta (M) color channel, Yellow (Y) color channel and Black (K) color channel; in which the printed control icon indicates a printing plate mismatch when it comprises more than one (1) observable rotation indicator. Of course, other features, claims and combinations are described as well.

21 Claims, 36 Drawing Sheets
(28 of 36 Drawing Sheet(s) Filed in Color)

Related U.S. Application Data

(60) Provisional application No. 62/569,398, filed on Oct. 6, 2017, provisional application No. 62/559,334, filed on Sep. 15, 2017, provisional application No. 62/476,646, filed on Mar. 24, 2017, provisional application No. 62/476,646, filed on Mar. 24, 2017.

(51) Int. Cl.
*G06K 7/12* (2006.01)
*G01J 3/50* (2006.01)

(52) U.S. Cl.
CPC ............. *H04N 1/32309* (2013.01); *G06T 2207/10024* (2013.01); *G06T 2207/30168* (2013.01)

(56) References Cited

U.S. PATENT DOCUMENTS

| | | | |
|---|---|---|---|
| 6,031,932 | A | 2/2000 | Bronstein |
| 6,591,746 | B2 | 7/2003 | Siler |
| 6,633,382 | B2 | 10/2003 | Hubble |
| 7,584,700 | B2 | 9/2009 | Kot |
| 8,332,176 | B2 | 12/2012 | Custode |
| 8,514,470 | B2 | 8/2013 | Elliot |
| 9,068,932 | B2 | 6/2015 | Kimura |
| 9,194,746 | B1 | 11/2015 | Reda |
| 9,245,308 | B2 | 1/2016 | Reed |
| 9,380,186 | B2 | 6/2016 | Reed |
| 9,565,335 | B2 | 2/2017 | Reed |
| 9,593,982 | B2 * | 3/2017 | Rhoads ................. G01J 3/513 |
| 9,690,967 | B1 | 6/2017 | Brundage |
| 10,198,782 | B1 * | 2/2019 | Bradley ............... G06T 1/0064 |
| 10,255,649 | B2 * | 4/2019 | Falkenstern .......... G06T 1/0021 |
| 10,460,161 | B1 * | 10/2019 | Lauer ................. G06K 9/00429 |
| 2006/0078167 | A1 * | 4/2006 | Heikkila ............. B41F 33/0045 382/112 |
| 2006/0170996 | A1 | 8/2006 | Headley |
| 2012/0078989 | A1 * | 3/2012 | Sharma ................. G06T 1/0064 708/401 |
| 2014/0027516 | A1 * | 1/2014 | Fushiki .............. G06K 19/0614 235/462.04 |
| 2015/0030201 | A1 * | 1/2015 | Holub ..................... G06K 9/66 382/100 |
| 2015/0156369 | A1 | 6/2015 | Reed |
| 2016/0105585 | A1 | 4/2016 | Holub |
| 2016/0198064 | A1 * | 7/2016 | Bai .......................... H04N 1/54 382/100 |
| 2016/0217547 | A1 | 7/2016 | Stach |
| 2017/0024840 | A1 | 1/2017 | Holub |
| 2017/0048423 | A1 * | 2/2017 | Itagaki ............... H04N 1/00034 |
| 2017/0206040 | A1 * | 7/2017 | Gaash ................... G06F 3/1204 |
| 2017/0230533 | A1 * | 8/2017 | Holub ................ H04N 1/32229 |
| 2018/0352111 | A1 * | 12/2018 | Bai .................... H04N 1/32251 |

OTHER PUBLICATIONS

Anthongy Allen, "Crop Marks and Registration Marks—A Printer's Tool, " posted online on Oct. 2, 2015, https://www.boxcarpress.com/blog/crop-marks-and-registration-marks-a-printers-tool/.
U.S. Appl. No. 15/261,005, filed Sep. 9, 2017.
U.S. Appl. No. 15/597,086, filed May 16, 2017.
U.S. Appl. No. 151713,367, filed Sep. 22, 2017.
U.S. Appl. No. 62/476,646, filed Mar. 24, 2017.
U.S. Appl. No. 62/559,334, filed Sep. 15, 2017.
Jun. 10, 2019 Office Action from CIP parent U.S. Appl. No. 15/597,086, including its subject claims. 18 pages.
Aug. 15, 2019 Respons to Rule 312 Communication (entered); Jul. 18, 2019 Amendment After Allowance; Jul. 15, 2019 Notice of Allowance; and Jul. 17, 2019 Amendment; all fromCIP parent U.S. Appl. No. 15/597,086.

* cited by examiner

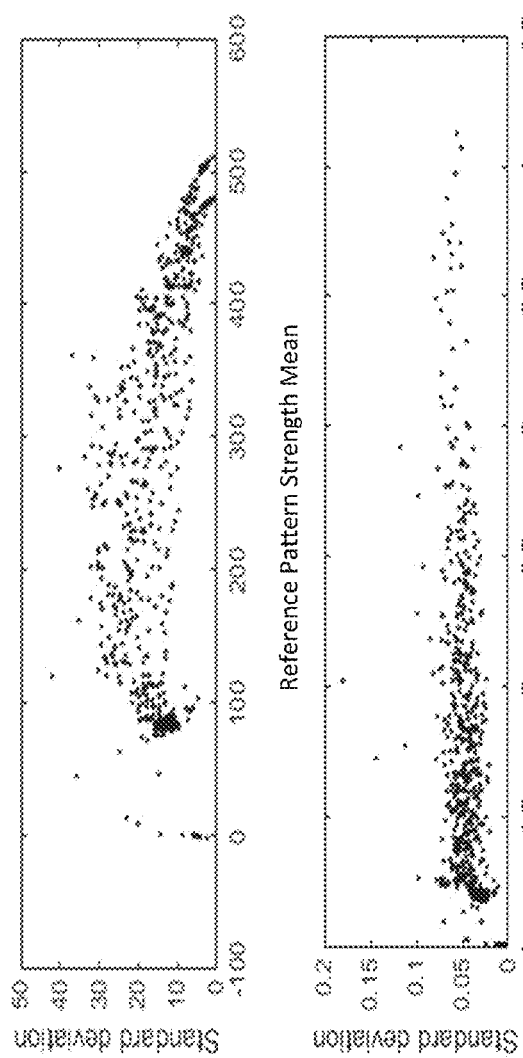
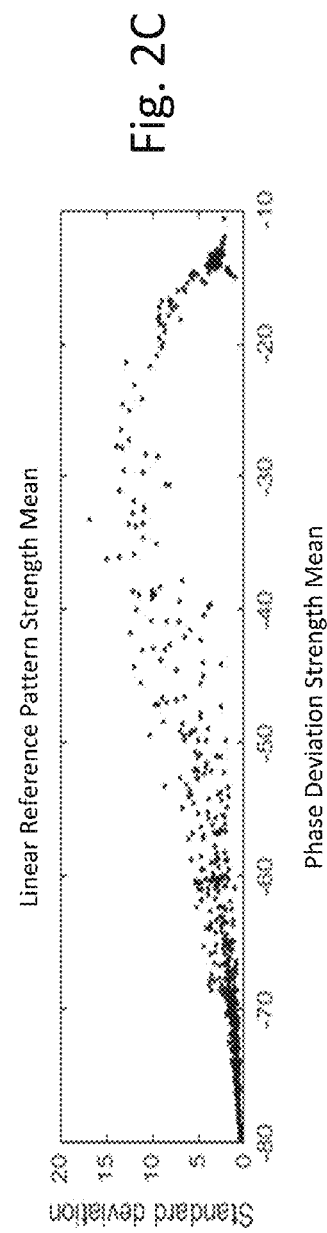
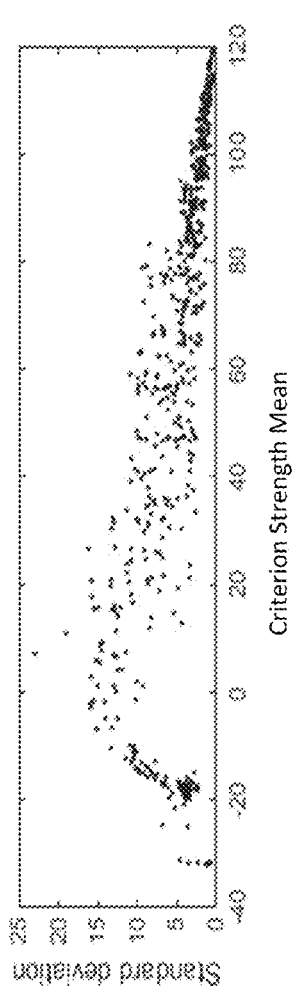
Fig. 2A
Fig. 2B
Fig. 2C
Fig. 2D

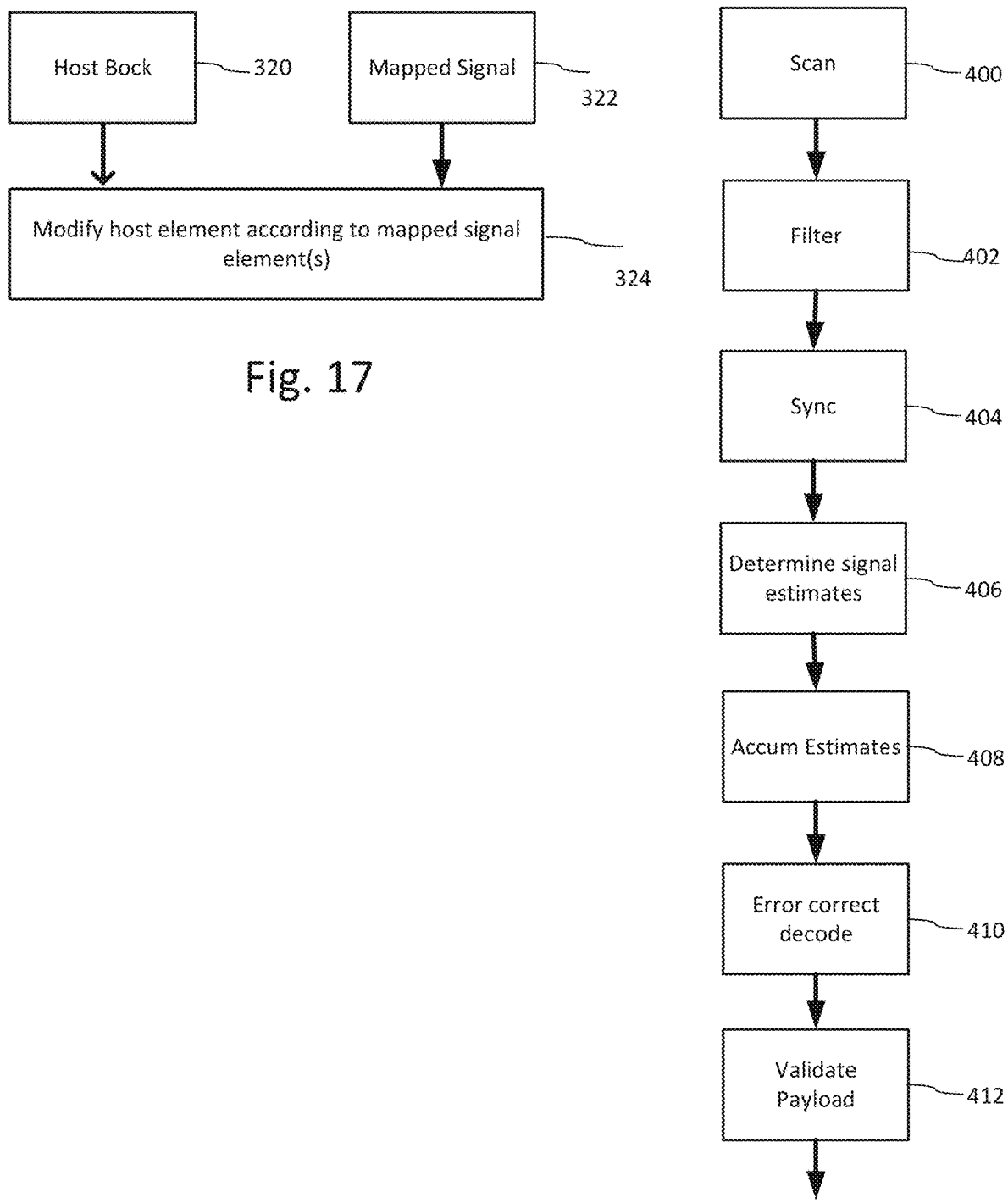

| ES1 | ES1 | ES1 | ES1 | ES1 |
|---|---|---|---|---|
| ES1 | ES1 | 8 | ES1 | ES1 |
| ES1 | ES1 | ES1 | ES1 14 | ES1 |
| ES1 | 17 | ES1 | 19 | ES1 |
| ES1 | ES1 | ES1 | ES1 | ES1 |

Fig. 19C

| ES1 | ES1 | ES1 | ES1 | ES1 |
|---|---|---|---|---|
| ES1 | ES1 | 8 | ES1 | ES1 |
| ES1 | ES1 | ES1 | ES2 14 | ES1 |
| ES1 | 17 | ES1 | ES2 19 | ES1 |
| ES1 | ES1 | ES1 | ES1 | ES1 |

Fig. 19D

| ES1 | ES1 | ES1 | ES1 | ES1 |
|-----|-----|-----|-----|-----|
| ES1 | ES1 | 8   | ES1 | ES1 |
| ES1 | ES1 | ES1 | ES2 (ES1) ⟵14 | ES1 |
| ES1 | 17  | ES1 | ES2 ⟵19 | ES1 |
| ES1 | ES1 | ES1 | ES1 | ES1 |

= ES1

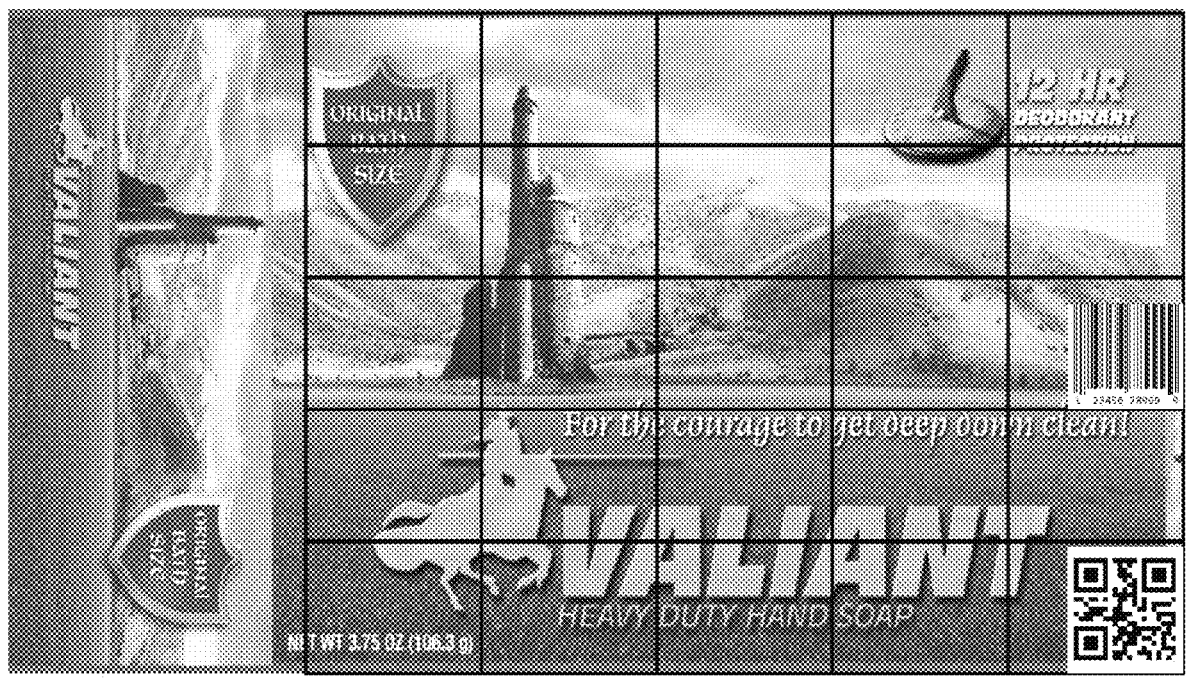
Fig. 20A
Fig. 20B
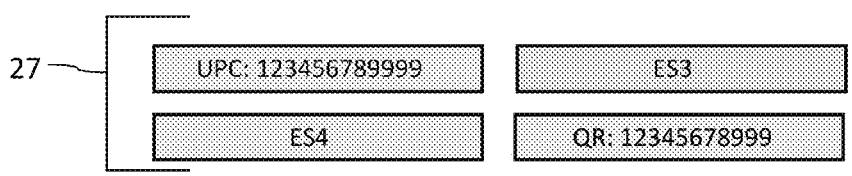

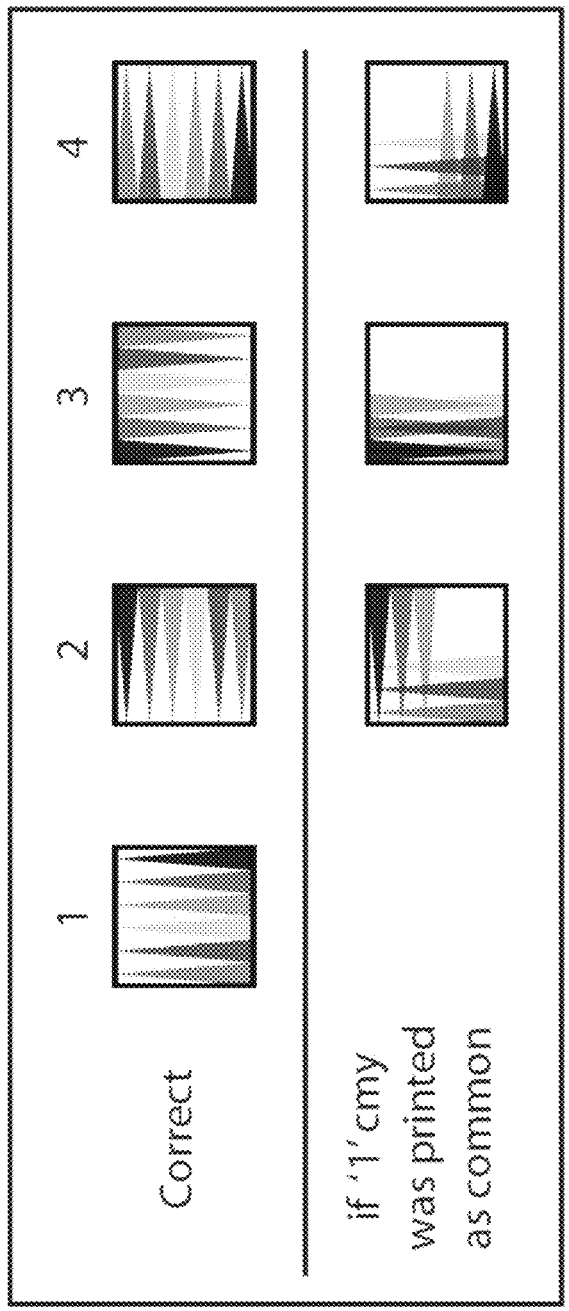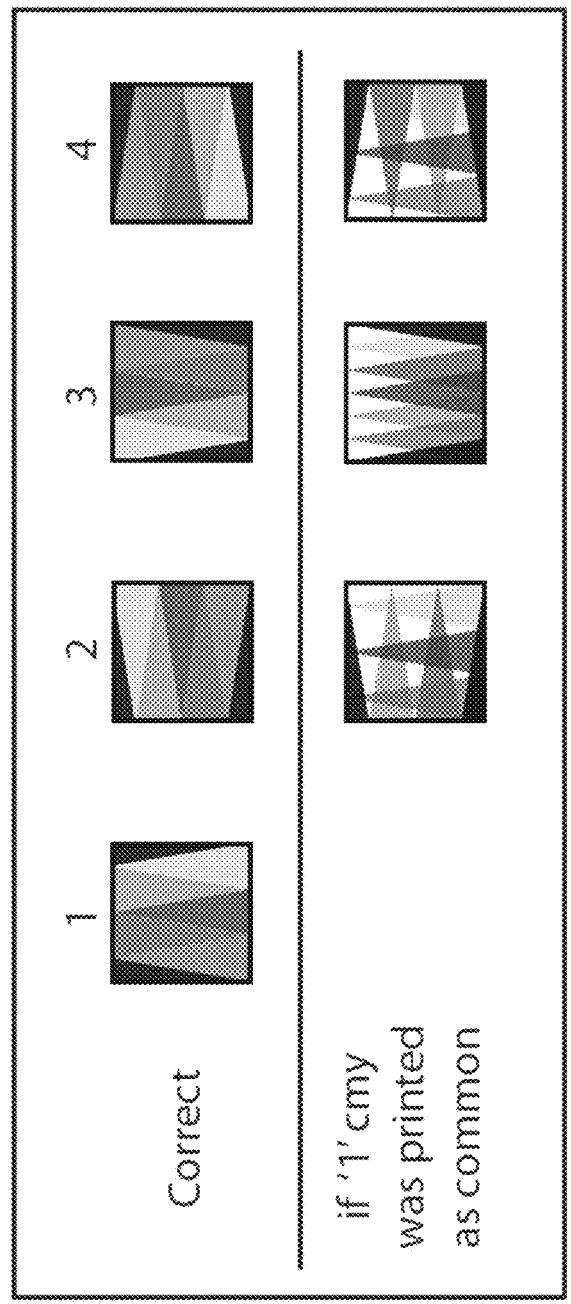

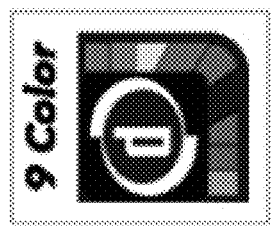
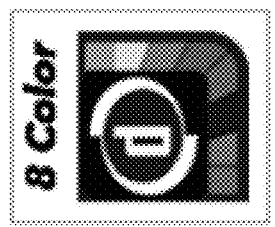
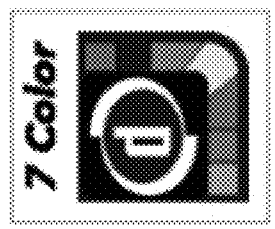
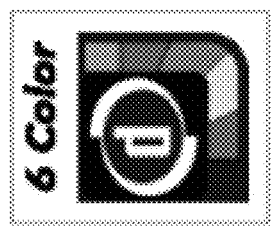
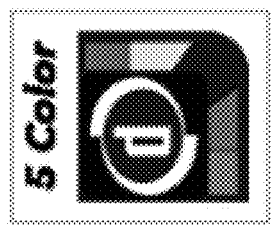
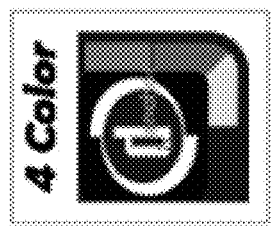
Fig. 24
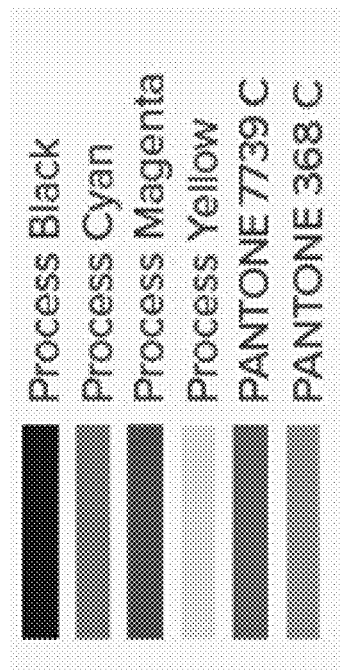
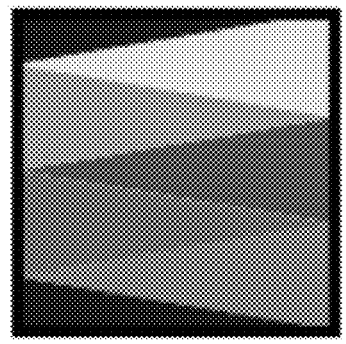
Fig. 26F

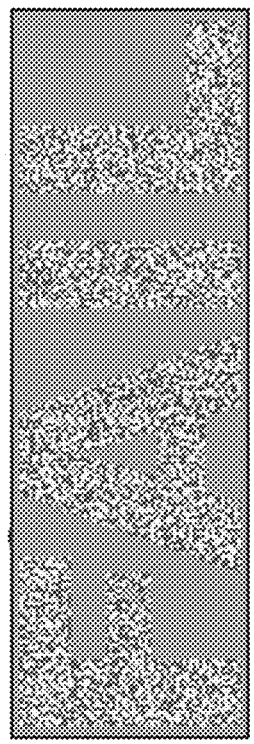
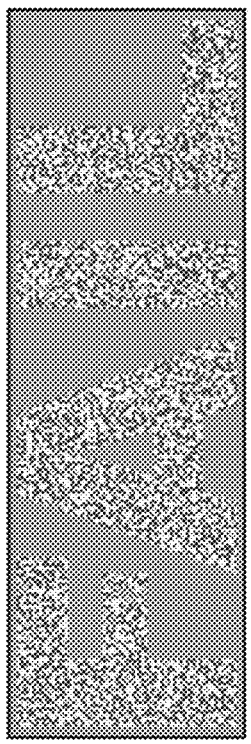
Fig. 25A
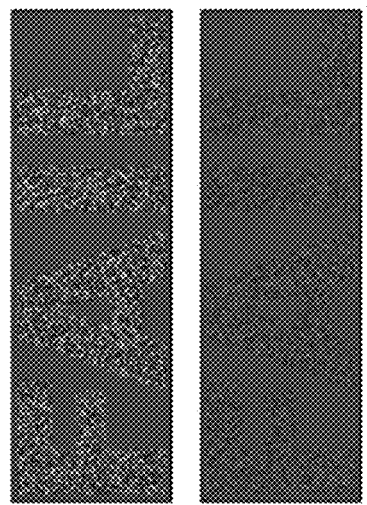
Fig. 25B

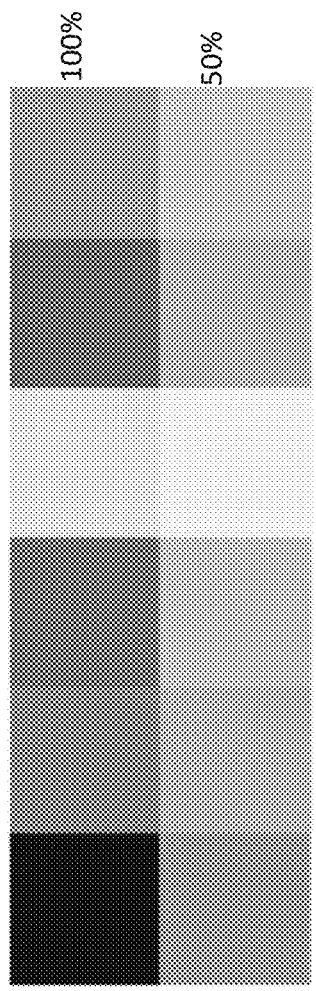
Fig. 26A (Pass)
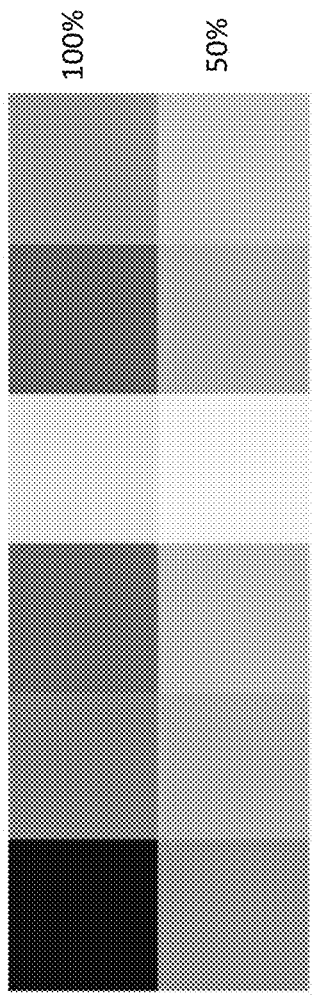
Fig. 26C (Fail)

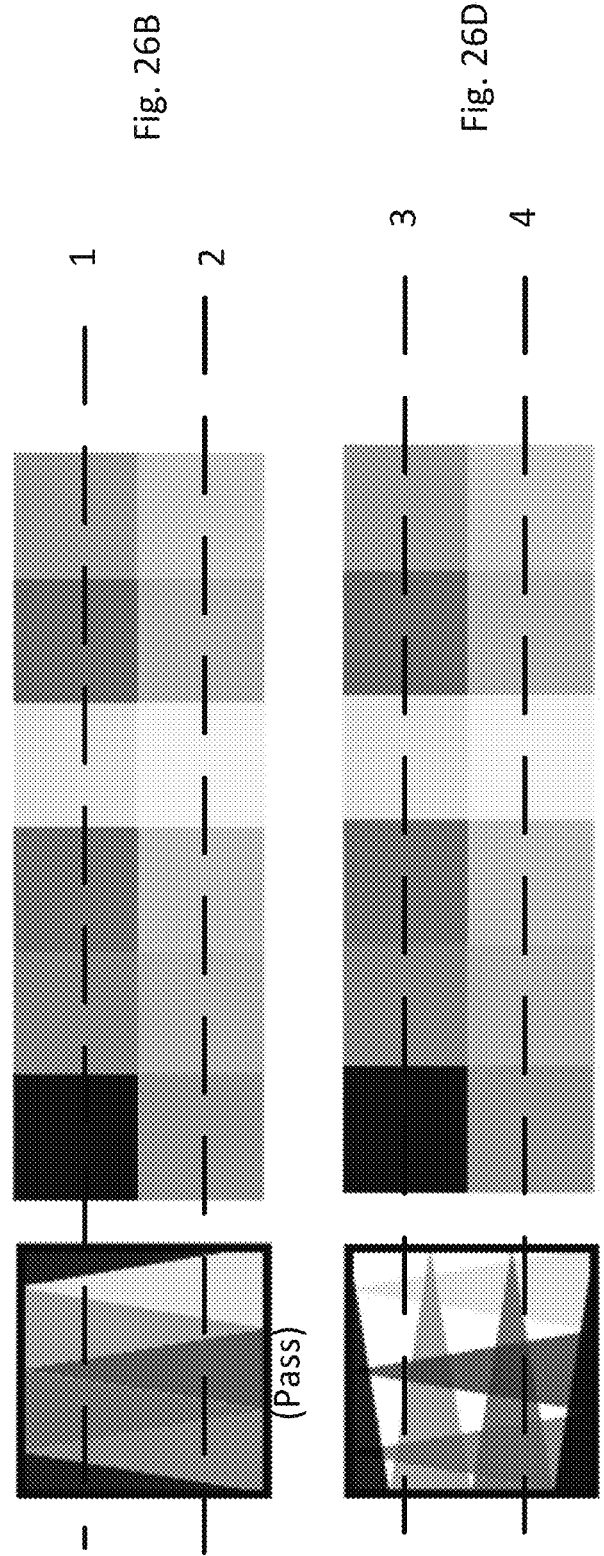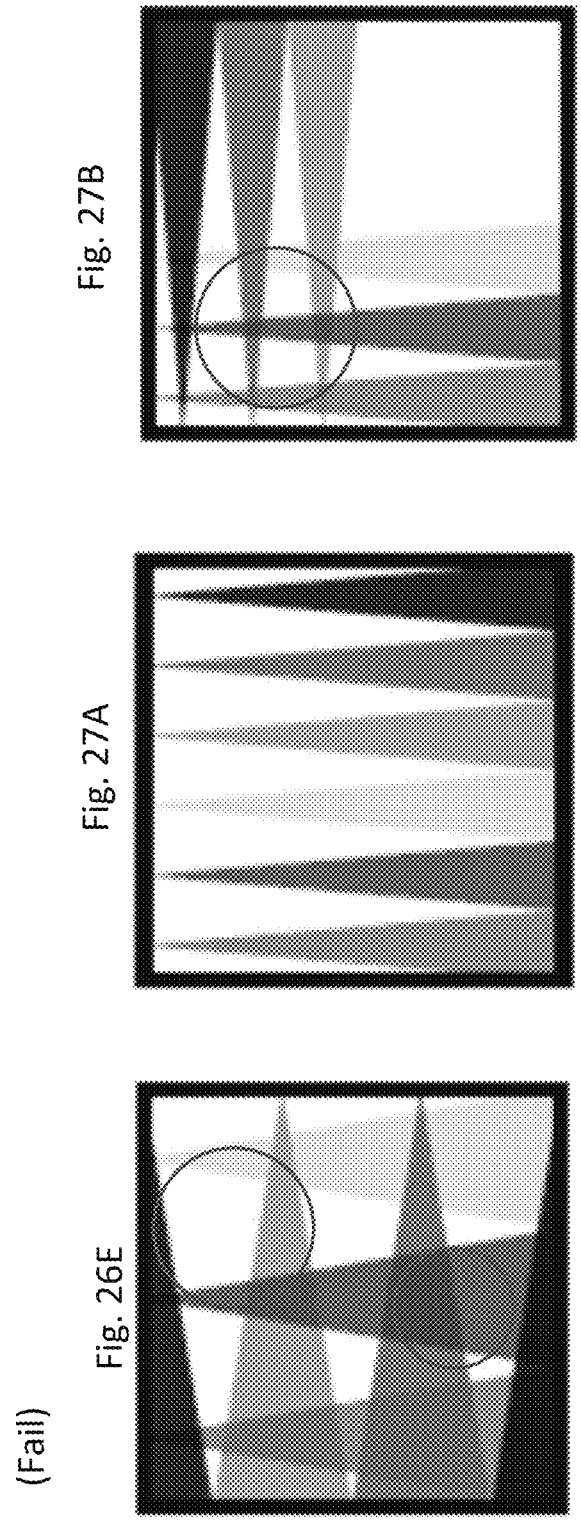

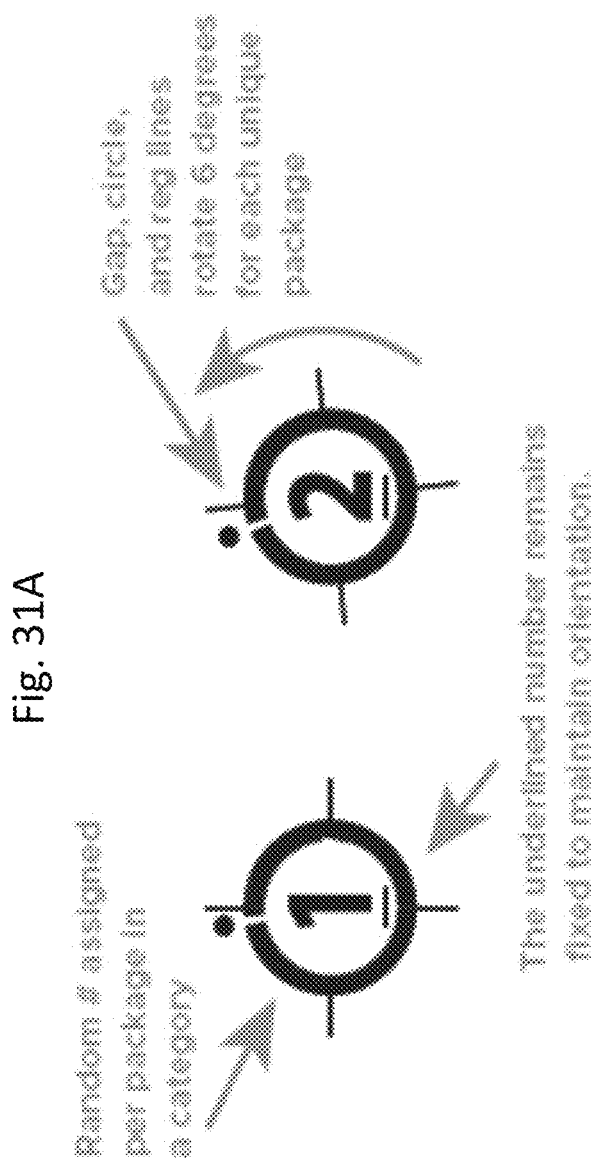
Fig. 31A
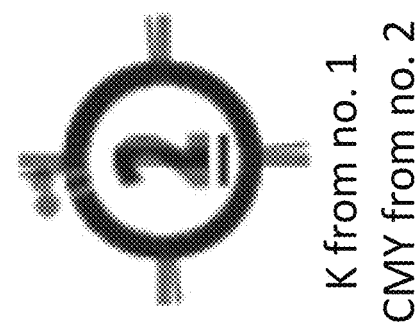
Fig. 31C
MYK from no. 1
Cyan from no. 2
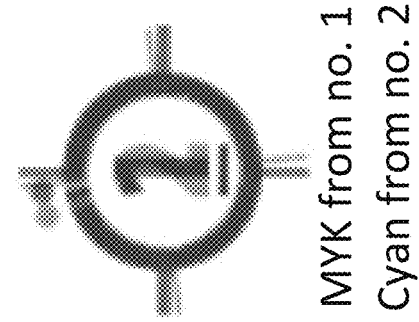
K from no. 1
CMY from no. 2

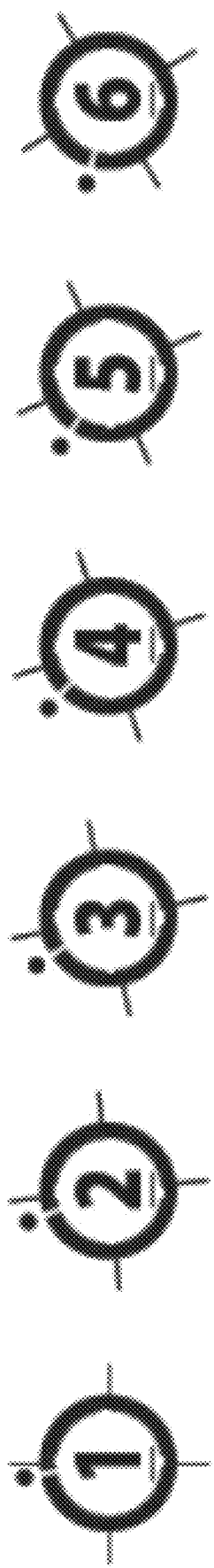
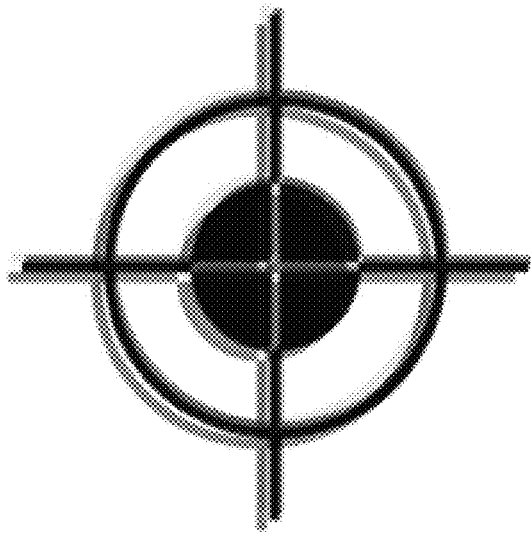
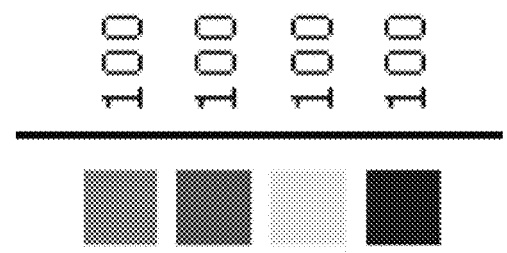
Fig. 31B
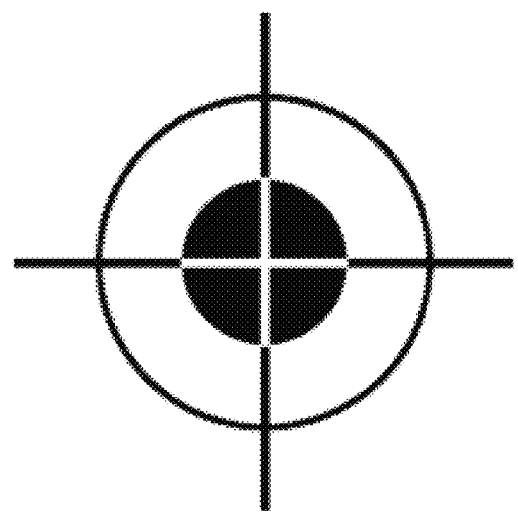
Fig. 32 (Prior Art)

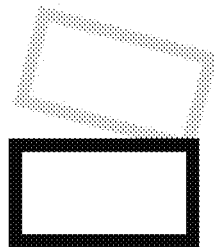
Fig. 34D
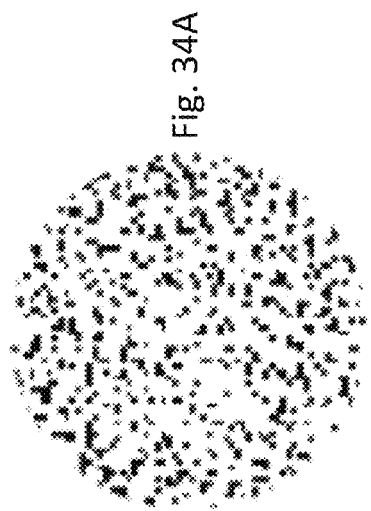
Fig. 34A
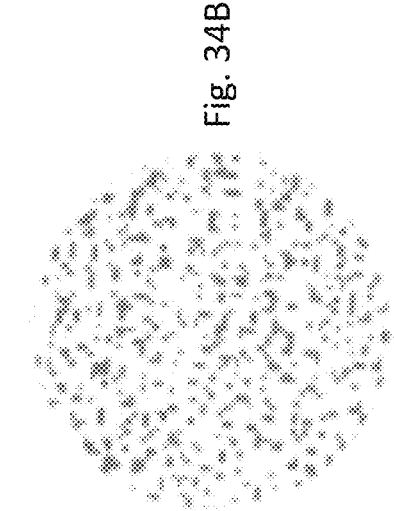
Fig. 34B
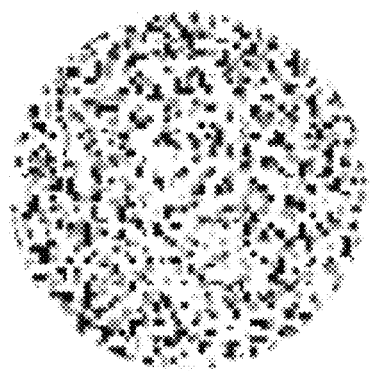
Fig. 34C
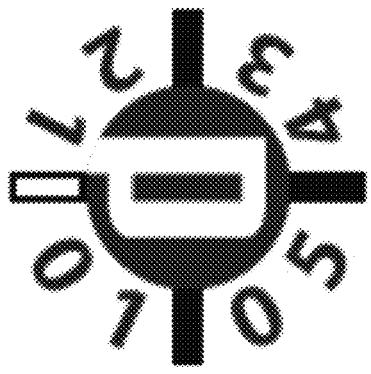
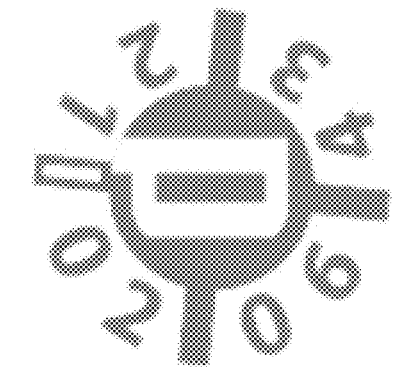
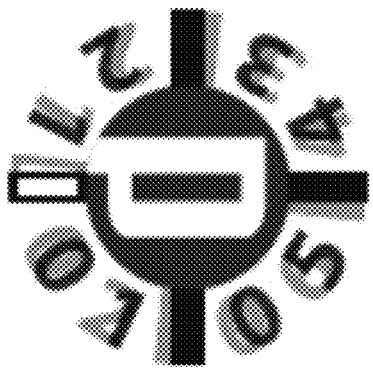

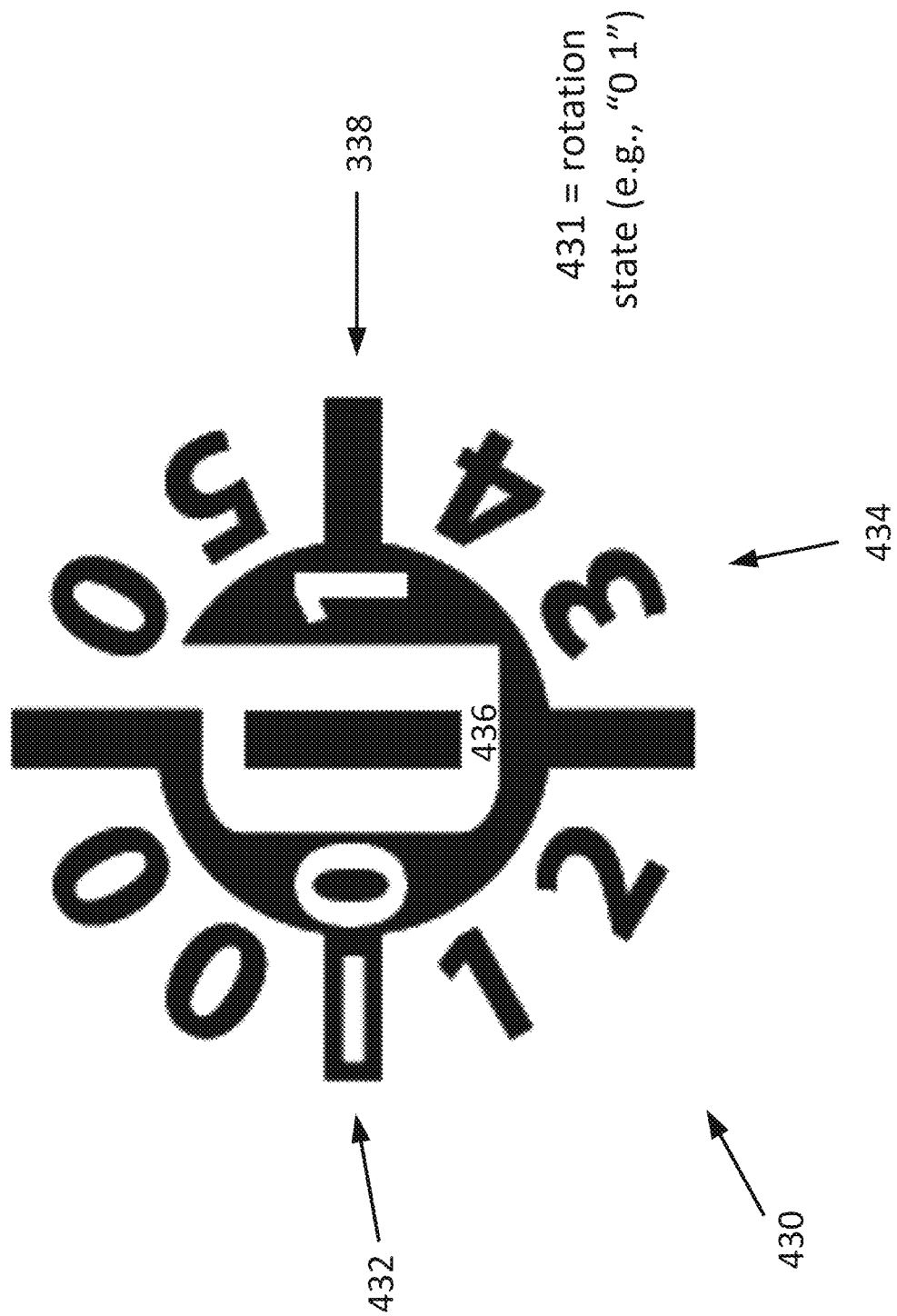

CORRECT

Package ID: 2001
Rotation: 01 cyan: 2001
magenta: 2001
yellow: 2001
black: 2001

CORRECT

Package ID: 13784
Rotation: 06 cyan: 13784
magenta: 13784
yellow: 13784
black: 13784

MIS-MATCH

IDs: 2001 & 13784
Rotations: 01 & 06 cyan: 13784
magenta: 2001
yellow: 13784
black: 13784

EXAMPLE:
Check Digit: 4
Actual Size:
3/8" x 3/8"
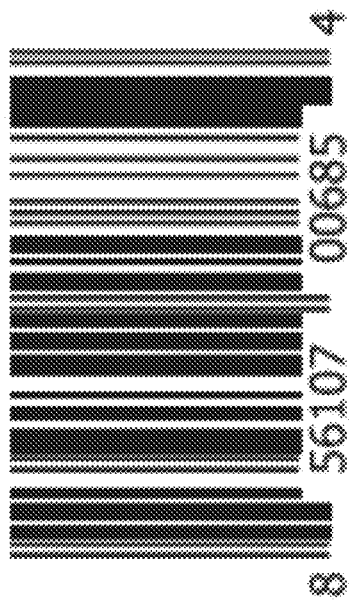
Fig. 38
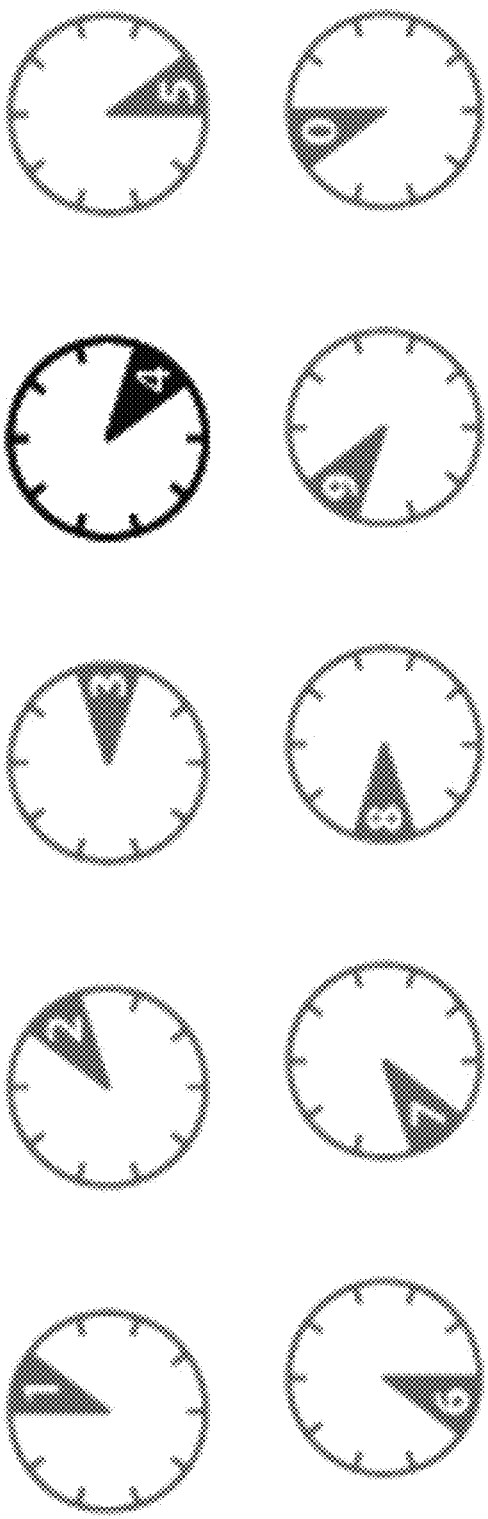
Fig. 39

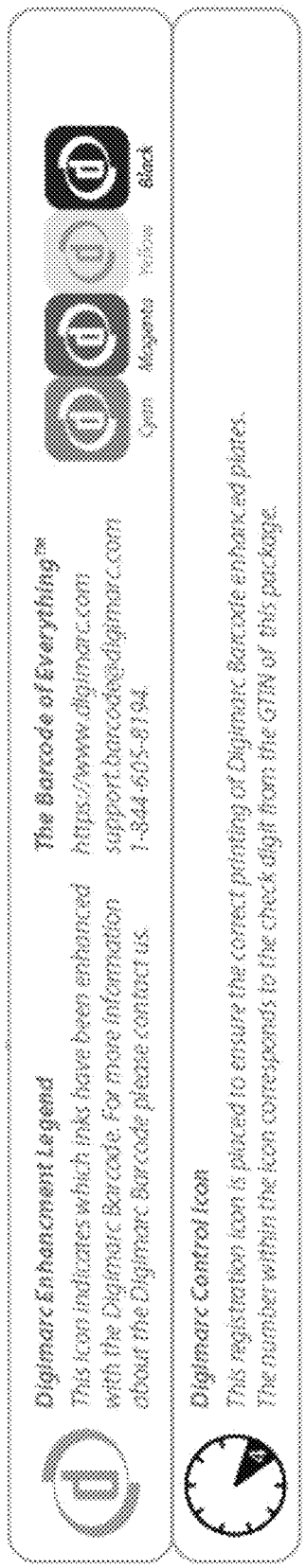
Fig. 42
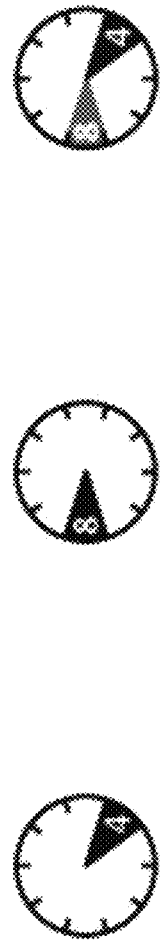
Fig. 40A — CORRECT DCI & Check Digit: 4 — cyan: 4, magenta: 4, yellow: 4, black: 4
Fig. 40B — CORRECT DCI & Check Digit: 8 — cyan: 8, magenta: 8, yellow: 8, black: 8
Fig. 40C — MISMATCH DCI & Check Digit: 4 & 8 — cyan: 4, magenta: 8, yellow: 4, black: 4

METHODS AND SYSTEMS TO ENSURE CORRECT PRINTING PLATE USAGE FOR ENCODED SIGNALS

RELATED APPLICATION DATA

This application claims the benefit of US Provisional Patent Application Nos. 62/569,398, filed Oct. 6, 2017, 62/559,334, filed Sep. 15, 2017 and 62/476,646, filed Mar. 24, 2017. This application is also a continuation-in-part of U.S. patent application Ser. No. 15/597,086, filed May 16, 2017, which claims the benefit of U.S. Provisional Patent Application No. 62/476,646, filed Mar. 24, 2017. This application is also related to U.S. patent application Ser. No. 15/154,572, filed May 13, 2016 (issued as U.S. Pat. No. 9,690,967) and Ser. No. 15/261,005, filed Sep. 9, 2017, Ser. No. 14/932,645, filed Nov. 4, 2015 (published as US 2016-0198064 A1, issued as U.S. Pat. No. 9,667,829), Ser. No. 15/072,884, filed Mar. 17, 2016 (published as US 2017-0024840 US), Ser. No. 14/724,729, filed May 28, 2015 (published as US 2016-0217547, issued as U.S. Pat. No. 9,747,656), Ser. No. 14/332,739, filed Jul. 16, 2014 (published as US 2015-0030201 A1, and issued as U.S. Pat. No. 9,521,291), Ser. No. 14/881,448, filed Oct. 13, 2015 (published as US 2016-0105585 A1, and issued as U.S. Pat. No. 9,716,807), and Ser. No. 15/441,006, filed Feb. 23, 2017. This disclosure is also related to Assignee's U.S. Pat. Nos. 9,245,308, 9,380,186 and 9,565,335. Each of the patent documents mentioned in this paragraph is hereby incorporated herein by reference in its entirety, including, e.g., all drawings and any appendices.

TECHNICAL FIELD

This disclosure relates to advanced signal processing technology including signal encoding and digital watermarking. This disclosure also relates to printing technology including detecting reuse or misuse of printing plates for encoded signals.

BACKGROUND AND SUMMARY

A technical problem exists when using printing plates to convey encoded signals onto substrates, especially when multiple different printing plates are involved in printing a design, and even more especially when printing designs across product family members, which may share common color separations or printing plates. Consider the following example.

A retail product design family may include, e.g., a family of dish soaps, which include related designs, with some design elements being identical and others being unique. For example, a background color across the family design may include a design element in a Cyan color channel that doesn't change from family member to family member. Yet, each family member may include other design elements that are unique (e.g., color changes to reflect dish soap fragrance or additives or cleaning ability). In this dish soap example, a printing house or print operator may realize an advantage by reusing the common Cyan design element printing plate across the entire family. If the common printing plate is manufactured based on a first design file, with a first ($1^{st}$) encoded signal represented in the first design file, then each package printed with this printing plate will include the first encoded signal in the common plate area (e.g., background). But if each family member includes a unique Global Trade Item Number (GTIN) developed by GS1 (or other identifier) to represent that it's unique within the family, and other printing plates are manufactured for these unique design elements and unique GTINs, each family member will include different encoded signals, e.g., a second ($2^{nd}$) encoded signal. So a package printed with the common Cyan plate (including the $1^{st}$ encoded signal) and a unique family plate (e.g., including the $2^{nd}$ encoded signal) will have at least two conflicting codes printed thereon ($1^{st}$ and $2^{nd}$ encoded signals).

Two (2) conflicting codes within a design can be catastrophic for a retailer (e.g., a grocer) and consumer. For example, at checkout, a consumer could be charged for two items when scanning just a single product. If using an inventory system, two different items will be effected with a scan when only one should be effected.

We've developed methods, apparatus, articles of manufacture and systems to help identify such printing plate or design layer reuse and/or misuse, e.g., see the disclosure of the verification logos or icons (also called "control icon(s)") in Section V, below.

Portions of this disclosure are described in terms of, e.g., encoded signals for digital designs, product packaging (sometimes just referred to herein as "packaging" or "package") and other objects such as hang tags and product labels. These encoding techniques can be used, e.g., to alter or transform how color inks are printed on various physical substrates. The alterations or transformations preferably result in a printed design carrying machine-readable indicia on a surface of a physical object.

Various forms of signal encoding (or "embedding") include, e.g., "steganographic encoding" and "digital watermarking." Digital watermarking is a process for transforming physical or electronic media to embed a machine-readable code (or "auxiliary data") into the media. In some cases the media is modified such that the embedded code is obscured, yet may be detected through an automated detection process. Digital watermarking is often applied to electronic or physical objects such as printed objects, images, audio signals, and video signals. However, it may also be applied to other types of objects, including, e.g., product packaging, electronics such as circuit boards and CPUs, stickers, logos, product hang tags, line-art, software, multi-dimensional graphics models, and surface textures of such objects.

In this document we use the terms "digital watermark" and "watermark" (and various forms thereof) interchangeably.

Auxiliary data embedding systems typically include two components: an encoder (or embedder) that embeds the auxiliary signal in a host image or object, and a decoder (or detector) that detects and reads the embedded auxiliary signal from the host image or object. The encoder may embed the auxiliary signal by altering or transforming a host image or object to carry the auxiliary data. The detection component analyzes a suspect image, object or signal to detect whether an auxiliary signal is present, and if so, extracts or reads information carried in it.

Several particular digital watermarking and auxiliary data embedding techniques have been developed. The reader is presumed to be familiar with the literature in this field. Particular techniques for embedding and detecting imperceptible digital watermarks are detailed in the assignee's patent documents including U.S. Pat. Nos. 7,054,461, 7,286, 685, 9,129,277, 9,380,186, 9,401,001 and 9,449,357, U.S. patent application Ser. No. 14/725,399 (published as US 2016-0275639 A1), Ser. No. 14/724,729 (published as US 2016-0217547 A1), and Ser. No. 14/842,575, filed Sep. 1, 2015 (published as US 2017-0004597 A1); and International Application No. PCT/US2015/44904, filed Aug. 12, 2015 (published as WO 2016025631 A1). Related technology is detailed in Assignee's U.S. patent application Ser. No. 15/073,483 (published as US 2016-0275326 A1). Each of the patent documents mentioned in this paragraph are hereby incorporated herein by reference in its entirety, including all drawings and any appendices.

One aspect of the disclosure to address the above technical problem of printing plate mismatch is a method comprising: obtaining a substrate including a control icon printed thereon, the control icon comprises a design printed in each of at least a first color channel, a second color channel, and a third color channel, the design comprising a plurality of design elements, the plurality of design elements comprising a central element, a rotation indicator, and a plurality of registration indicators, in which the rotation indicator includes an orientation associated with a Global Trade Item Number (GTIN), and in which the design is spatially registered across the first color channel, second color channel and third color channels to form the control icon when printed; evaluating the control icon to determine if the printed control icon comprises more than one (1) observable rotation indicator, said evaluating yielding a determination; and identifying a printing plate mismatch based on the determination.

This method may include the first color channel comprising Cyan, the second color channel comprising Magenta and the third color channel comprising Yellow, the design printed in a fourth color channel comprising black, and in which the design is spatially registered across the first color channel, second color channel, third color channel and fourth color channel to form the control icon when printed. The rotation indicator may include a numerical digit between 0 and 9, and includes a predetermined rotation associated with the numerical digit, and the plurality of registration indicators comprises dashes or line segments, in which the rotation indicator is positioned within the central shape and the numerical digit is positioned within the rotation indicator.

Another aspect of the disclosure is a substrate for a retail package, hang tag or label, the substrate comprising: a barcode including a check digit; a printed control icon, the control icon comprising a design printed with each of four (4) ink separations, the design comprising a plurality of design elements, the plurality of design elements comprising a central element, a rotation indicator corresponding to the check digit, a plurality of registration indicators, the four (4) ink separations comprising a Cyan (C) color channel, a Magenta (M) color channel, a Yellow (Y) color channel and a Black (K) color channel; in which the control icon indicates a printing plate mismatch when it comprises more than one (1) observable rotation indicator.

Yet another aspect of the disclosure is a method of detecting printing plate misuse, on a printing press having a plurality of printing plates configured to carry an encoded signal. The method includes: obtaining a verification icon comprising a plurality of design elements, with a first design element carried in a Cyan (C) color channel, a second design element carried in Magenta (M) color channel, a third design element carried in a Yellow (Y) color channel and a forth design element carried in a Black (K) color channel, the first design element, second design element, third design element and forth design element, cooperating when printing to produce the verification icon; obtaining Cyan, Magenta, Yellow and Black printing plates; using the printing plates, printing the verification icon on a substrate to yield a printed verification icon; and evaluating the printed verification icon to determine if an orientation of the first design element, second design element, third design element and forth design element comprise a predetermined orientation arrangement, in which a deviation from the predetermined orientation arrangement indicates a printing plate misuse or reuse.

Still another aspect of the disclosure is a method including: providing a verification icon, the verification icon comprising a plurality of design elements, with a first design element carried in a Cyan (C) color channel, a second design element carried in Magenta (M) color channel, a third design element carried in a Yellow (Y) color channel and a forth design element carried in a Black (K) color channel, the first design element, second design element, third design element and forth design element contributing to the verification icon; assigning a first orientation of the verification icon to a first product family member; assigning a second orientation of the verification icon to a second product family member; assigning a third orientation of the verification icon to a third product family member; assigning a forth orientation of the verification icon to a forth product family member; from a verification icon printed on a white substrate, determining a printing plate misuse or reuse based on an orientation of at least one of the first design element, second design element, third design element or forth design element.

Another aspect includes a method of determining a printing plate inconsistency. The method includes: generating a pseudo-random noise pattern; representing the pseudo-random noise pattern in a first set of color channels through modifying data representing the first set of color channels, in which the modifying introduces a first modification polarity in each color channel of the first set of color channels; representing the pseudo-random noise pattern in a black color channel through modifying data representing the black color channel, in which the modifying introduces a second modification polarity in the black color channel that is inversely related to the polarity of the first modification polarity; spatially aligning the pseudo-random noise pattern in the first set of color channels and the pseudo-random noise pattern in a black color channel such that luminance or chrominance attributable to the pseudo-random noise pattern in the first set of color channels offsets or reduces luminance or chrominance attributable to the pseudo-random noise pattern in a black color channel, in which the spatial aligning in is the form of text or a 1D or 2D symbology.

Still another aspect includes a method of detecting printing plate misuse, on a printing press having a plurality of printing plates configured to carry an encoded signal, the method including: obtaining a design comprising a plurality of design elements, the plurality of design elements comprising a central shape, a version indicator, an alpha-numerical digit, and registration indicators, the design being provided in a Cyan (C) color channel, a Magenta (M) color channel, a Yellow (Y) color channel and a Black (K) color channel, in which when the CMYK color channels are combined, the designs spatially align to form a control icon to detect printing plate misuse; obtaining Cyan, Magenta, Yellow and Black printing plates; using the printing plates, printing the designs on a substrate to yield a printed control icon; evaluating the printed control icon to determine if the printed control icon comprises more than one (1) observable version indicators or more than one (1) observable alphanumerical digits, said evaluating yielding a determination; and identifying a printing plate misuse based on the determination.

In some instances, the central shape comprises a circle, and the version indicator comprises a dot, and a gap in the circle. The registration indicators may also include a plurality of line segments. The design may also include an orientation guide, with the orientation guide being positioned relative to the alpha-numerical digit. The orientation guide may include an underline below the alpha-numerical digit.

Another aspect of the disclosure is a method of detecting a printing plate inconsistency, said method includes: obtaining a substrate including a control icon printed thereon, the control icon comprises a design printed in each of a Cyan (C) color channel, a Magenta (M) color channel, a Yellow (Y) color channel and a Black (K) color channel, the design comprising a plurality of design elements, the plurality of design elements comprising a central shape, a version indicator, an alpha-numerical digit, and registration indicators, in which the design is spatially registered across the CMYK color channels to form the control icon when printed; evaluating the printed control icon to determine if the printed control icon comprises more than one (1) observable version indicator or more than one (1) observable alpha-numerical digit, said evaluating yielding a determination; and identifying a printing plate misuse based on the determination.

Yet another aspect includes a substrate for a retail package, hang tag or label, the substrate including: an ink control strip printed in a trim area or fold area; a control icon printed adjacent to the ink control strip, the control icon comprising a design printed with each of four (4) ink separations, the design comprising a plurality of design elements, the plurality of design elements comprising a central shape, a version indicator, an alpha-numerical digit, and registration indicators, the four ink separations comprising a Cyan (C) color channel, a Magenta (M) color channel, a Yellow (Y) color channel and a Black (K) color channel; an encoded signal carried by at least the Cyan (C) color channel; in which the control icon indicates a printing plate misuse or reuse when it comprises more than one (1) observable version indicator, or more than one (1) observable alpha-numerical digit.

Still another aspect of the disclosure includes a method of detecting a printing plate inconsistency. The method comprising: obtaining a substrate including a control icon printed thereon, the control icon comprises a design printed in each of at least a first color channel, a second color channel, and a third color channel, the design comprising a plurality of design elements, the plurality of design elements comprising a rotation indicator, a separation structure a product or package identifier, an orientation structure, and a plurality of registration indicators, in which the design is spatially registered across the first color channel, second color channel and third color channels to form the control icon when printed; evaluating the control icon to determine if the printed control icon comprises more than one (1) observable rotation indicator or more than one (1) observable separation structure, said evaluating yielding a determination; and identifying a printing plate misuse based on the determination.

In some implementations, the rotation indicator comprises numerical digits between 01 and 60, the separation structure comprises a cutout structure, the orientation structure comprises an alpha-numeric digit, and the plurality of registration indicators comprises dashes or line segments.

Further aspects, features and advantages will become even more apparent with reference to the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B illustrate example watermarked digital images, which are part of a test set.

FIGS. 2A-2E are graphs showing standard deviation for various strength measures.

FIG. 17 is a diagram illustrating embedding of an auxiliary signal into host image signal.

FIG. 18 is a flow diagram illustrating a method for decoding a payload signal from a host image signal.

FIG. 19C represents the corresponding blocked area from FIG. 19B, including decoded signals per sub-area.

FIG. 19D represents another instance of the corresponding blocked area from FIG. 19B, including decoded signals per sub-area.

FIG. 20A shows an image including an area for analysis.

FIG. 20B represents the corresponding area from FIG. 20A, including various different decoded signals in some of the sub-areas.

FIGS. 23A and 23B show a verification icon or logo for members within a product family. The orientation and/or color may indicate a printing plate misuse or inappropriate reuse.

FIG. 24 shows alternative icon or logo configurations for product families having between 4-9 family members.

FIGS. 25A and 25B show an encoded message to evidence incorrect printing plate use.

FIGS. 26A and 26C show a verification logo or icon printed near or aligned with printed control strips.

FIGS. 26B and 26D show spectrophotometer scan paths for icons/strips of FIGS. 26A and 26C Figs., respectively.

FIG. 26E is shows the verification logo or icon from FIG. 26D, with circles highlighting white and over printed areas. This logo or icon evidences a misuse or reuse of printing plates.

FIG. 26F identifies colors used within the FIG. 26A-26D logo or icons.

FIG. 27A shows a different, but expected verification logo or icon, and FIG. 27B shows a verification logo or icon with two or more misused or reused printing plates.

FIGS. 31A and 31B show still other verification logos or icons, and FIG. 31C shows a verification logo or icon with a printing plate or color separation misuse or reuse.

FIG. 32 is a prior art printing plate registration mark.

FIGS. 34A and 34B show different family versions of the FIG. 33 control icon, and FIG. 34C show the control icon with a printing plate or color separation misuse or reuse.

FIG. 34D shows a portion of the FIG. 34C control icon but with rotation indicators of 01 and 04.

FIG. 35 is yet another control icon, including an identifier.

FIG. 38 illustrates still another control icon, including a rotation indicator correlated to a GTIN or other product identifier.

FIG. 39 illustrates 0-9 rotation indicators for the FIG. 38 control icon.

FIGS. 40A and 40B show different versions of the FIG. 38 control icon, and FIG. 40C show the control icon with a printing plate or color separation mismatch.

FIG. 42 is a graphic showing a design legend featuring the FIG. 38 control icon.

DETAILED DESCRIPTION

Introduction

We've developed methods, apparatus, articles and systems to help printing plate or design layer mismatch, e.g., please see the disclosure of the verification logos or icons (also called "control icon") in Section V, below. And, while the following detailed description is divided into five (5) general sections, it should be understood from the outset, however, that we expressly contemplate combining subject matter from one such section with one or more of the other sections. Thus, the sections and section headings are provided for the reader's convenience and are not intended to impose restrictions or limitations.

I. Signal Encoder and Decoder

Encoder/Decoder

Figure 14:
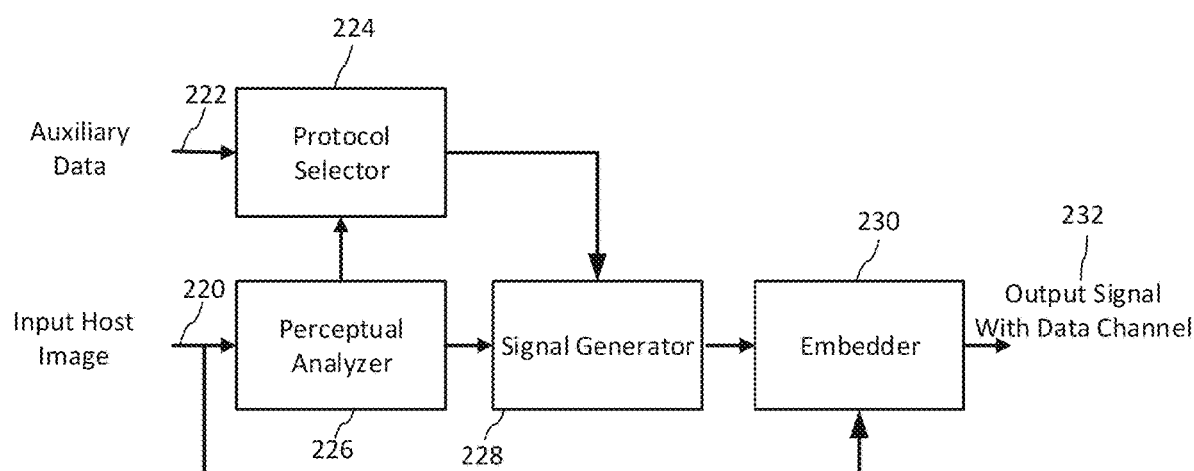
FIG. 14 is a block diagram of a signal encoder for encoding a digital payload signal into an image signal.
Figure 15:
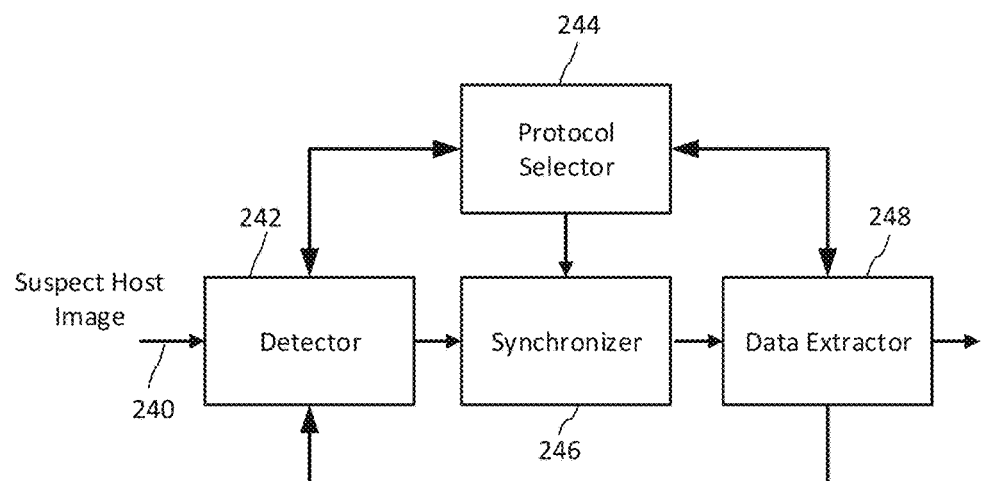
FIG. 15 is a block diagram of a compatible signal decoder for extracting the digital payload signal from an image signal.

FIG. 14 is a block diagram of a signal encoder for encoding a digital payload signal into an image signal. FIG. 15 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 15 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., Ser. No. 14/725,399 (published as US 2016-0275639 A1), which is hereby incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (issued as U.S. Pat. No. 9,380,186), Ser. No. 14/588,636 (issued as U.S. Pat. No. 9,401,001)) and Ser. No. 13/975,919 (issued as U.S. Pat. No. 9,449,357), Patent Application Publication No. US 2010-0150434 A1, and U.S. Pat. No. 7,352,878, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. patent application Ser. No. 13/975,919 (issued as U.S. Pat. No. 9,449,357); and see also, U.S. patent application Ser. No. 14/588,636 (issued as U.S. Pat. No. 9,401,001), filed Jan. 2, 2015, and Ser. No. 15/137,401, filed Apr. 25, 2016, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host and the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. patent application Ser. No. 14/616,686 (issued as U.S. Pat. No.

9,380,186), Ser. No. 14/588,636 (issued as U.S. Pat. No. 9,401,001) and Ser. No. 13/975,919 (issued as U.S. Pat. No. 9,449,357), Patent Application Publication No. US 2010-0150434 A1, and U.S. Pat. No. 7,352,878, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. No. 14/616,686 (issued as U.S. Pat. No. 9,380,186), Ser. No. 14/588,636 (issued as U.S. Pat. No. 9,401,001) and Ser. No. 13/975,919 (issued as U.S. Pat. No. 9,449,357) for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 15, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 16:
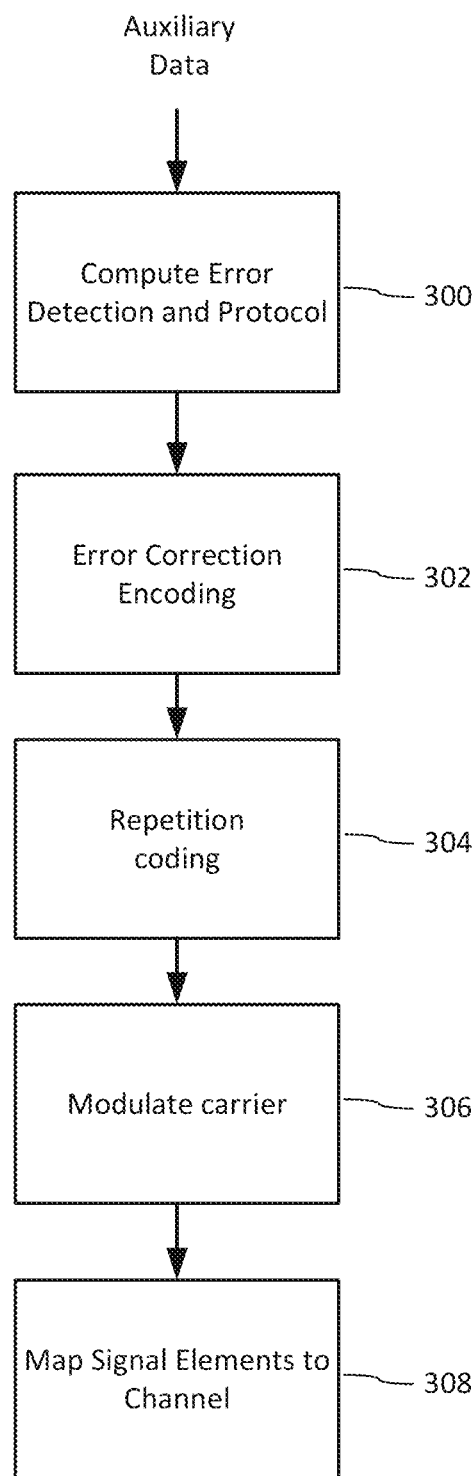
FIG. 16 is a flow diagram illustrating operations of a signal generator.

FIG. 16 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Patent Application Publication No. US 2012-0078989 A1, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. patent application Ser. No. 14/724,729 (published as US 2016-0217547 A1), which are hereby incorporated by reference in their entirety.

Signal Embedding In Host

FIG. 17 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 16, the product or label identifier (e.g., in GTIN format) and additional flag or flags used by control logic are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100 DPI or 300 DPI. In this example, we will explain the case where the spatial resolution of the embedded signal is 300 DPI, for an embodiment where the resulting image with encode data is printed on a package or label material, such as a paper, plastic or like substrate. The payload is repeated in contiguous tiles each comprised of 256 by 256 of embedding locations. With these embedding parameters, an instance of the payload is encoded in each tile, occupying a block of host image of about 1.28 by 1.28 inches. These parameters are selected to provide a printed version of the image on paper or other substrate. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as discussed in U.S. Pat. No. 9,311,640, which is hereby incorporated herein by reference in its entirety.

Following the construction of the payload, error correction coding is applied to the binary sequence. This implementation applies a convolutional coder at rate ¼, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate ⅓ and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (published as US 2016-0217547 A1). In the latter, the tile size may be increased to accommodate the differential encoding of each encoded bit in a pattern of differential encoded bit cells, where the bit cells corresponding to embedding locations at a target resolution (e.g., 300 DPI).

Our U.S. patent application Ser. No. 14/725,399 (published as US 2016-0275639 A1), describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publication No. US 2010-0150434 A1 (issued as U.S. Pat. No. 9,117,268) and U.S. patent application Ser. No. 14/725,399 (published as US 2016-0275639 A1), which are each hereby incorporated herein by reference. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 16), which in turn, are assigned to the pseudorandom embedding locations within the sub-blocks (block 308 of FIG. 16). An embedder module modulates this signal onto a host signal by increasing or decreasing host signal values at these locations for each error correction coded bit according to the values of the corresponding elements of the modulated carrier signal for that bit.

FIG. 18 is a flow diagram illustrating a method for decoding a payload signal from a host image signal. Implementations of a watermark decoder and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:

Digimarc Barcode SDKs
Digimarc Barcode Plugin

Returning to FIG. 18, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see co-pending U.S. application Ser. No. 14/332,739, published as US 2015-0030201 A1, which are each hereby incorporated by reference in its entirety.

Please also see provisional application 62/174,454, filed Jun. 11, 2015, which is hereby incorporated by reference, for more on block selection where processing time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication No. US 2013-0329006 A1, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778 are used.

Alternative methods perform synchronization on an implicit synchronization signal, e.g., as detailed in Ser. No. 14/724,729.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

II. Robustness Masks (Maps) and Swipe Metrics

One problem with digital watermarking product packages and other physical objects is obtaining visibility that is subjectively pleasing to a graphic designer and others. For example, a graphic designer may be hesitant to introduce too much "noise" into a product's design. The term "noise" refers to visible artifacts in a spatial domain that may be created when the design is transformed to carry an encoded signal, e.g., steganographic encoding or digital watermarking. These artifacts may sometimes have a noise-like, grainy or other visible appearance. As a result, the designer may crank down digital watermark signal strength (or "gain") or remove the watermarking from some design areas altogether. This may result in a loss of signal robustness, e.g., embedded watermarks carried in the product package may not be detectable in some or all areas of the package surface. We refer to such a package as a low-gain design. (A low-gain design may include areas without watermarking, areas with low-signal gain, perhaps along with some design areas that are robustly embedded.)

Now imagine such a low-gain design in a retail checkout scenario. For example, please see assignee's U.S. Pat. No. 9,224,184, which is hereby incorporated herein by reference in its entirety. In this setting packages move along at retail checkout, e.g., on a conveyor or with employee-assist. A watermark detector analyzing image data representing a low-gain design may not be able to detect watermarks from the image data. A non-detect may result in a slowed checkout process, requiring human intervention or other process to enter the product's ID code.

Low-gain designs need to be discovered prior to press runs. For example, tens of thousands of packages can be printed (e.g., on offset or digital printing presses) before it's realized that a watermarked package design is a low-gain type. At the printing press stage, it is often too late to "stop the presses" to create new printing plates and roll out a new design, one having a higher encoded signal strength.

In terms of "offset lithography" printing, printing plates are generally thin, flexible, and usually larger than the paper size to be printed. Two main materials are used: i) metal plates, usually aluminum, although sometimes they are made of multi-metal, paper, or plastic; and ii) polyester plates. The polyester plates are less expensive and can be used in place of aluminum plates for smaller formats or medium quality jobs, as their dimensional stability is lower. The majority of lithographic plates are made of aluminum sheets of varying thickness (e.g., between 0.008" and 0.0015") with a surface grain or granular finish. This grain serves to give water-carrying properties to the plate and to give anchorage to the image forming material. In modern times, most plates are presensitized, e.g., they come ready coated with a light sensitive diazo compound or photopolymer resin material or coating ready for light exposure. This photopolymer coating, as the term implies, is a chemical resin or polymer that will react with ultraviolet light—much like photographic film. When UV light strikes the photopolymer on the plate, it is "hardened". Photopolymer that is not exposed to the light is not "hardened" and can be easily removed. This is the principle of the modern offset plate. There are several major types of lithographic plates used in the printing industry today, including: Diazo, Photopolymer, Silver Halide, Electrophotographic, Bimetal, Waterless, Spark Discharge (digital waterless), Laser (digital waterless), and Computer-to-plate ("CTP").

Most CTP systems used thermal CTP or violet technologies. Both technologies have the similar characteristics in term of quality and plate durability (longer runs). However often the violet CTP systems are cheaper than thermal ones, and thermal CTP systems do not need to be operated under yellow light. Thermal CTP involves the use of thermal lasers to expose and/or remove areas of coating while the plate is being imaged. This depends on whether the plate is negative, or positive working. These lasers are generally at a wavelength of 830 nm, but vary in their energy usage depending on whether they are used to expose or ablate material. Violet CTP lasers have a much lower wavelength, 405 nm-410 nm. Violet CTP is "based on emulsion tuned to visible light exposure.

Aspects of this disclosure address a problem of detecting a low-gain design by predicting embedding strength and/or detectability across a printed product package from a digital design. If the predicted strength falls short of a predetermined threshold or other metric the digital design can be re-embedded, flagged for inspection and/or redesigned, etc. A mapping (e.g., a heat map or robustness map representing encoded signal detectability) may be generated to visually indicate predicted watermark readability across the image surface. Moreover, strength across a package's scanning length or swipe path (e.g., horizontal and/or vertical swipe paths) can be quantified and adjusted, if needed.

As discussed above an encoded signal, e.g., digital watermarking, may include multiple components. For example, digital watermarking may include a synchronization component (e.g., a reference pattern) and a message (or payload) component. These components may be combined in some domain (e.g., transform domain) to form a watermark signal. In some cases the synchronization component is introduced into a host signal (e.g., an image or audio signal) prior to introduction of the message component.

The synchronization component can be utilized during signal detection. An embedded host signal undergoes various transformations, such as conversion to and from an analog domain (e.g., offset or digital printing and then image capture of the printed design). Using parameters from a watermark embedder (e.g., the reference pattern), a watermark detector may perform a series of correlations or other operations on captured imagery to detect the presence of a digital watermark. If it finds a watermark, it may determine its orientation within the host signal.

Using the orientation, if necessary, the watermark detector may extract or decode the message. Some implementations do not perform correlation, but instead, use some other detection process or proceed directly to extract the watermark signal.

Watermark detectors can be designed in many ways. One design utilizes stages, where a synchronization component is evaluated in a first stage and if it meets certain thresholds (e.g., based on correlation with a reference pattern) it passes onto a second stage. The message component can be evaluated and read (or decoded) in the second stage. Of course, additional stages can be added, e.g., pre-filtering stages and various strength check stages.

There are many types of synchronization components that may be used with the present technology.

For example, a synchronization signal may be comprised of elements that form a circle in a particular domain, such as the spatial image domain, the spatial frequency domain, or some other transform domain. Assignee's U.S. Pat. No. 7,986,807, which is hereby incorporated herein by reference in its entirety, considers a case, e.g., where the elements are impulse or delta functions in the Fourier magnitude domain. The reference signal comprises impulse functions located at points on a circle centered at the origin of the Fourier transform magnitude. These create or correspond to frequency peaks. The points are randomly scattered along the circle, while preserving conjugate symmetry of the Fourier transform. The magnitudes of the points are determined by visibility and detection considerations. To obscure these points in the spatial domain and facilitate detection, they have known pseudorandom phase with respect to each other. The pseudorandom phase is designed to minimize visibility in the spatial domain. In this circle reference pattern example, the definition of the reference pattern only specifies that the points should lie on a circle in the Fourier magnitude domain. The choice of the radius of the circle and the distribution of the points along the circle can be application specific. For example, in applications dealing with high resolution images, the radius can be chosen to be large such that points are in higher frequencies and visibility in the spatial domain is low. For a typical application, the radius could be in the mid-frequency range to achieve a balance between visibility requirements and signal-to-noise ratio considerations.

Figure 10:
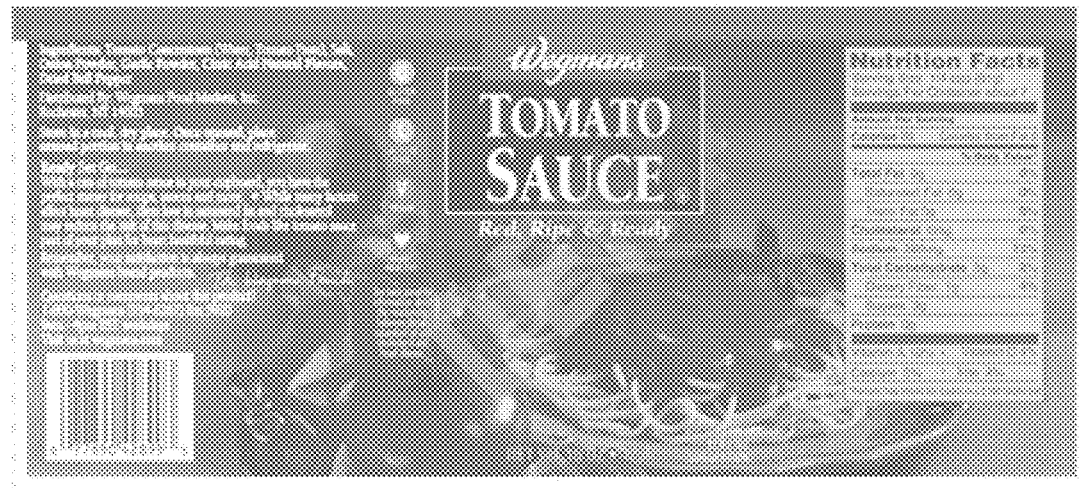
FIG. 10 is a greyscale version of the watermark image (FIG. 9A) with 50% opacity overlaid onto a white background.
Figure 11:
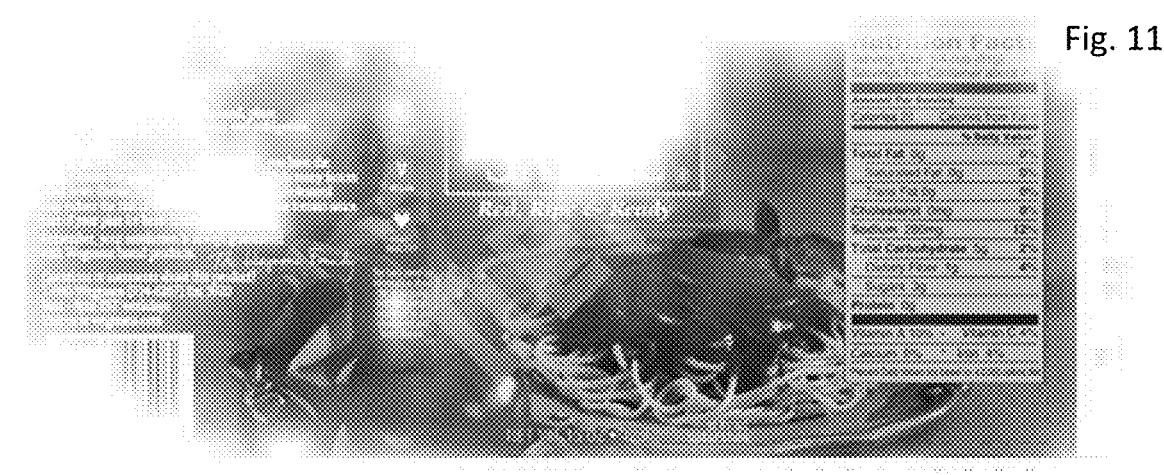
FIG. 11 is the FIG. 9A watermarked image masked using the robustness map in FIG. 9B.

Another example is found in Assignee's U.S. Pat. No. 6,614,914, which is hereby incorporated herein by reference in its entirety. There, a synchronization component (or "orientation pattern") can be comprised of a pattern of quad symmetric impulse functions in the spatial frequency domain. These create or correspond to frequency peaks. In the spatial domain, these impulse functions may look like cosine waves. An example of an orientation pattern is depicted in FIGS. 10 and 11 of the 6,614,914 patent.

Another type of synchronization component may include a so-called Frequency Shift Keying (FSK) signal. For example, in Assignee's U.S. Pat. No. 6,625,297, which is hereby incorporated herein by reference in its entirety, a watermarking method converts a watermark message component into a self-orienting watermark signal and embeds the watermark signal in a host signal (e.g., imagery, including still images and video). The spectral properties of the FSK watermark signal facilitate its detection, even in applications where the watermarked signal is corrupted. In particular, a watermark message (perhaps including CRC bits) can be error corrected, and then spread spectrum modulated (e.g., spreading the raw bits into a number of chips) over a pseudorandom carrier signal by, e.g., taking the XOR of the bit value with each value in the pseudorandom carrier. Next, an FSK modulator may convert the spread spectrum signal into an FSK signal. For example, the FSK modulator may use 2-FSK with continuous phase: a first frequency represents a zero; and a second frequency represents a one. The FSK modulated signal is can be applied to rows and columns of a host image. Each binary value in the input signal corresponds to a contiguous string of at least two samples in a row or column of the host image. Each of the two frequencies, therefore, is at most half the sampling rate of the image. For example, the higher frequency may be set at half the sampling rate, and the lower frequency may be half the higher frequency.

When FSK signaling is applied to the rows and columns, the FFT magnitude of pure cosine waves at the signaling frequencies produces grid points or peaks along the vertical and horizontal axes in a two-dimensional frequency spectrum. If different signaling frequencies are used for the rows and columns, these grid points will fall at different distances from the origin. These grid points, therefore, may form a detection pattern that helps identify the rotation angle of the watermark in a suspect signal. Also, if an image has been rotated or scaled, the FFT of this image will have a different frequency spectrum than the original image.

For detection, a watermark detector transforms the host imagery to another domain (e.g., a spatial frequency domain), and then performs a series of correlation or other detection operations. The correlation operations match the reference pattern with the target image data to detect the presence of the watermark and its orientation parameters.

Yet another synchronization component is described in assignee's U.S. Pat. No. 7,046,819, which is hereby incorporated by reference in its entirety. There, a reference signal with coefficients of a desired magnitude is provided in an encoded domain. These coefficients initially have zero phase. The reference signal is transformed from the encoded domain to the first transform domain to recreate the magnitudes in the first transform domain. Selected coefficients may act as carriers of a multi-bit message. For example, is an element in the multi-bit message (or an encoded, spread version of such) is a binary 1, a watermark embedder creates a peak at the corresponding coefficient location in the encoded domain. Otherwise, the embedder makes no peak at the corresponding coefficient location. Some of the coefficients may always be set to a binary 1 to assist in detecting the reference signal. Next, the embedder may assign a pseudorandom phase to the magnitudes of the coefficients of the reference signal in the first transform domain. The phase of each coefficient can be generated by using a key number as a seed to a pseudorandom number generator, which in turn produces a phase value. Alternatively, the pseudorandom phase values may be computed by modulating a PN sequence with an N-bit binary message. With the magnitude and phase of the reference signal defined in the first transform domain, the embedder may transform the reference signal from the first domain to the perceptual domain, which for images, is the spatial domain. Finally, the embedder transforms the host image according to the reference signal.

A correlation based technique can be used to help locate and decode the watermark signal.

To evaluate watermark characteristics in a digital design and use such to predict detectability on a corresponding printed object, we can generate detectability measures that correspond in various ways to the embedded watermark signal (e.g., the synchronization component and/or the message component). The premise is that if we can estimate the detectability measures in a digital design, then we can estimate the chance of a successful read when that digital design is printed, e.g., on a product package, scanned (e.g., image capture of the printed product package) and decoded.

Some of our detectability measures are described and applied below.

Figures 1A, 1B, 2E:
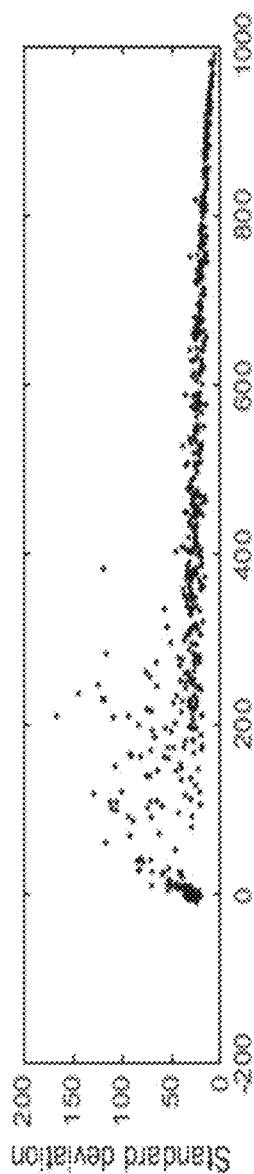

For this analysis we used 300 digital test images each including a 2 by 2 inch patch. The image size and sample size of these images is not critical, but is useful to help illustrate aspects of this disclosure. Two examples of test image patches are shown in FIG. 1A and FIG. 1B.

Each of the digital test images is embedded with digital watermarking including a reference pattern and a message. Some of the images include so-called "sparse" digital watermarking, e.g., as described in assignee's U.S. patent application Ser. No. 14/725,399 (published as US 2016-0275639 A1), which is hereby incorporated herein by reference in its entirety. Some images include digital watermarking as generally discussed, e.g., in assignee's US Published Patent Application No. US 2015-0156369 A1, which is hereby incorporated herein by reference in its entirety.

These embedded, test images are then printed, e.g., using an Epson 4900 printer with a GRACoL profile and semi-matte paper. An image capture device, e.g., the Datalogic 9800i (including a horizontal and vertical camera) with a video feed enabled was used to capture 100 digital images of each printed test image for each camera (so a total of 200 digital images or "scans" were captured for each test image). The printed images were each positioned in a way that allows maximum detection for the given camera. Additionally, each printed image was placed on a plate (again, in the most readable position on the scanner) and automatically swiped 400 times in front of each camera. A robotic arm ("robot") that moves the printed images in front of the cameras was used for this other image capture. All captured, digital images were saved and evaluated as discussed below.

A watermark detector analyzed each digital image captured from the scans. The following detection measures were determined.

Reference Pattern Strength (RPS):

For each captured digital image we determined its RPS, which, e.g., comprises a sum of bounded frequency domain signal peak strengths. This value can be normalized, e.g., between 0 and 2, for each peak strength. RPS mean from the test images are shown in FIG. 2A, which has a rather large standard deviation.

Linear Reference Pattern Strength (LRPS):

Here we determine the average of unbounded peak strengths. For example, we compare each reference pattern peak to its neighbors (e.g., 4, 6 or 8 neighbors). In other words, how does this peak compare to its neighborhood, e.g., in terms of magnitude or other measure. The subject peak value can be divided by the average value of its neighbors. Its measure includes a better behaved standard deviation compared to the RPS, as seen in FIG. 2B.

Phase Deviation Strength (PDS):

This measure represents how consistent is the phase of reference pattern peaks are relative to translation. It is, however, very sensitive to how well rotation and scale are estimated, which leads to extremely high standard deviation, as shown in FIG. 2C.

Criterion Strength (CS):

Is a combination of Reference Pattern Strength and Phase Deviation. The value of Criterion Strength can be represented as:

Criterion Strength=0.17*RPS−PDS−46.5.

However, since this criterion includes two measures with high variance, as seen in FIG. 2D, it is difficult to estimate the CS.

Message Strength (MS):

One example of message "strength" was described in assignee's U.S. Pat. No. 7,286,685, which is hereby incorporated by reference in its entirety. From the '685 patent, one approach for measuring strength of a message signal is as follows: 1. Use the message payload read from the watermark to re-create the original embedded bit sequence (including redundantly encoded bits from error correction coding) used for the watermark. 2. Convert the original bit sequence so that a zero is represented by −1 and a one is represented by 1. 3. Multiply (element-wise) the soft-valued bit sequence used to decode the watermark by the sequence of step 2. 4. Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, etc. 5. Compare the strength measures to thresholds . . . .

Figure 3:
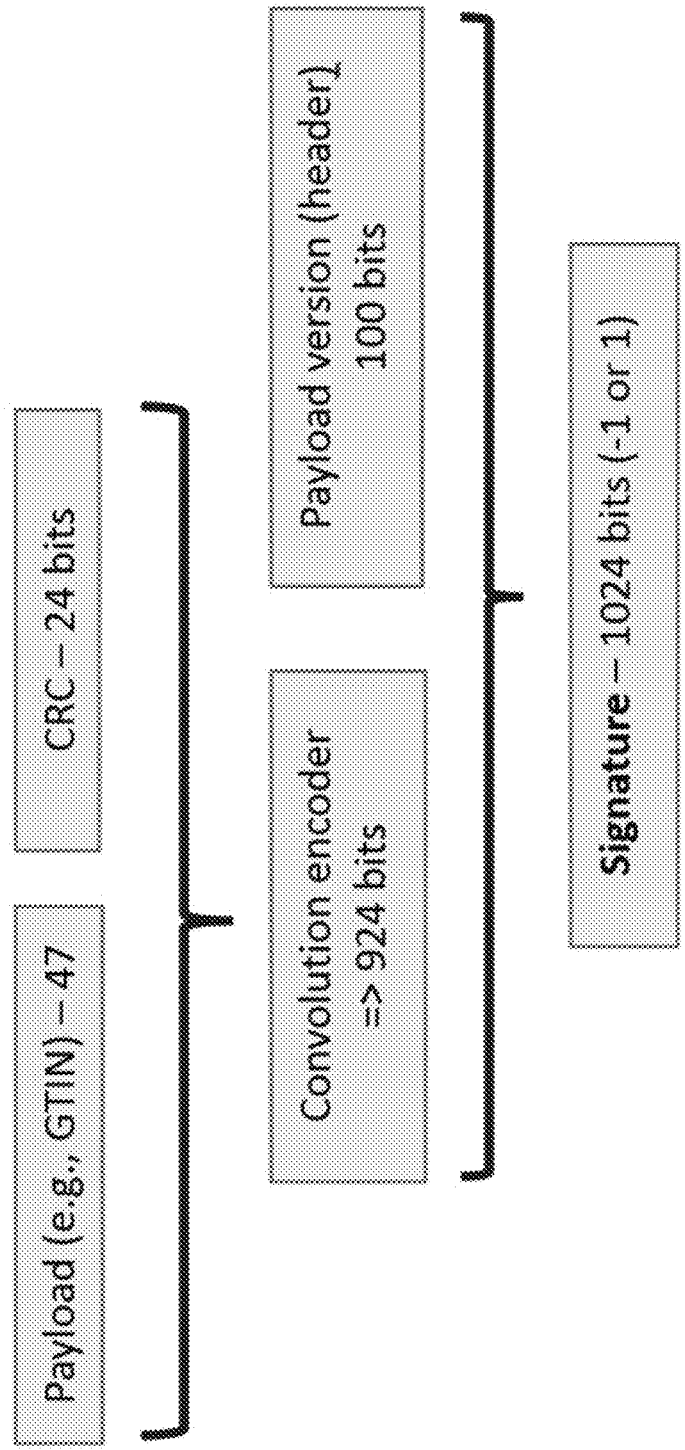
FIG. 3 is a diagram showing construction of a message signature.

Another method, introduced in this patent document, is a correlation metric based on a watermark's message signature. With reference to FIG. 3, a signature is generated based on a payload or message, e.g., carrying a GTIN, UPC, identifier or some other plural-bit message. While there are specific bit numbers illustrated in FIG. 3, the present disclosure is not so limited, as we may include many more or less bits for the various payload components. The payload can be combined with CRC bits, and the combination can be error corrected, e.g., with a convolutional encoder. A payload header can be added to help distinguish the type or format of the watermarking or to indicate a payload version. The resulting bit string can be used as the signature.

Each bit of the signature can be placed redundantly in a digital image. For example, in a tile design, where watermark tiles (e.g., a 128×128 message tile) are tiled across an image or image area, each bit of the signature can be mapped, e.g., 8-16 times, to a pseudo-random location (with pseudo-random sign) to create a message tile.

The signature is unique for each GTIN and the Message Strength (MS) and can be represented as a relationship between the embedded signature and the sign of the decoded signature:

$$MS = \sum_{i=1}^{1024} EmbeddedSignature(i) * \text{sign}(DecodedSignature(i))$$

This measure has relatively small standard deviation, as seen in FIG. 2E.

Additional signal strength metrics are discussed in U.S. Pat. No. 7,054,461, e.g., a so-called Power Ratio and Payload Recovery Assessment. The U.S. Pat. No. 7,054,461 patent is hereby incorporated herein by reference in its entirety.

The power ratio metric measures, e.g., the degradation of a watermark signal (e.g., a synchronization component) at selected frequencies.

The Payload Recovery Assessment measures watermark strength, including the degree of correlation between a synchronization component and a detected signal, and a measure of symbol errors in raw message estimates. One way to measure the symbol errors is to reconstruct the raw message sequence using the same error correction coding process of the embedder on the valid message extracted from the watermark. This process yields, for example, a string of 1000 binary symbols, which can be compared with the binary symbols estimated at the output of a spread spectrum demodulator. The stronger the agreement between the reconstructed and detected message, the stronger the watermark signal.

Figure 4:
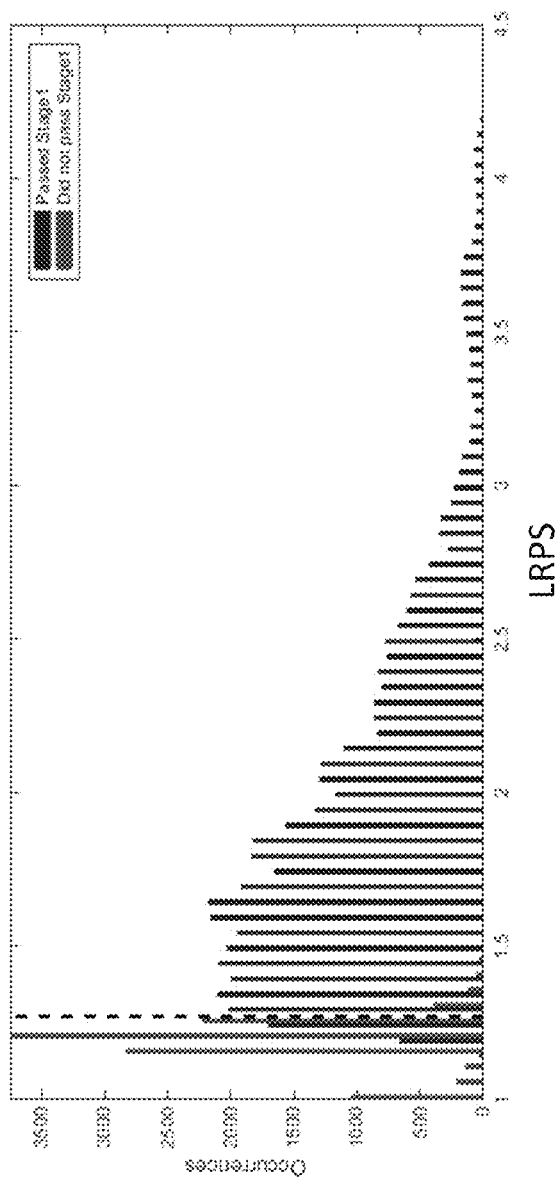
FIG. 4 is a histogram showing a detectability measure (linear reference pattern strength) in terms of detection stage passes.

Thanks to their small variance leading to easier predictability, Linear Reference Pattern Strength (LRPS) and the Message Strength (MS) are selected in a first example as detectability measures. These measures are first correlated with an actual watermark detector behavior. For example, LPRS is correlated with passing stage 1 (or "first stage") of a detection process. Here, as mentioned above, stage 1 includes a synchronization stage, where a reference pattern can be detected or correlated relative to a known reference pattern. FIG. 4 shows a histogram of LRPS values based on whether a watermark tile passed the first stage. The blue lines indicate scanned images having an LRPS that passed the first stage, and the red lines indicate scanned images having an LRPS that did not pass the first stage. A decision can be made to establish a threshold (vertical dashed line) indicating that the first stage threshold is passed if the LRPS is larger than a predetermined LRPS value. While this threshold need not be held completely, however, it greatly simplifies the criteria. For example purposes we set a strength threshold, T, of 1.27, so $T_{LRPS}=1.27$. Of course, the threshold can be moved up, e.g., 1.5 to ensure less false positives, or moved down, e.g., 1.1 if more false positives are acceptable.

Figure 5:
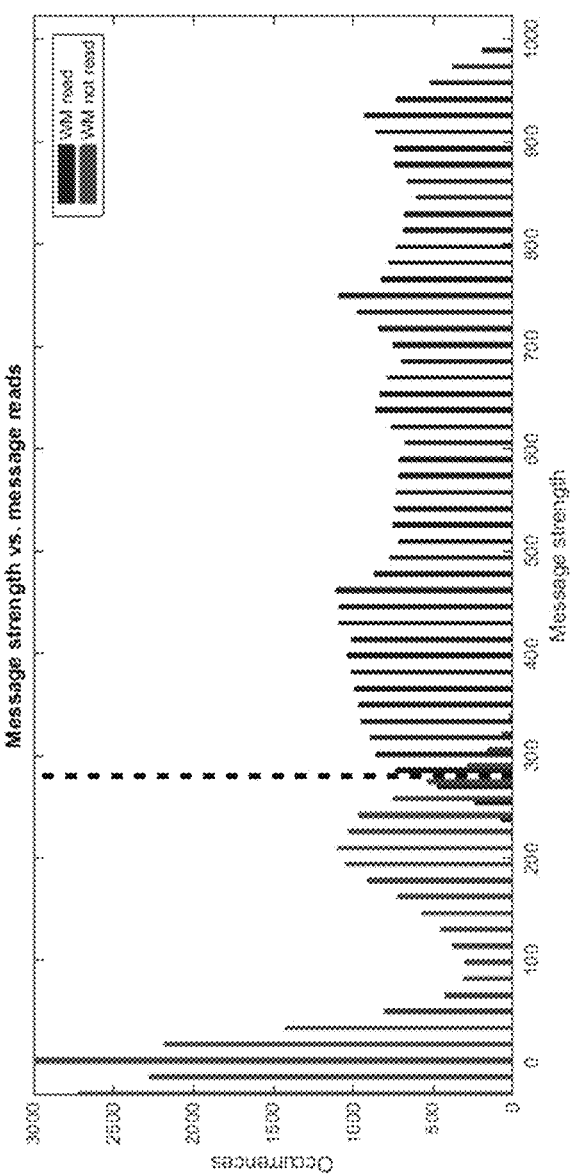
FIG. 5 is a histogram showing a detectability measure (message strength) in terms of successful watermark message reads.

FIG. 5 shows a histogram plot for Message Strength. Again, the blue lines represent those images with a certain Message Strength resulting in successful message reads, and the red lines represent those images with a certain Message Strength resulting in unsuccessful message reads. A strength threshold (vertical dashed line in FIG. 5) can be determined to represent when a watermark message is read. For example purposes we set of strength threshold, T, of 280 so $T_{MS}=280$. This value can change to accommodate more or less false positive tolerance.

Using this criteria for LRPS and MS, we can predict that a digital watermark is likely to be successfully read when:
1. LRPS>$T_{LPRS}$; and
2. MS>$T_{MS}$.

This is all fine and good for data that has been collected in a "design-print-image capture-detect" scenario. But, recall that we are interested in predicting how a digital image, once embedded with digital watermarking and before printing, will be detectable after printing. So how do we apply our above thresholds and detectability measures to a digital image, one that once watermarked will be used to guide printing, e.g., on physical product packaging?

One approach is to transform watermarked digital images so that the transformed, watermarked images correspond to what an image capture device sees, and to what a watermark detector ultimately analyzes when detecting a watermark from captured imagery. In a transformed, watermarked image case, we can extract the LRPS and MS statistics using a watermark detector on the transformed, watermarked digital image. Using these detectability measures and the thresholds discussed earlier, we can predict whether a digital watermark will be read once printed on a physical surface. We affectionately call these types of transformations an "attack," because they degrade the quality of a watermarked digital image.

One improvement is that the whole image pipeline (digital image→watermark embedding→print→color transform (e.g., with a red LED/laser)→image capture→watermark detect) need not be simulated during the attack. Rather, we introduce an attack that would make the LGS and MS statistics generally correspond to the statistics extracted directly from a scanned image.

For example, if we want to estimate robustness using a specific scanner, we can evaluate the attack by comparing the LRPS and MS determined on "attacked" watermarked digital images with the LRPS and MS obtained by printing the images, putting them in front of the scanner and taking image captures from the scanner (e.g., Datalogic's 9800i) for watermark detection.

One example attack for watermarked embedded digital images proceeds as follows. (While this example is geared toward a two-camera system like the Datalogic 9800i, it need not be so.)
  a. Add noise to the original digital artwork. Gaussian noise is one example. For a two camera system, noise standard deviation for the vertical camera is approximately 28, and for horizontal camera is approximately 22.
  b. For the horizontal camera, blur the digital image. This simulates a 30-50 degree pre-distortion and resampling. A 7×7 averaging kernel can be used for the blur.
  c. Down sample the image in a manner similar to watermark detection. For example, if a watermark detector down samples by 3, then the image can be convolved with a 3×3 averaging kernel and subsampling.
  d. For multiple in-plane (yaw) rotations obtain detectability measures.

Figure 6B:
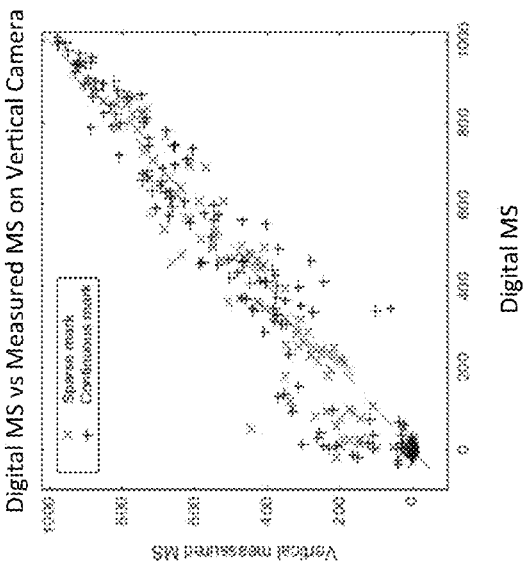
FIGS. 6A-6D are diagrams showing relationships between detected and predicted detectability measures.

Our initial watermarked, digital image test set was degraded according to the above attack. Referring to FIGS. 6A-6D, results from the images on x axis is the measures extracted from "attacked" digital images. On y axis is the measures extracted from printed/scanned captures of the same (but not attacked) embedded digital. The "x" marks correspond to the so-called "sparse" watermarking mentioned above, and the "+" marks correspond to watermarking introduces through changes in process colors, e.g., as discussed in assignee's US Published Patent Application No. US 2015-0156369 A1. Ideally, we want the values to be correlated, therefore, as close to diagonal as possible. FIGS. 6A and 6B show closely correlated values.

Figure 6D:
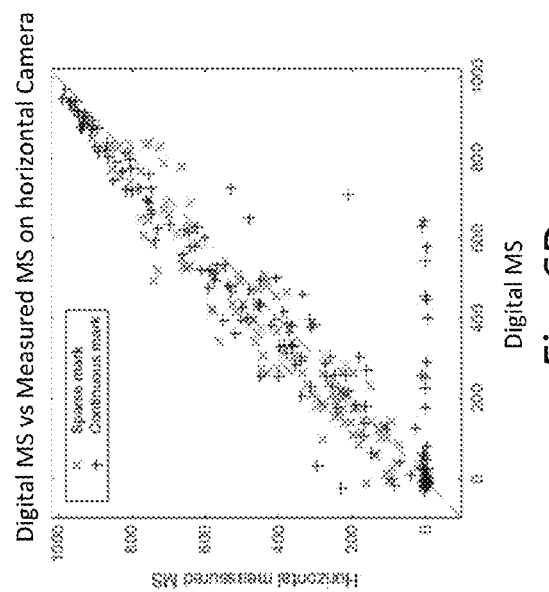
Figure 6A:
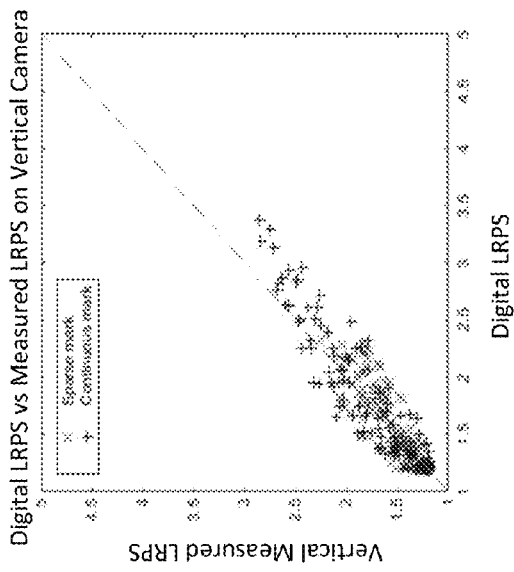
Figure 6C:
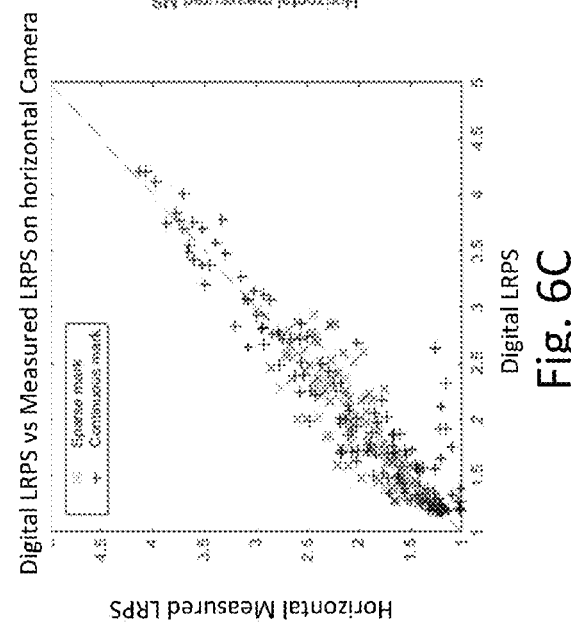

With reference to FIG. 6C and FIG. 6D, examples of wrong fits includes the "+" markers on the bottom of the horizontal camera attacks. We found that these data points correspond to very dark images which are unreadable using our test scanner. Thus, the simulated detectability measures are much higher than the captured ones. This is a result of our test scanner, and not of the attack.

Given a digital watermarked image, we can now attack it to obtain estimated LRPS and MS detectability measures. For example, after an attack, a digital watermark detector analyzes the attacked image and determines detection measures, e.g., on a per tile basis, throughout the image. We can simplify a detection prediction by saying that LRPS and MS measure must be larger than some threshold in order to detect. This can be written in probabilistic form as:

$$P(\text{detection})=P(\text{LRPS}>T_{LRPS})\cdot P(\text{MS}>T_{MS})$$

For simplification, and letting LRPS=LGS (just a different name) we can assume that the estimation error of LGS and MS follow a normal distribution N with zero mean and standard deviation measured from the plots above, $\sigma_{LGS}=0.3$, $\sigma_{MS}=100$ Finally, the probability of detection can be written as:

$$P(\widehat{LGS}, \widehat{MS}) =$$
$$P(lgs > T_{LGS}; lgs \sim \mathcal{N}(\widehat{LGS}, \sigma^2_{LGS})) \cdot P(ms > T_{MS}; ms \sim \mathcal{N}(\widehat{MS}, \sigma^2_{MS})) =$$
$$(1 - cdf(1.27; \widehat{LGS}, 0.3^2)) \cdot (1 - cdf(280; \widehat{MS}, 100^2))$$

With knowledge of the robot arm speed, the test image size and the watermark tile configuration, we can simulate a swipe path moving through the watermark tiles. By doing multiple simulations with different swipe starting locations, we can obtain the average swipe rate. Swipe rate is determined since printed product packages are often "swiped" in front of a camera during retail check out. So the camera (and watermark detector) sees a swath of imagery or a stripe of imagery across a package.

Probability of swipe detection using local read rates P($\widehat{LGS}^{(f,s)}, \widehat{MS}^{(f,s)}$) from frame f of swipe s:

$$P(\text{swipe } s) = 1 - \prod_{\text{frames } f \text{ in swipe } s} (1 - P(\widehat{LGS}^{(f,s)}, \widehat{MS}^{(f,s)}))$$

Final swipe detection rate is computed as an average over all (or a subset of all) simulated swipes s along a path, e.g., horizontal or vertical path or for an entire image.

Figure 7:
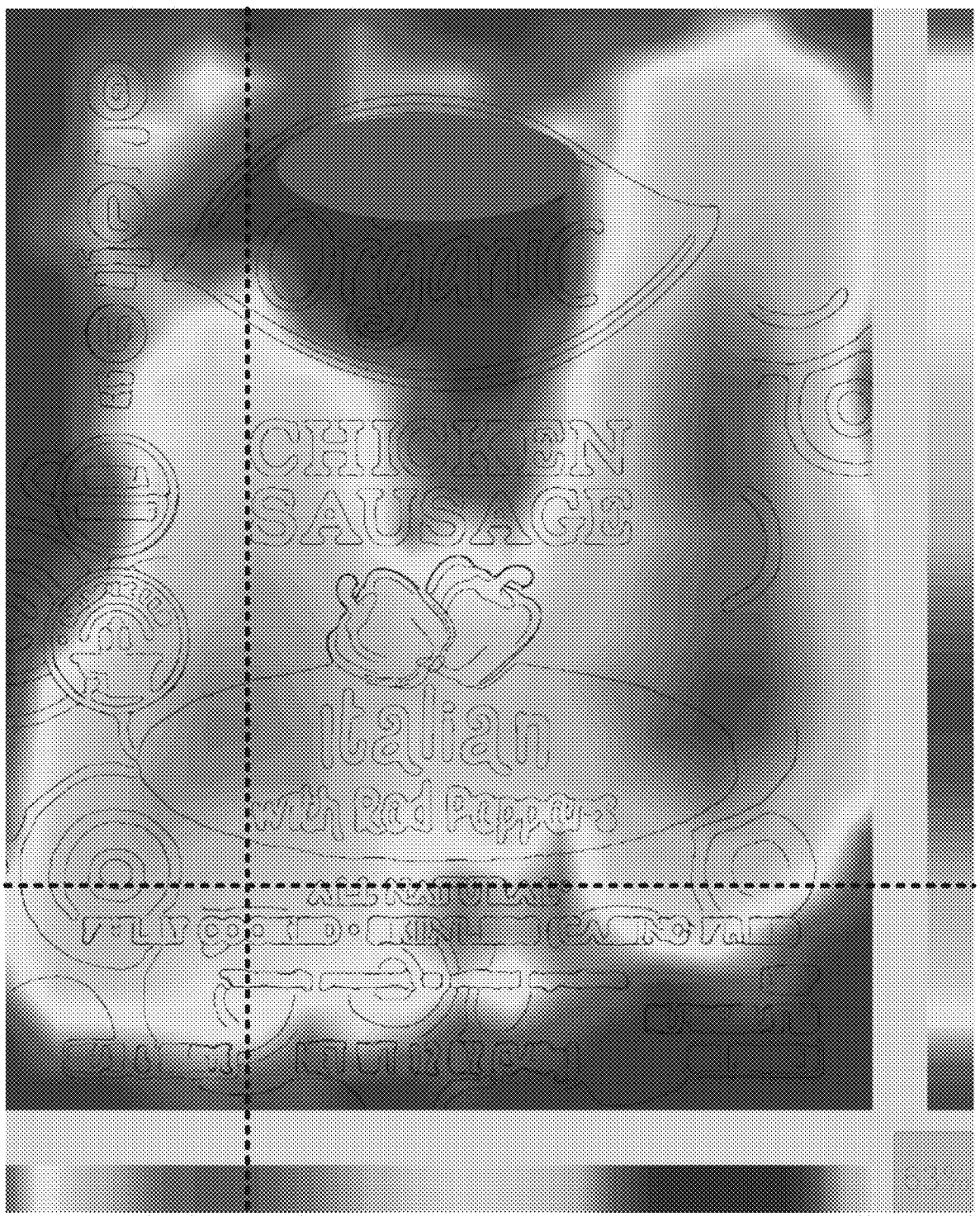
FIG. 7 is a heat map showing predicted watermark detection per area for an embedded digital image.

With reference to FIG. 7, after attack and watermark detection per tile or area, a heat map can be generated showing the overall probability of watermark detection for the image. That is, probabilities can be assigned color values, and the color values are shown in a spatial map form relative to the image. In FIG. 7, red areas are those having a low-gain or low probability of watermark detection once the digital image (watermarked, but without the attack) is printed, scanned and analyzed with a watermark detector. The blue areas are those having a high chance of detection from the printed digital image (watermarked, but without the attack). The scale moves through other colors between red and blue.

FIG. 7 also includes a horizontal and vertical color bar. The vertical bar shows swipe read probability if a swipe path is taken horizontally through the image. For example, at a particular location, the vertical color bar corresponds to a virtual swipe along the horizontal dashed line. (As discussed above, the probability of tiles along the path can be averaged to determine the overall path probability. Alternatively, extreme probabilities can be weighted or discounted depending on tolerances for a particular application.) Here, along the horizontal dashed path, its light blue, indicating a likely read. The horizontal color bar also shows the collective probability for a vertical swipe path (e.g., along the dashed vertical line). An overall score can be determined for the digital image (e.g., "63%" shown in the lower right hand corner of FIG. 7). A threshold can be set, e.g., somewhere between 60-90% (e.g., below 90%, or below 85%, or below 80%, or below 75%, or below 70% or below 65%, etc.) and any image falling below such threshold will be flagged for or automatically re-embedded, e.g., using a stronger embedding strength or different type of encoding protocol.

One or more graphical user interfaces (GUI) may be configured to control display of the heat map on a display screen, e.g., computer monitor, touchscreen display, smartphone display, OLED display, TV screen, projection, etc. The GUIs may be configurable to allow emphasis of embedded areas that have low-gain or high robustness. In other cases, the GUI allows a user to highlight areas for re-embedding, e.g., on a touchscreen display that a user may trace an area for re-embedding. The GUI keeps track of the trace and corresponds such to the digital image, which can be used as a mask for re-embedding digital watermarking.

III. Building in Margins for Printing Press Variations

At encoding time, we can provide an estimate of press sensitivity to build in an appropriate safety margin which would allow a Digimarc Barcode (DB) score to be maintained over the press run. DB scores are discussed in detail in our U.S. patent application Ser. No. 15/261,005, filed Sep. 9, 2016 and our U.S. Provisional Patent Application No. 62/438,886, filed Dec. 23, 2016, each of which are hereby incorporated herein by reference in its entirety. The DB score can be calculated for a certain wavelength. For example, a red LED Point of Sale (POS) scanner, is response to a spectrum at or around 660 nms. We use the term at or around 660 nm in this application to mean wavelength range having a spectral peak between 630 nm-690 nm.

Building in a reflectance tolerance at or around 660 nm will allow for a safety margin, e.g., if a press is not calibrated or cannot hold ink tolerances as expected.

A safety margin can depend on the following major press sensitivity factors:
1. Tolerance in at or around 660 nm for:
  a. Solid ink colors that contain encoded signal;
  b. Solid ink colors printed at same location as an encoded signal ink color; and
  c. Substrate (e.g., color of substrate).
2. Tolerance in Tone Value Increase (TVI) for above ink colors
  a. May include tolerance for minimum and maximum dot size/gain.
3. Tolerance in opacity of substrate at or around 660 nm (e.g., for flexo)

Figure 22A:
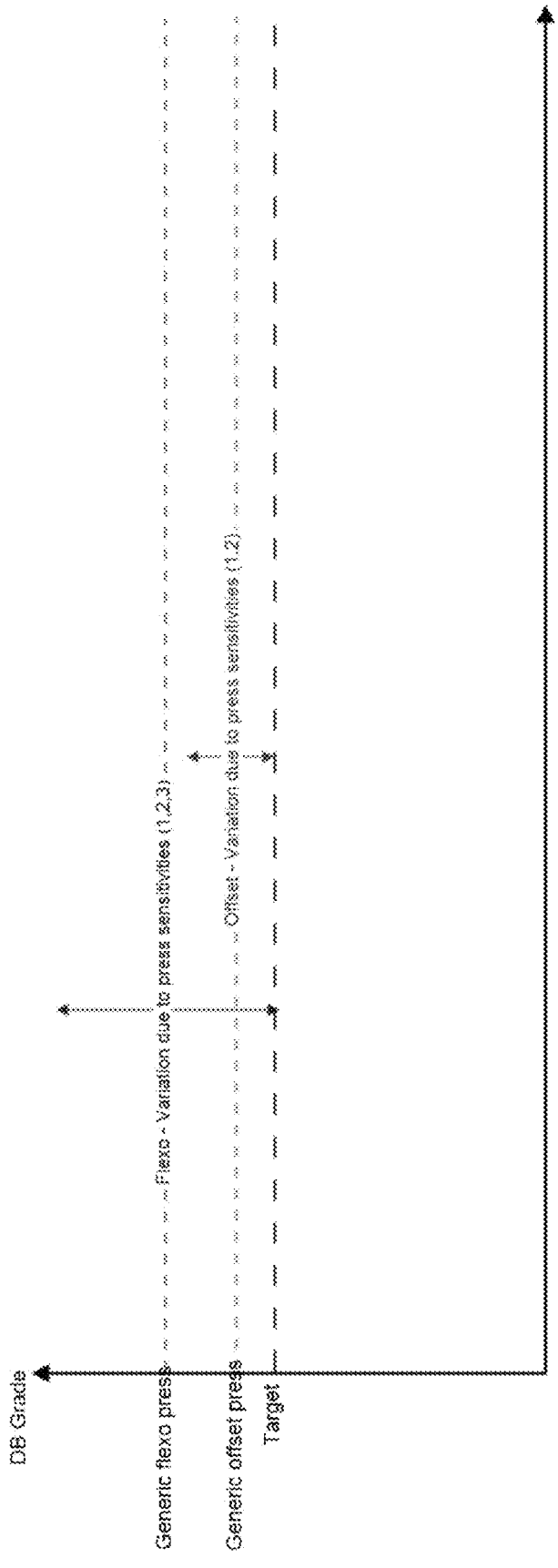
FIG. 22A is a graph showing various press tolerance.

The above factors may modify the reflectivity difference at or around 660 nm (Δ Reflectance at 660 nm, or "ΔR660"), which could change a DB score of a package or package side. (See our patent application Ser. Nos. 15/261,005 and 62/438,886 for additional details on ΔR660.) A relatively larger ΔR660 may increase both DB score and encoding visibility, whereas a relatively smaller ΔR660 may decrease both the DB score and visibility. Different tolerances are illustrated in FIG. 22A. There, additional margins may be beneficial for the above factor 1-3, for flexo printing, whereas a relatively lower margin may be beneficial for an offset press facing items 1 and 2, above.

A low tolerance means a smaller safety margin may be helpful, which results in a higher signal robustness at a relatively low visibility. A high tolerance means a larger safety margin may be helpful, which may yield about the same signal robustness at a higher visibility.

Figure 22B:
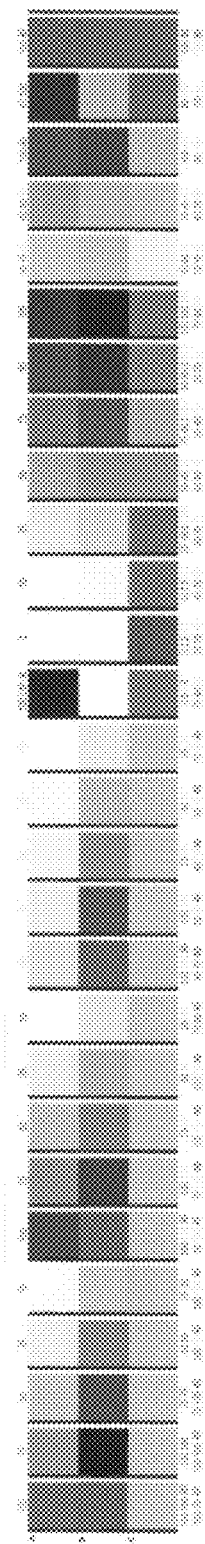
FIG. 22B shows a print control strip including encoded signal color carriers.

As a check on printing press tolerances, a tool can be used to evaluate so-called control strip data to ensure that the press is within the tolerance that was expected at embed time. A press operator checks (or an in-line system captures spectral information as sheets go by) that critical colors are being maintained within a tolerance requested by a designer or target robustness. We may include positive and negative tweak signal values for each color channel in the control strip area. See FIG. 22B. The positive and negative tweak are conveyed as a percentage of ink for that color, e.g., 100% ink value for a max tweak, and an 80-90% ink value for the min tweak. Every color channel that is carrying an encoded signal component is preferably printed on the control strip. A spectrophotometer (e.g., at a proof booth or inline on a press) can analyze these patches representing tweak values so that a ΔR660 can be calculated. Ink values can be adjusted if the ΔR660 for a given set of min/max tweaks falls below the threshold.

IV. Construction of Visual Maps Using Robustness as a Mask

A heat map or robustness map (e.g., as shown in FIG. 7) can be used as an image mask to visually evidence digital watermark robustness or detectability throughout an image.

Figure 9A:
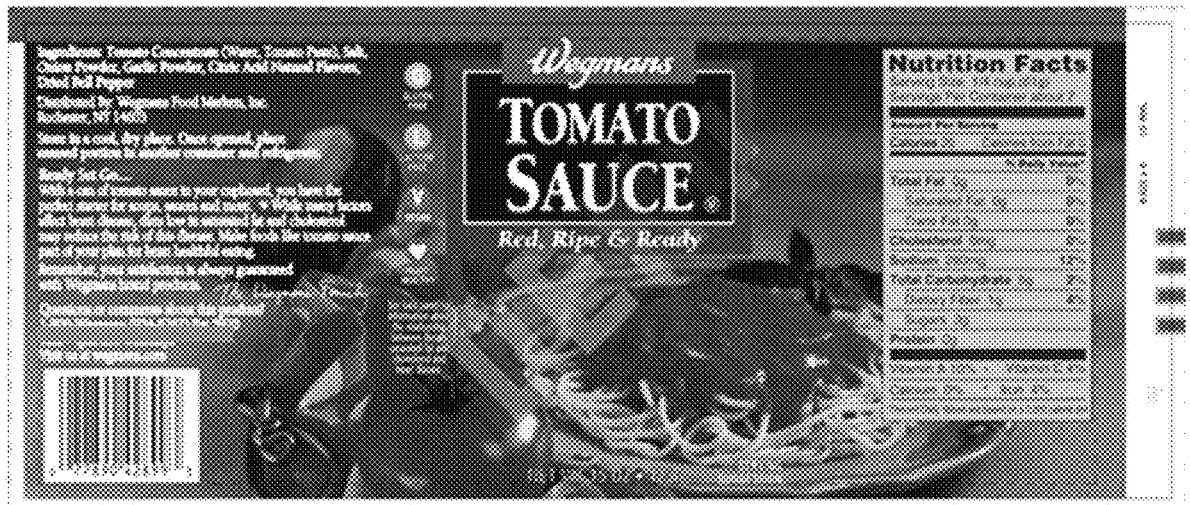
FIG. 9A shows a watermarked image.
Figure 9B:
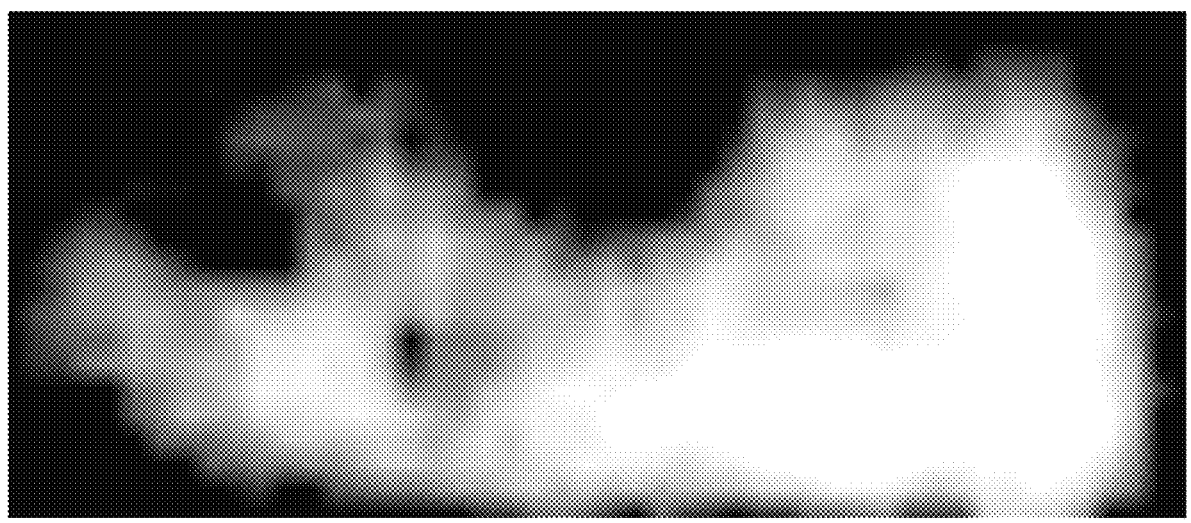
FIG. 9B show a corresponding robustness map of the watermarked image in FIG. 9A.

For example, consider the image shown in FIG. 9A. This particular image represents a product package design, e.g., for delicious Tomato Sauce. The illustrated design includes digital watermarking embedded therein. The watermarked design can be analyzed, e.g., as discussed above in Section II, to determine watermark signal detectability.

A robustness map can be generated corresponding to the detectability results. For example, and with reference to FIG. 9B, a robustness map can be generated to show areas having relatively stronger detectability. In this case (unlike FIG. 7), the white areas show those areas having sufficient detectability, e.g., based on a threshold or relative to other image areas having lower detectability (e.g., shown in black color in FIG. 9B). In particular, the white areas may indicate a high probability of the digital watermarking being read by a red LED Point of Sale scanner, whereas dark areas may indicate low probability of the watermark being read by the red LED scanner. Assignee's U.S. patent application Ser. No. 14/616,686 (issued as U.S. Pat. No. 9,380,186), which are both incorporated herein by reference in their entireties, discuss various spectral characteristics of typical red LED scanners.

One illustrative process operates on a watermarked image (e.g., FIG. 9A) and its corresponding robustness map (e.g., 9B). The following steps can be performed in image editing and design suites, e.g., Adobe's Photoshop or Illustrator, etc. Of course, these steps can be automated with software code, scripts, functions, circuitry and/or modules.

Figure 12:
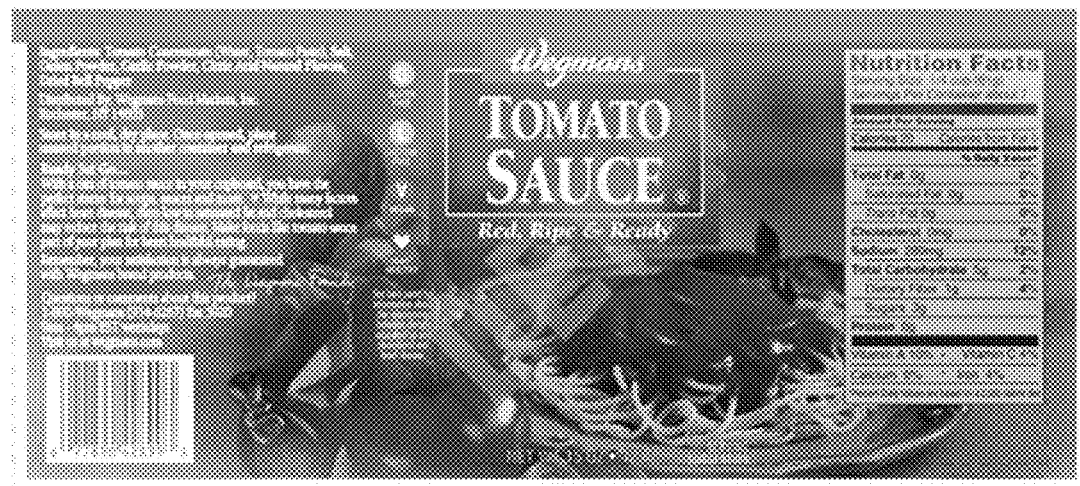
FIG. 12 shows a robustness image where color indicates higher probability of digital watermarking being read and grey indicates a lower probability of the digital watermarking being read.

1. Convert the original digital watermarked image in FIG. 9A to greyscale.
2. Modify the greyscale image's opacity to some percentage less than 100%, e.g., to between 20% and 95%, to between 40% and 80%, to between 50% and 70 percent, etc.
3. Overlay the modified greyscale image onto a white (or lightly colored) background. (FIG. 10 shows a greyscale version of FIG. 9A with 50% opacity overlaid onto a white background.)
4. Mask the original embedded image using a robustness map indicating the robustness of the digital watermarking at each pixel, groups of pixels or image areas in the original image. FIG. 11 shows a result of the original watermarked image FIG. 9A masked using the FIG. 9B robustness map. The resulting white areas in FIG. 11 correspond to the black areas in FIG. 9B, e.g., those have low or no watermark robustness.
5. Overlay the masked image (e.g., FIG. 11) on top of the modified greyscale image (FIG. 10). FIG. 12 shows the result of this overlaying. This final robustness image (or "signal detection map") indicates those areas having a high probability of digital watermark detection in original design color and indicates in grey those areas having a low (or relatively lower) probability of the digital watermark detection.

Such a result (e.g., FIG. 12) provides a designer with a practical and visual example of how a package will be machine-read, including a more realistic design presentation compared, e.g., to the FIG. 7 heat map. Thus, this signal detection map (FIG. 12) is helpful to see where the digital watermark is strong (by showing the original design color) and where it is weak (shown in grey or other color); and it also allows inspection of modification artifacts (e.g., signal embedding artifacts) to be assessed directly on signal detection map itself.

Figure 13:
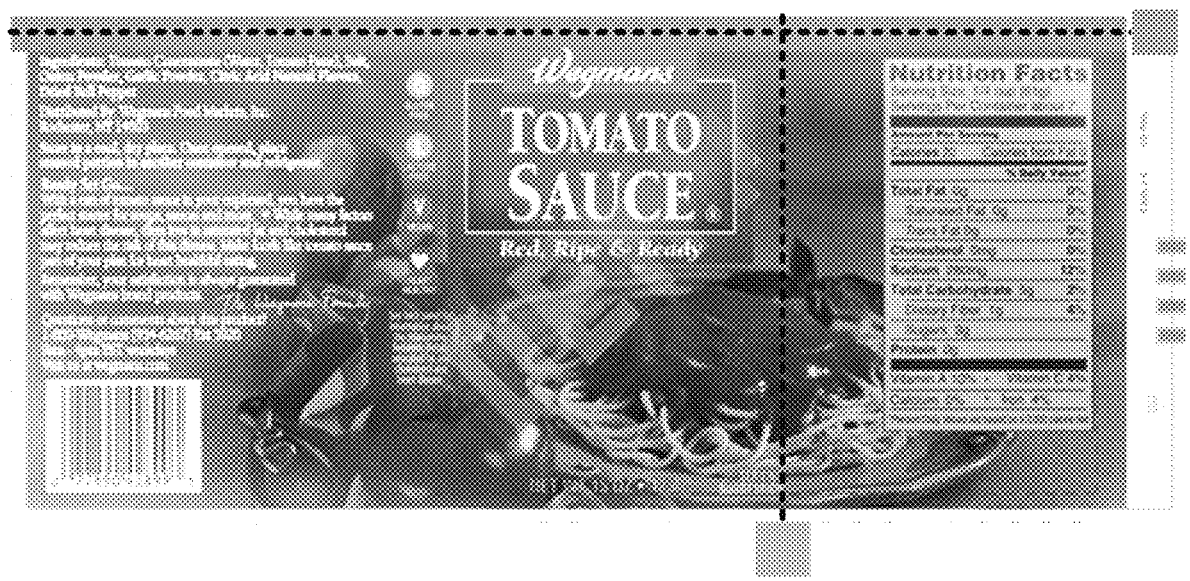
FIG. 13 shows the robustness image of FIG. 12 including horizontal and vertical swipe probabilities.

In some implementations, we add a swipe component to the FIG. 12 final robustness image. That is, we provide horizontal and vertical swipe information (like in FIG. 7) to allow a designer a fuller picture of how the digital watermarking will be read by a scanner. For example, FIG. 13 shows horizontal (grey result) and vertical (color result) swipe information. The resulting swipe information can, e.g., keep with the final robustness image color scheme (e.g., grey for hard to read areas and original color for detectable areas). Or the resulting swiping information can be a totally different color, e.g., red for stop, no good; and green for good to go, etc.

While we have used specific colors to represent various results (e.g., original color=robustness, grey=no or less robustness) other colors can be used instead. For example, white or black can be used for low/no robustness areas.

V. Detecting Multiple Different Codes within Imagery, and Control Icons to Identify Printing Plate/Color Separation Mismatches The presence of multiple, different encoded signals (e.g., steganographic codes, barcodes, etc.) in imagery can sometimes create havoc, e.g., in the retail packaging space where a consumer is typically charged according to the presence of a code. Take an easy example of a 2 different 1D barcodes printed on a box of cereal, with the first 1D barcode corresponding to a box of "Sugar O's" and the second 1D barcode corresponding to a box of "Honey Sugar O's". A consumer at checkout could be charged twice (once for a box of Sugar O's and another for a box of Honey Sugar O's) if both of the 1D barcodes are scanned, even though the consumer only intended to purchase 1 box of cereal. The consumer gets charged twice, and a retail store's inventory management system now has erroneous information.

Now consider some progressively harder examples. In a first case, a box of cereal includes an encoded signal redundantly covering some or a majority of the surface area of a box of cereal. Each instance of the encoded signal carries a payload, e.g., UPC payload 1. Examples of encoded signals may include, e.g., steganographic encoding or digital watermarking, or some other encoding scheme. The cereal box also includes a 1D UPC barcode. The 1D UPC barcode also carries UPC payload 1. No disagreement between the 1D UPC barcode code and the encoded signal code, so the consumer is only charged once. (See, e.g., assignee's U.S. Provisional Patent Application No. 62/322,193, filed Apr. 13, 2016, which is hereby incorporated herein by reference in its entirety, for related solutions for conflicting/similar codes including wait times between decoded codes.)

In a second case, each instance of the encoded signal carries the same payload as above, UPC payload 1. The UPC 1D barcode, however, is different and conveys UPC payload 2. Here, a conflict exists and a retailer runs the risk of charging a customer twice. Moreover, the conflict between encoded signal and the 1D barcode may indicate a larger problem, e.g., a manufacturing issue such as mislabeling or a wrong product altogether.

In a third case, various different encoded signals are provided on the package, with a first encoded signal including UPC payload 1, and a second encoded signal including UPC payload 2. A conflict results here again.

It's imperative that such conflicts are discovered early in the design process, preferably before printing and distribution.

Let's look at a typical workflow for a product package. For example, a workflow may include one or more of the following steps:

1) Receive digital package files from, e.g., via a secure FTP.

2) Pre-Flight to determine that we have all info. Pre-flight is a term used to describe a preliminary step that evaluates received information, and may include reformatting, decompressing files, and an overall evaluation whether the received digital page files can be assembled into a printable package. Package artwork is typically represented by a collection of files in a variety of different formats e.g., Bitmaps (*.tiff, *.psd, etc.), vector imagery (*.ps, *.ai, etc.), and fonts (*.abf, *.ttf, etc.). A final rendered packaged can be "built" using the aforementioned files using a variety of different strategies, from a 1-layer bitmap to numerous layers of vector and bitmap imagery utilizing multiple fonts.

3) Enter Package/Retailer/Printer/Supplier in CRM system, e.g., Microsoft Dynamics CRM (not shown). Optionally, the materials may include an XML file which can be used to automatically enter the information. In this case, a manual check will help ensure accuracy.

4) Assign to Teams. For example, different tasks can be assigned to different work stations, or to available operators. An operator queue can be examined to determine availability.

5) Create an identity file in an identity management system (e.g., housed in the cloud) and associate the GTIN. The creation and management of these services can be accomplished through a web-portal to the identity management system or programmatically through Web APIs. If the packaging materials includes a 1D barcode number, e.g., in a GTIN format, this information can be obtained and provided as used as the encoded signal payload or part of a payload, or to a storage location at which an encoded signal payload will point to.

6) Review Files—Different Classifications. These classification may include assignment of package embedding difficultly. This may prompt additional resources or billing requirements.

7) Print-out Initial Client Proof.

8) Embed encoded signal.

9) Print Watermarked Proof

10) Test on POS Scanner. This is a preliminary test to see if the proof will read.

11) Assemble Package for Manual Test

12) Manual Test. This can be a detailed process, where each package face is tested, e.g., at different reading angles. For example, each side is tested on a POS scanner with a vertical camera and a horizontal camera. The package is passed over the scanner, e.g., 2, 4 or 8 times per side and then number of reads is recorded. The side is rotated, e.g., 90 degrees and the process is repeated for that side, rotated again and retested, etc. Each package side can be so tested and the results recorded. A grade can be assigned based on successful reads. Of course, the process is benefited from automation where a package is passed in front of a scanner, e.g., with a robot arm, conveyor belt or some other movement mechanism.

13) Complete QC Checklist 13a) compare results of digital grade and manual grade; decide whether to accept or refine embedded package.

14) Send Approved file to Customer or Printer via FTP

15) At the Printer, enter file into system (e.g., ESKO Packaging Management software, provided by ESKO, with offices worldwide including in Miamisburg, Ohio 45342 (USA)).

16) Various ink and printing pre-checks.

17) Ready the file for printing plate manufacture, including allowing the client or pre-press designer a final review (e.g., 1-bit .tif file) review. Approval or change request received.

18) Plate manufacture (e.g., for an offset press) based on the design file.

19) Print run—print the design file.

So how do code conflicts surface? For example, in step 5 an encoded signal preferable duplicates a provided GTIN payload from a 1D barcode.

A few sources of conflicts may include, e.g., operator error (erroneous data entry), using the wrong 1D barcode file, etc. At the printing press stage (e.g., steps 15-19), product design families may be associated in a packaging management system. A product design family may include, e.g., a line of dish soap which includes related designs, with some design elements being identical and others being unique. For example, the background across the family designs may include a design element in a Cyan color channel that doesn't change from family member to family member. Yet, each family member may include other design elements that are unique (e.g., color changes to reflect dish soap fragrance). In this dish soap example, the printer may realize an advantage by reusing the common Cyan element printing plate across the entire family. If the common plate is manufactured based on a first design file, with a first encoded signal represented in the first design file, then each package printed with this plate will include the first encoded signal in the common plate area (e.g., background). But if each family member includes a unique GTIN to represent that it's a different product than the family, and other printing plates are manufactured for these unique design elements and unique GTIN, each family member will also include different encoded signals. So a package printed with the common Cyan plate (including the $1^{st}$ encoded signal) and a unique family plate (e.g., including a $2^{nd}$ encoded signal) will have at least two conflicting codes printed thereon.

If these types of code conflict problems are discovered after printing, the printer or customer may lose tens of thousands of dollars, if not more.

We have developed a "scanner verifier" to help catch such potential code conflicts before printing plate manufacture, or before complete print press runs. Thus, the scanner verifier can be used prior to printing plate manufacture (e.g., just prior to step 18, above) or as or after the first sheets start rolling off the presses in step 19.

The scanner verifier preferably includes a plurality of code detectors. For example, it may include a signal decoder, e.g., as discussed relative to FIGS. 15 and 18 and a barcode decoder, e.g., a 1D and/or 2D barcode decoder.

Suitable 1D and 2D barcode decoders include, e.g., the open source ZXing ("Zebra Crossing") barcode project. Of course, other 1D and/or 2D barcode decoders could be used instead. The ZXing barcode decoders support 1D product codes (UPC-A, UPC-E, EAN-8 and EAN-13), 1D industrial codes (e.g., Code 39, Codabar, etc.) and 2D codes (e.g., QR Code, Data Matrix, etc.). The ZXing source code can be obtained at https://github.com/zxing/zxing/releases. The ZXing decoder is configured to accept scanline data. (A scanline includes a row of image data, e.g., pixel values or binarizied versions of the pixel values.) How the scanlines are generated, however, is left to the implementation.

The scanner verifier also preferably includes a code comparator and a display generator.

Figures 21A, 21B:
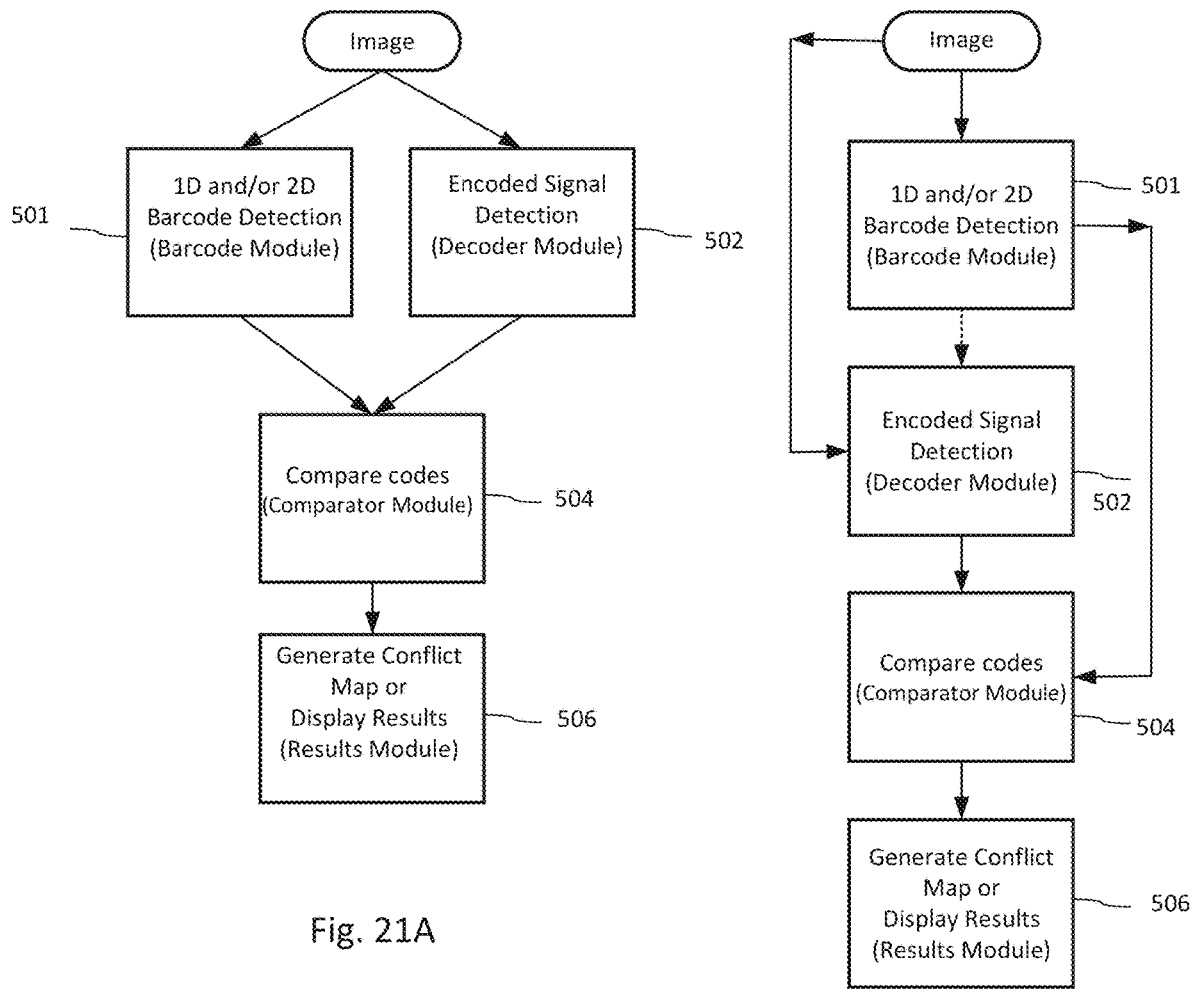
FIGS. 21A and 21B are block diagrams for code conflict detectors.

A scanner verifier is discussed further with reference to FIGS. 21A and 21B, where an image, e.g., from a design file or from a scanner (e.g., a scanned sheet from a print run) is analyzed in parallel (FIG. 21A) or in series (FIG. 21B). A barcode module 501 analyzes the image to determine whether it contains a barcode, and if so, decodes the barcode and provides the barcode's payload (e.g., representing a GTIN number) to a comparator module 504. Barcode module 501 will also determine whether the image includes two or more barcodes (e.g., a 1D and a 2D barcode). Each of the barcode's payloads can be provided if found, optionally along with a spatial image location of the barcode(s). The image is also analyzed by a Decoder Module 502 (also called a "Decoder" in this Section IV) to detect and decode encoded signals. For example, the Decoder Module 502 can be configured as a steganographic or watermark decoder. The Decoder Module 502 outputs a decoded code (e.g., representing a GTIN number), optionally along with a spatial image location for each decoded code, to the Comparator Module 504. The Comparator Module 504 compares payloads from both the Barcode Module 501 and the Decoder Module 502, to see if they match and/or whether there are any code conflicts. The Comparator Module 504 can be configured to compare plural codes from each of the Barcode Module 501 (e.g., compare a 1D with a 2D code) and the Decoder Module 502 (e.g., compare a $1^{st}$ decoded signal and a $2^{nd}$ decoded signal), and between all codes regardless of decoder source.

The Comparator Module 504 can output the codes and one or more conflict indicators for display or for a report. The conflict indicators can indicate, e.g., no conflict or information regarding the code conflicts.

Results Module 506 can create information for a graphical user interface for display. Different colors, boxing and/or highlighting can be used to show results of the conflict comparison.

Returning to the Barcode Module 501, scanlines are provided from data representing the image for 1D barcode analysis. For example, data representing the image may include a greyscale or binarizied version of the image. Scanline production and management may be controlled by a Barcode Module 501 sub-module or a different module altogether (a "scanline generator module"). The scanlines typically represent 1 or more pixel row(s) of image data. In some cases, we combine adjacent (top and bottom) scanlines together (e.g., with an AND function) to form a single scanline. A scanline's length can vary, e.g., in one implementation the scanlines are 4 inches long. This means that for a 300 dpi image, a single scan line will contain 1200 pixels. In some cases the scanlines can be overlapped, e.g., 25-75%. For example, a first scanline from a first image row is four inches long and starts at point (0",0"), with the top left corner of the image being the origin, and ends at (4",0"). The $2^{nd}$ scanline starts at (1", 0") and runs to (5", 0") and so on. If reading a horizontal barcode, the scanline generator module can provide scanlines along the first image pixel row, then skip down the image if no barcode is found. For example, the next scanline may be 10, 20 or 50 rows down the image. The scanline generator module can continue to skip down the image until a barcode is read, or until it reaches the bottom of the image.

If the Barcode Module 501 detects and decodes a barcode from a particular scanline, the scanline generator module preferably provides scanlines from the next n number of rows (n being an integer) below the successfully read scanline. For example, scanlines from the next 3 rows, 5 rows, 10 rows or 20 rows are analyzed to get a read. The Barcode Module 501 can be configured to only output a code if all of the n scanlines (or a predetermined subset of the n scanlines) also generate the same code.

The scanline generator module can also be configured to provide vertical scanlines by using image columns instead of rows. This will help find a barcode that may be rotated at a 90 degree angle within the imagery. Additionally, off-axis (e.g., 45 degree) scanlines can be generated and provided to the Barcode Module 501 for analysis.

Returning to the Decoder Module 502 (also referred to as "Decoder"), the Decoder can be configured to analyze multiple different color separations (or planes) from the image. For example, the image may include Red (R), Green (G), Blue (B) separations or may include Cyan (C), Magenta (M), Yellow (Y), Black (K) separations. The image may also include Spot Color 1 and Spot Color 2, etc. The Decoder can be configured to analyze each of these separations separately looking for encoded signals. In some cases, separations can be combined, perhaps with various weights, to represent, e.g., chrominance (e.g., R-G; or 0.5R-0.5G) or Luminance (e.g., R+G+B; or 0.2126*Rlinear+0.7152*Glinear+ 0.0722*Blinear, for Luminance (Y linear) in the sRGB specification). The Decoder can then analyze the Chrominance and Luminance channels in search of encoded signals.

Figure 19A:
FIG. 19A shows an image segmented into blocks for decoder analysis.
Figure 19B:
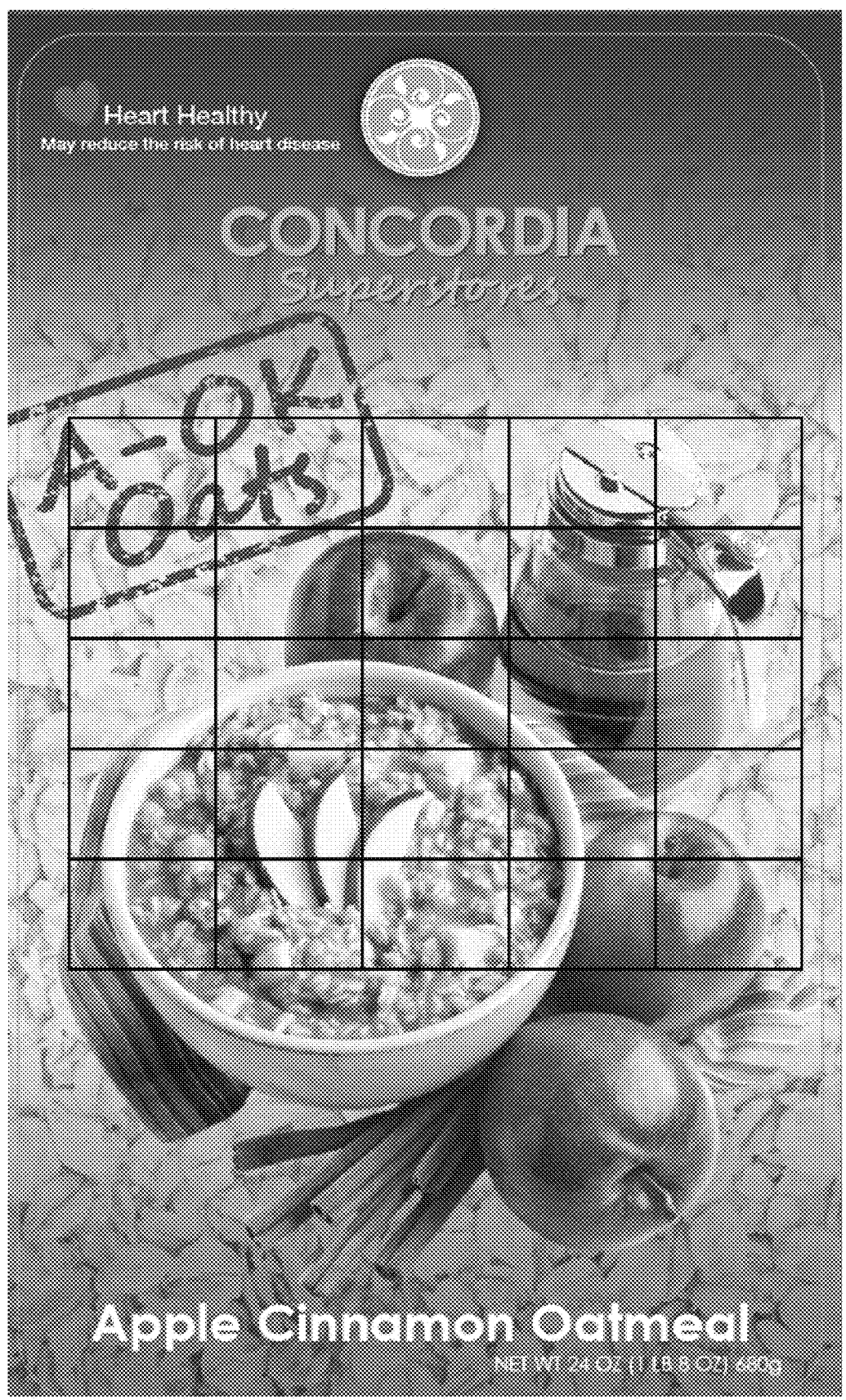
FIG. 19B shows the FIG. 19A image including a smaller blocked area for decoder analysis.

In one implementation, the Decoder is configured to analyze image blocks or tiles. With reference to FIG. 19A, an image is segmented into blocks, e.g., 512×512 or 128× 128 pixel blocks. (The Decoder may down-sample (or up-sample) the blocks to achieve a native encoded signal resolution. For example, a 512×512 block may be down-sampled to a 128×128 block or tile.) While we prefer to block out the entire image as in FIG. 19A, in some cases only a portion of the image is blocked out (FIG. 19B). These blocks can be used for all separations in the image, e.g., the Yellow separation is blocked in the same manner as the Magenta and Cyan separations, etc. In alternative implementations, each separation or groups of separations are blocked separately.

Each block (or a subset of blocks) from each separation can be analyzed by the Decoder to determine whether that block contains an encoded signal code and, if so, may associate the code with a particular block or image spatial area. For example, the blocks can be numbered, tracked or assigned to a spatial location within the image. The code can be assigned to the numbered, tracked or assigned block from which it was decoded, or otherwise assigned to an image spatial area. For example, and with reference to FIG. 19C, the Decoder operates on blocks from one separation (e.g., Magenta or Chrominance) from the FIG. 19B drawing, and may assign decoded codes to spatially oriented blocks. In all likelihood, the results will be stored in a table or memory structure, along with some spatial indicator. (Of course, the Decoder could operate on all image blocks instead, e.g., as from FIG. 19A.) In this example, an encoded signal (ES1) is detected in the majority of blocks as shown in FIG. 19C. The Decoder did not find an encoded signal in three (3) of the blocks, nos. 8, 17 and 19, so these blocks are illustrated as empty. (The Comparator Module 504 would not find a code conflict in this FIG. 19C separation since all of the decoded codes include the same code ES1, e.g., which may correspond to a GTIN number.)

With reference to FIG. 19D, the Decoder operates on another image FIG. 19B separation (e.g., Cyan or Luminance). An encoded signal (ES1) is detected and decoded in the majority blocks, but a second encoded signal (ES2) is detected and decoded in two (2) blocks, e.g., block nos. 14 and 19. No encoded signal is found in two (2) of the blocks, nos. 8 and 17, and are illustrated as empty. (The Comparator Module 504 would find a code conflict within this separation since two different codes, ES1 and ES2, are decoded. Additionally, the Comparator Module 504 may indicate a conflict between the two separations, the first having an ES1 in block 14, while the second has an ES2 in block 14.) The Decoder can operate in the same manner on all separations and channels associated with the image.

Figure 19E:
FIG. 19E represents the FIG. 19D instance, relative to a 1D barcode comparison.

With reference to FIG. 19E, the Comparator Module 504 can be configured to compare each of the decoded codes (e.g., ES1 and ES2, from all separations) with any associated 1D and/or 2D barcode codes. For example, in the illustrated example, a 1D barcode is recognized and decoded by the Barcode Module 501, and the results are provided to the Comparator Module 504. The 1D barcode's code carries the same ES1 code in this example. The Comparator Module 504 notes a conflict in blocks 14 and 19, since those blocks (in various separations) include an ES2 code that is different than the 1D barcode's ES1 code. This conflict can be noted and reported to the Display Module 506.

The Display Module 506 may be configured to provide output such as a "conflict map." The conflict map may include, e.g., a report, color information, information for spatial display, or highlights for those image areas including a conflict. Display Module 506 output can be provided to a display screen. A conflict map can be shown by boxing or highlighting the relevant image blocks. In some cases, a text overlay is provided in the blocks' relative spatial position in the imagery noting the ES2 code or other text indicating a conflict. In still other cases, the conflict boxes are shown with an opaque overlay, or in gray instead of in color. Non-conflicting blocks, e.g., those blocks corresponding to the 1D barcode's code, can be shown in original image colors, and/or with text overlays (e.g., indicating an "OK" or "√" symbol or text showing the ES1 code). The text overlays can be color-coded to indicate "all clear" (e.g., green) or "conflict" areas (e.g., red).

Now with reference to FIG. 20B, the Display Module 506 may be configured to control display of additional and/or alternative information. The information can be displayed on a display such as a computer monitor, touchscreen display, smart phone screen, TV monitor, etc. The Decoder Module 502 operates on all separations for the image blocks noted in FIG. 20A. In the illustrated example, the Decoder Module 502 decodes two different encoded signal codes, ES3 and ES4. No codes are found in blocks 1, 3, 9, 18 and 19, so these blocks are illustrated as being empty. The ES3 codes are only found in blocks 2, 4, 7 and 12, whereas the ES4 code is found in various other image areas. The Barcode Module 501 determines that the image includes a 1D barcode in block 15 carrying an ES4 code, and a QR code in block 25 carrying a similar but different code relative to the ES4.

The Comparator Module 504 is configured in this example so that conflicts between the 1D barcode (carrying an ES4) and any other codes are flagged. So a conflict is noted for block nos. 2, 4, 7, 12 and 25. This information can be provided to the Display Module 506, which can create a conflict map, e.g., an overlay of different colors (as in FIG. 20B) for the conflicting areas, perhaps relative to the original image shown in FIG. 20A. Instead of overlaying colors, the respective areas may be displayed or highlighted with a graphic box, highlighting, colored shape or outline. In some cases the empty areas (e.g., those areas including no codes) are represented on a display as a grey or grayscale. This shows that no encoded signal (or an encoded signal with a low signal strength as discussed above in Sections II and III) was found in the respective image areas. Additionally, the robustness maps discussed above can be combined with a conflict display map. This will provide a complete picture for a printer or designer, e.g., showing robustness levels (perhaps with swipe information) and any code conflicts.

Graphical text boxes (and corresponding different colors) 27 can be provided by Display Module 506, or included as part of a conflict map, for display on a display screen. For example, the UPC and ES4 codes are shown in yellow since they have matching codes, while the ES3 and the QR codes are shown in different colors since they both conflict with the 1D barcode's code and with each other.

FIG. 20B can be viewed as a conflict map or information supporting a conflict map. The map may reveal information about conflicting separations. For example, the ES3 code corresponds spatially with the castle and sundial in FIG. 20A. This may give a proofer or printer an idea of where the conflict originated. For example, the Valiant Heavy Duty Hand Soap may belong to a family of soaps, each of which includes the castle and sundial in the design. The different code (ES3) may have resulted since the castle and sundial were pulled from a different family member and used in this case. Thus, a conflict map may be used to find origins of conflicting codes.

Of course, the functionality of the various modules in FIGS. 21A and 21B can be combined into one or more modules, including one or more sub-modules. For example, the Comparator Module 504 and the Results Module 506 can be combined into a single module, as can the Barcode Module 501, Decoder Module 502 and Comparator module 504.

Let's return to the above discussion regarding product design families. A product design family may include, e.g., a line of dish soap which includes related designs, with some design elements being identical and others being unique. For example, a background across the family designs may include a design element in a Cyan color channel that doesn't change from family member to family member. Yet, each family member may include other design elements that are unique (e.g., color changes to reflect dish soap fragrance). In the above dish soap example, a printing house or print operator may realize an advantage by reusing the common Cyan design element printing plate across the entire family. If the common plate is manufactured based on a first design file, with a first ($1^{st}$) encoded signal represented in the first design file, then each package printed with this plate will include the first encoded signal in the common plate area (e.g., background). But if each family member includes a unique GTIN to represent that it's unique from the family, and other printing plates are manufactured for these unique design elements and unique GTIN, each family member will include different encoded signals, e.g., a second ($2^{nd}$) encoded signal. So a package printed with the common Cyan plate (including the $1^{st}$ encoded signal) and a unique family plate (e.g., including the $2^{nd}$ encoded signal) will have at least two conflicting codes printed thereon ($1^{st}$ and $2^{nd}$ encoded signals). The same result could happen if a graphics designer uses a common color layer across a digital design file, and a unique family color layer for different family members. This may result in a color layer misuse or reuse.

We've developed additional methods and systems to help identify such printing plate or design layer reuse and/or misuse.

Consider a family of products including, e.g., four (4) family members. Staying with the dish soap theme, family member no. 1 may correspond to a soap with a first fragrance, family member no. 2 may correspond to a soap with a second fragrance (or color), family member no. 3 may correspond to a soap with added Aloe Vera, and family member no. 4 may correspond to a soap that is hypoallergenic. Each of these 4 products have a common design elements, e.g., occurring in the Cyan color channel, but each also has unique features that are represented in one or more different color channels.

We describe now a verification icon or logo as a visual and, at times, machine-readable, clue that the correct printing plates are used, and that one (1) or more printing plates or design layers were not reused from a different family member. We sometimes refer to the verification icon or logo as an "icon and logo" or "logo and icon" and singularly as an "icon" or "logo" or "control icon". With reference to FIG. 23A, each family member is assigned a unique orientation of the icon or logo. Each printing plate has a design element (e.g., a triangle) that is orientated in the same direction as the other printing plates. So the Cyan plate, the Magenta plate, the Yellow plate and the Black plate (and any other colors plates, e.g., green plates in FIG. 23A) all have triangles oriented in the same direction. For example, family member no. 1 is assigned a zero (0) degree orientation, no. 2 is assigned a 270 degree orientation, no. 3 is assigned a 180 degree orientation, and no. 4 is assigned a 90 degree orientation. (Of course, many additional orientations could be provided if additional family members are in the family, e.g., at the 45 degree angles, or more every, e.g., 15, 20, 22.5, or 30 degrees.) In some cases, each family member will have one or more unique color plates.

The verification icon or logo is printed in a printable area on the product packaging. It may be included as part of the overall package design, e.g., in a relatively small print area near (e.g., 5-200 pixels, 0.25"×0.25" or in a range of 0.125"-0.5" per side) a printed 1D or 2D barcode. Preferably, however, the icon or logo is provided outside in a final trim area, e.g., near a print control strip area. The verification icon or logo can be a visual (and machine-readable) tool indicating that the correct printing plates for a particular family member are used on a printed design.

If one or more plates (or design layers) were reused, or otherwise are not associated with this family member, an icon or logo will have some design element that are not oriented with the other design elements. So, if the icon or logo has one or more design elements (e.g., triangles, bars, blocks, circles, polygons, etc.) that are not in the same alignment or orientation, the print can be flagged as having a potential problem. Referring back to FIG. 23A, the lower portion of the figure shows example of printing plate mismatches. The plate under the family member no. 2 shows the expected orientation for the black and green(s) printing plates, but it appears that the CMY printing plates were reused (or misused) from family member no. 1. Similarly for family member 3 and 4. (The CMY plates do not correspond with the expected pattern, whereas the black and green printing plates are aligned as expected.)

FIG. 23B provides another example of a verification icon or logo. Here again, it is illustrated with respect to four (4) family members but, of course, additional family member could be used along with additional orientations. In this example, a mismatch is identified if there is any "white" space (or other substrate color if the substrate is non-white) shown in the printed icon or logo. In the lower portion of FIG. 23B, the reuse or misuse of CYM printing plated from member no. 1 are used with the correct plates of member no. 2. White space is seen, and thus the print can be rejected or flagged for further analysis. For example, a printer pressperson can inspect the first (or subsequent) printed sheet(s) off a printing press to see if the logo or icon matches an expected result. The print run can be stopped if an icon or logo shows any white space, unexpected overprinting and/or disharmonious orientation(s) of the design elements.

FIG. 24 provides another example of an icon or logo. Shown are designs for families including 4-9 members. For the 4-member family, Cyan, Magenta, Yellow and Black are all uniquely assigned a printing location for each family member. For a first member, Cyan is printed as a bar above relative to the Magenta bar, which is above and right relative to the Yellow bar, which is right relative to Black. The locations of these bars can rotate for the other remaining family members. If a printing plate is used or reused incorrectly, a white area (or other substrate color) and/or overprinted area will appear in one or more of the color bar (or wedge) locations. Families 5-9 proceed similarly.

In different implementations, we permuted the order in which the colors appear (e.g., based upon the GTIN, package ID, or a smaller package disambiguation identifier). The icon in these cases may serve as a data carrier from which the package ID can be derived. Of course, more than 9 family members can be accommodated, e.g., by extending the radial colors, replacing the black area surrounding the circle (d). Even more permutation flexibility is gained in that design through repetition of the colors through the 18 or more slots, into which N colors may be repeated & permuted, where N is an integer. If the wedges are extended into the inner area of the (d), the inner ring of colors can be rotated or differently permuted relative to the rotation and order in the outer ring, as yet another way to generate uniqueness.

Additionally, fractionally adjusting the base rotation offset of the colors by up to one wedge (e.g., 0-19 degrees), based upon a combination of GTIN, number of marked plates, package ID, and/or cycle results in addition permutations. The resulting combination of color order permutation and rotation offset is very unlikely to be an exact match across plate-swap scenarios. Similarly, the offset from a nearby symbolic 1D or 2D code (e.g., measured in units of bar-widths, to eliminate scale as a factor) can provide a further axis of permutation.

The icon or logo(s) shown in FIGS. 23A, 23B and 24 can be machine-detectable and/or machine-evaluated. For example, and with reference to FIG. 26A, an icon or logo is printed near, adjacent to or aligned with a printed control strip. A spectrophotometer evaluates the icon or logo by scanning a spatial area associated within the icon or logo to obtain spectral information for the colors printed therein. A "spectrophotometer" may include a reflectance sensing device which measures the reflectance over many wavelengths and provides distinct electrical signals corresponding to the different levels of reflected light received from the respective different illumination wavelength ranges using multiple channels.

Spectrophotometers can measure just about anything, including liquids, plastics, paper, metal and fabrics, and help ensure that color remains consistent from conception to delivery. The spectral reflectance curve provided by a spectrophotometer is sometimes referred to as a color's "fingerprint." Techkon USA, with offices at 185 Centre St. Suite 101, Danvers, Mass. 01923, USA, currently provides a closed-loop press monitoring system using the tradename "PressLINK," which gives operators quality control feedback during a print run and can automatically adjust ink keys to keep press colors on target during the press run. The SpectroDRIVE scanning spectrophotometer is included within PressLINK and can scan color bars on a 40" press sheet. Current color values and trends are shown on a system display screen. Ink fountain adjustments can be calculated by software and sent to the press console. The console adjusts ink keys so that required density values are maintained for the entire press run. This enables a match to a reference sheet. The press interface hardware secures communication with the press console. The same interface enables prepress to press as well as spectrophotometer to press connectivity. The system can be operated, e.g., from touchscreen or keyboard.

Another closed-loop press monitoring system is provided by X-Rite Corp, with Offices at 4300 44th St. SE, Grand Rapids, Mich. 49512, USA. Its ERX130 Automated Inline Color Measurement unit can be placed on a printing press to scan control strips during a print run. This will deliver real-time warnings of any color shifts. Software can monitor the spectral reflectance information, and provide press updates or warnings, e.g., if press colors shift.

Other spectrophotometers, reflectance sensing devices, collecting color data and related color evaluation processes are described in detail in, e.g., U.S. Pat. Nos. 6,633,382, 8,332,176, 8,514,470, 9,068,932 and 9,194,746, and US Published Patent Application No. US 2006/0170996 A1, which are each hereby incorporated herein by reference in its entirety.

Returning to FIG. 26A, an icon or logo shows a correctly aligned pattern as suggested in FIG. 23B. That is, there is not a printing plate misuse or reuse problem. The word "(Pass)"

is used in FIG. 26A to indicate that it's the correctly printed pattern, but this word would not typically be printed on a substrate for, e.g., a package, label or tag. The spectral information corresponds to the colors in the FIGS. 26A/26B, which is a correct icon pattern and, notably, excludes spectral information associated with a substrate color, e.g., white in this example, and any other colors.

A spectrophotometer can be configured to scan multiple areas within an icon or logo. For example, in FIG. 26B, a spectrophotometer may scan multiple areas of a control strip (shown with horizontal dashed lines 1 and 2). The spectrophotometer may be configured to sample multiple areas within the icon or logo. In FIG. 26B, the icon or logo reflectance samples may correspond to Process Black, Process Cyan, Process Magenta, Process Yellow, Pantone 7739 C (dark green) and Pantone 368 C (light green), which are the colors in the FIG. 26B icon or logo. See also FIG. 26F. The analyzed colors are expected in this icon or logo design, so analysis would generate a "Pass." For example, the spectral information captured by a reflectance sensing device can be compared to expected colors for this logo. In the case of a printing plate misuse or reuse, e.g., FIGS. 26C and 26D, a spectrophotometer may generate spectral reflectance data corresponding to areas having non-expected colors. For example, and with reference to FIG. 26E (an expanded view of the FIGS. 26C and 26D icon or logo), spectrophotometer results may include white or a new color due to overprinting. Both these areas are shown within circles in FIG. 26E. The white area may correspond to, e.g., non-ink areas over a white substrate. Since white is not expected in the spectral information, a "Fail" can be generated by a controller to alert a press operator to the potential printing plate reuse or misuse. (Like the word "(Pass)" in FIGS. 26A/26B, the word "(Fail)" will not typically be printed with the verification logo or icon as shown in FIG. 26C/26D.)

Now consider FIG. 27A. This icon or logo intentionally includes white space in its design. Printing plate misuse or reuse can be detected by triangles having different orientations (see FIG. 27B). In this case, expected reflectance samples would correspond to White Substrate (e.g., C, U or M), Process Black, Process Cyan, Process Magenta, Process Yellow, Pantone 7739 C (dark green) and Pantone 368 C (light green). If any different colors are found within the spectral information, e.g., overprinted areas included within the circle in FIG. 27B, then a "Fail" can be generated by a controller.

A spectrophotometer can be configured to oversample a spatial area corresponding to an icon or logo. For example, if a spectrophotometer typically samples one (1) 0.1-3 mm area within each patch in a control strip, it can be configured to sample 2-15 such areas within a verification icon or logo. Moreover, a reflectance sensing device may generate scan-line data across a patch, image or icon. Such pixel-level information can be used to evaluate an icon. And, while only two scan paths are shown in FIGS. 26B and 26D (dashed lines 3 and 4), many more scan paths can be used for the verification logo (e.g., 3-12).

Figure 28:
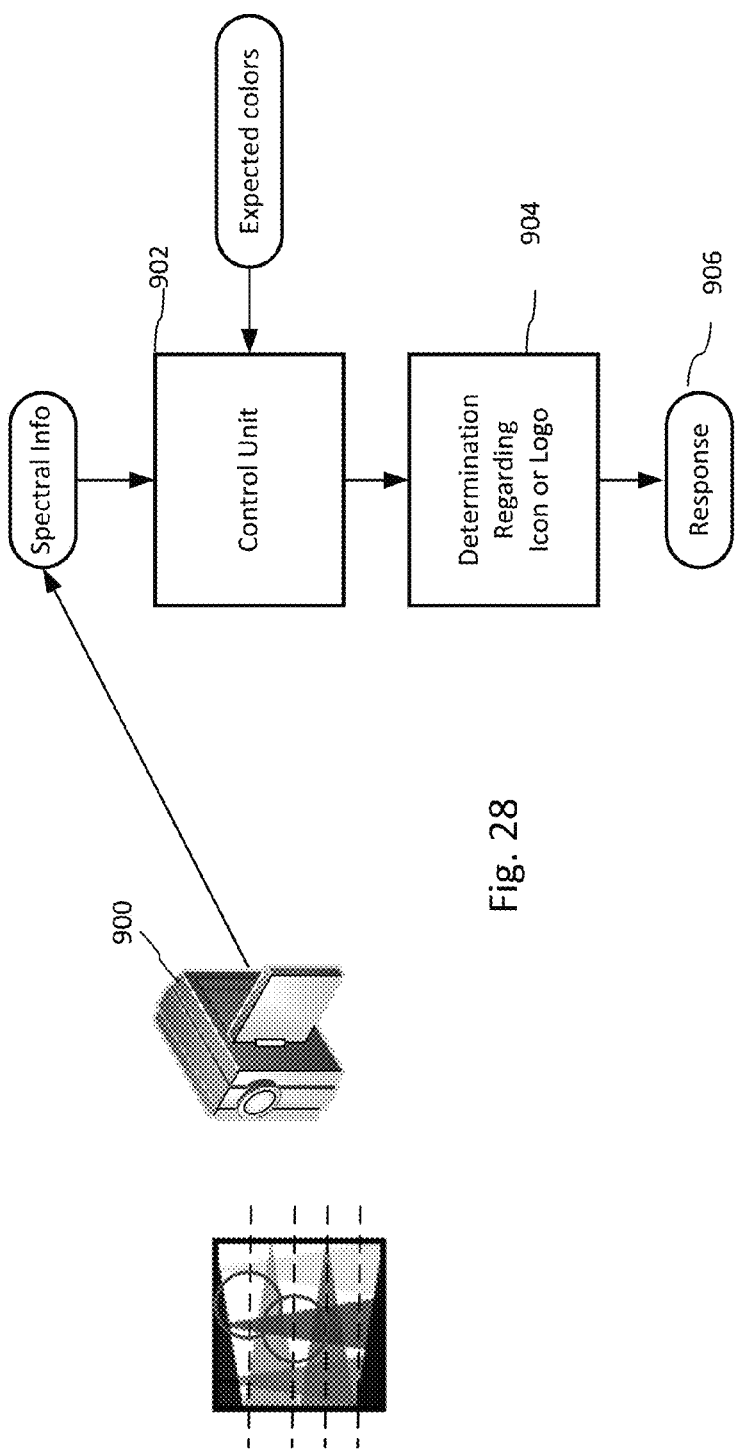
FIG. 28 is a system diagram showing analysis of a verification logo or icon.

An icon or logo evaluation process is described even further with reference to FIG. 28.

A spectrophotometer 900 captures spectral reflectance information corresponding to an icon or log. Suitable spectrophotometers include, e.g., Techkon USA's SpectroDRIVE and X-Rite's ERX130. Of course, other spectrophotometers and reflectance sensing devices can be substituted, e.g., as described in the aforementioned US Patents and Publications. Captured spectral reflectance information, and/or color information associated therewith, is provided to a control unit 902. Control unit 902 can be a control unit associated with a closed-loop press monitoring system, or with technology described with reference to FIG. 8. In another example, one or more multi-core processors are programmed to operate as a control unit. In still another example, an application specific integrated circuit (ASIC) operates as the control unit.

Figure 29:
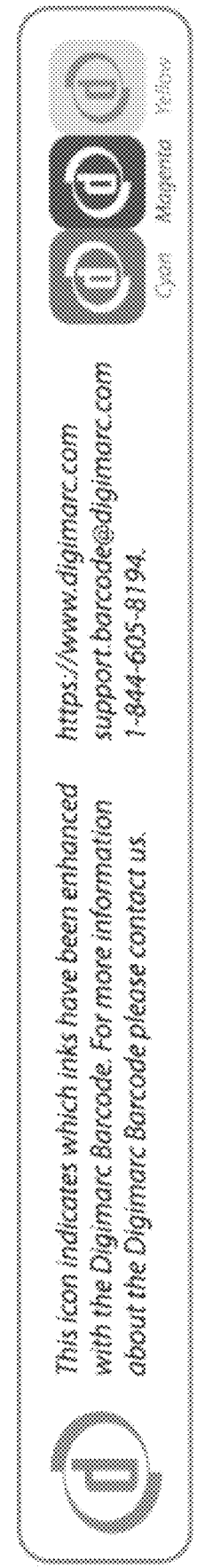
FIG. 29 is a graphic showing an example of an Enhancement Legend.

Control unit 902 also receives information pertaining to a design, e.g., including expected colors for a verification icon or logo. The expected color information can be obtained from a digital design file (e.g., stored local with respect to a printing press or remotely accessed over a network), can be entered by an operator, and/or can be obtained from spectral analysis of a printed control strip. For example, and with reference to FIG. 26A-26D, color patches corresponding to the expected colors may be printed in a control strip. The placement of expected color patches within the color strip does not matter as long as it can be determined which patches correspond to the expected colors of the icon or logo. For example, the expected color patches may be printed nearest to the icon or logo, and may be separated with spaces or bars to indicate to a control unit that the expected colors are next or within a certain spatial area or data sequence. In an alternative example, the icon or logo may be designed and printed to include all colors within a design; or may be designed and printed to include only those colors that are used to carry an encoded signal within the design. In this last example, and with reference to FIG. 29, an enhancement legend can be printed in the trim or other area of a package. The enhancement legend can identify all colors that are enhanced or modified to carry an encoded signal or encoded signal component. In still further cases, the encoded signal includes a plural-bit payload that carries or links to information associated with the expected colors.

Control unit 902 determines 904 whether the captured spectral reflectance information (captured by spectrophotometer 900) is correctly printed, e.g., detects plate misuse or reuse, and issues a response 906. As mentioned above, instead of a printing plate issue, a designer may have reused or misused a color layer in her design. This may result in an unexpected code mismatch. The determination 904 may include comparison or reference to the expected color information. If a captured, but unexpected, color (e.g., white or overprinted color) is obtained that does not match or otherwise coincide with the expected colors, a response 906 can be issued to indicate a problem (e.g., "Fail" or warning or stop command). Similarly, the response 906 can signal a correctly aligned icon or logo (e.g., "Pass" or green light, or if correct, no notification at all).

Moving to different embodiments, another plate-reuse or misuse detection feature is to use a screening pattern (e.g., stripes) whose angle, size, and/or shape changes based upon the GTIN and such, or to knock out a small number of thin concentric circles or expanding spirals from each wedge at radii or curvatures dependent upon the metadata (a printing plate swap would then be likely to have cuts at the wrong location).

Another implementation creates a hollow ring of colors (perhaps permuted or rotated in the same way), optionally altering the ring's thickness slightly according to the GTIN and other data.

A second embodiment utilizes an offsetting encoding technique. The encoding technique may include the technique described in assignee's U.S. Pat. Nos. 9,245,308 and 6,804,377, which are each hereby incorporated herein by reference. This second embodiment hides a human-readable message (e.g., instead of a machine-readable plural-bit payload) that remains imperceptible only when all of the correct printing plates are used.

With reference to FIG. 25A, the silhouette of the message (e.g., the text "FAIL") can be filled with a pseudo-random dot pattern whose seed is derived from, e.g., a GTIN encoded or carried elsewhere in the package. This dot pattern can be used to tweak CMY values in opposition to K values to maintain an offsetting luminosity and/or hue, resulting in an imperceptible message. This "FAIL" area can be printed in an area that will be trimmed prior to printing, or printed near a visual 1D or 2D barcode area. If any of the printing plates are incorrect swapped (thus introducing a dot pattern derived from another GTIN), the dot pattern of the swapped plate will fail to cancel the opposed tweaks, resulting in the message becoming visible.

In some implementations the message (e.g., the text 'FAIL') is used as a mask for pseudo-randomly generated binary noise, whose luminosity is then inverted to produce the positive and negative tweak templates. While the pseudo-random noise could be generated arbitrarily, it may be useful to use the GTIN as the pseudo-random seed, to help promote deterministic uniqueness across designs.

Given a portion of the package design that contains all of the process colors, or in an area dedicated such as an area that will be trimmed (e.g., like near a control strip), a positive tweak can be applied to the C, M, and Y channels with varying intensity (e.g., weighted differently across the color channels to achieve offsetting), and the negative tweak can be applied to the K channel. The ratio between the tweak intensities can be selected to minimize visual perceptibility, e.g., using a ΔE calculation.

FIG. 25B shows Package A and Package B, each of which has an encoded text message using a different pseudo-random dot pattern than the other. Below Package A and Package B are two digitally simulated examples in which the K plate (middle patch) and M plate (lowest patch) of the 'A' package have been replaced with those from Package B. The incorrect dot pattern from the B package, the human-readable message is now visible.

We are unaware of our visual offsetting encoding as a press verification technique. Moreover, so-called visual cryptography typically assumes that message information is distributed across multiple images (one or more of which might be held as a secret), with the images later being combined to extract the message. The above described techniques reverses this expectation in that the message is entirely contained in the original image, and it is the partial lack (or corruption) of the original message that reveals the human-readable message. Instead of a human readable message, a 1D or 2D barcode could be revealed.

Of course, in some print environments, printing plates are not perfectly aligned. To minimize the chance that plate misregistration will incorrectly reveal a message, we can apply a concept of digital watermarking 'bump size', in which in this implementation each 'bump' is a Gaussian (or other edge-continuous) profile. As a result slight misregistration would no longer produce large discontinuities in the perceived luminosity or hue. Of course, the above techniques can be applied to other sets of colors, including spot colors, by selecting a target color within the gamut of the inks and providing an offsetting color(s). While we prefer negative tweaks for black, as discussed above, an alternative uses positive tweaks for black and negative offsetting tweaks for the CMYK channels. The choice of whether to apply a positive or negative tweak to the K channel (or any other channel) may depending on the availability of ink in that channel (e.g., ensuring that sufficient ink is available to support the tweak without significant perceptibility effects).

Recall the discussion above regarding product design families. Some aspects of this disclosure provide method, systems and articles to help identify and prevent printing plate misuse and/or unwanted reuse. For example, a package or label printed with a common Cyan plate (including a 1st encoded signal) and a unique family plate (e.g., including a 2nd encoded signal) will have at least two conflicting codes printed thereon (1st and 2nd encoded signals). The same result could happen if a graphics designer uses a common color layer across a digital design file, and a unique family color layer for different family members. This may result in a color layer misuse or unwanted reuse.

FIGS. 31A-31C illustrate an alternative set of verification logos or icons to help identify such printing plate or design layer unwanted reuse and/or misuse.

FIG. 31A illustrates two family versions of the same verification logo or icon (also called "control icon"), one control icon version for a first product family member (left) and one control icon version for a second product family member (right). The control icon itself includes a plurality of elements, including a central shape (e.g., circle), a version indicator (e.g., dot, and gap in central shape), alpha-numerical digit (e.g., "1" or "2" or "A" or "b", etc.) and registration indicators (e.g., 4 dashes). The alpha-numerical digit may also be associated with an orientation guide (e.g., underline mark) to help maintain an orientation clue.

In the illustrated example, the dot, gap, circle and registration dashes rotate counterclockwise n degrees for each unique package family member, where n is an integer. Thus, each product family member has a unique orientation design relative to a base (e.g., first) orientation design. For example, a family of products including, e.g., 20 family members, can rotate 18 degrees between each successive family member. In the case of, e.g., 60 family members, each control icon can rotate 6 degrees (as illustrated) between each successive family member. Family members 1-6 for a 60 member family are shown in FIG. 31B. The alpha-numerical digit (and orientation guide) preferably maintains the same orientation from family member to family member.

The control icons in FIG. 31A can be printed with a plurality of colors, e.g., printed with Cyan (C), Magenta (M), Yellow (Y) and Black (K) plates. For example, each plate is prints at a 100% ink value. The resulting combination will be a dark black color, e.g., as shown in FIG. 31A. The plates are preferably spatially aligned, so that the inks cooperate to yield a black graphic. But in cases where the printing plates are mis-aligned, the control icon may also serve as a printing plate registration mark. A prior art registration mark is shown in FIG. 32 where CMYK inks are printed at 100%. The left mark shows a case where the printing plates are in spatial registration, resulting in a crisp dark black graphic. If one or more printing plates are misaligned, as is the case shown in the right mark in FIG. 32, then one or more individual inks are visible. In the illustrated example, all four (4) printing plates are mis-registered or out of spatial alignment relative to one another. The FIGS. 31A and 31B control icons will similarly show one or more CMYK inks if one or more of the corresponding printing plates are misaligned relative to one another.

A printing plate registration check is a great secondary benefit of the FIGS. 31A and 31B control icons. The primary benefit, however, is that our illustrated control icons help reveal that a wrong or unintended printing plate (or design element) is being used altogether, regardless of plate registration or mis-registration. FIG. 31C illustrates cases where there is printing plate (or design element) reuse or misuse. The left control icon shows a case where MYK printing plates are from the same family member no. 1, but the Cyan plate is from a different family member no. 2. The right control icon in FIG. 31C shows a case where the black printing plate is from family member no. 1, but the CMY plates are from family no. 2. There are visual clues that printing plates from different family member have been combined on press, e.g., showing mismatched plates or separations via an unregistered control icon revealing different rotations. For example, there are two (2) different version indicators (dots and gaps) and two different alphanumerical digits (both "1" and "2") clearly visible in each of the control icons. This is not the case when all plates correspond to the same family member, e.g., as shown in FIG. 31A (left or right). Additionally, the registration indicators (dashes) are misaligned in FIG. 31C.

Figure 30:
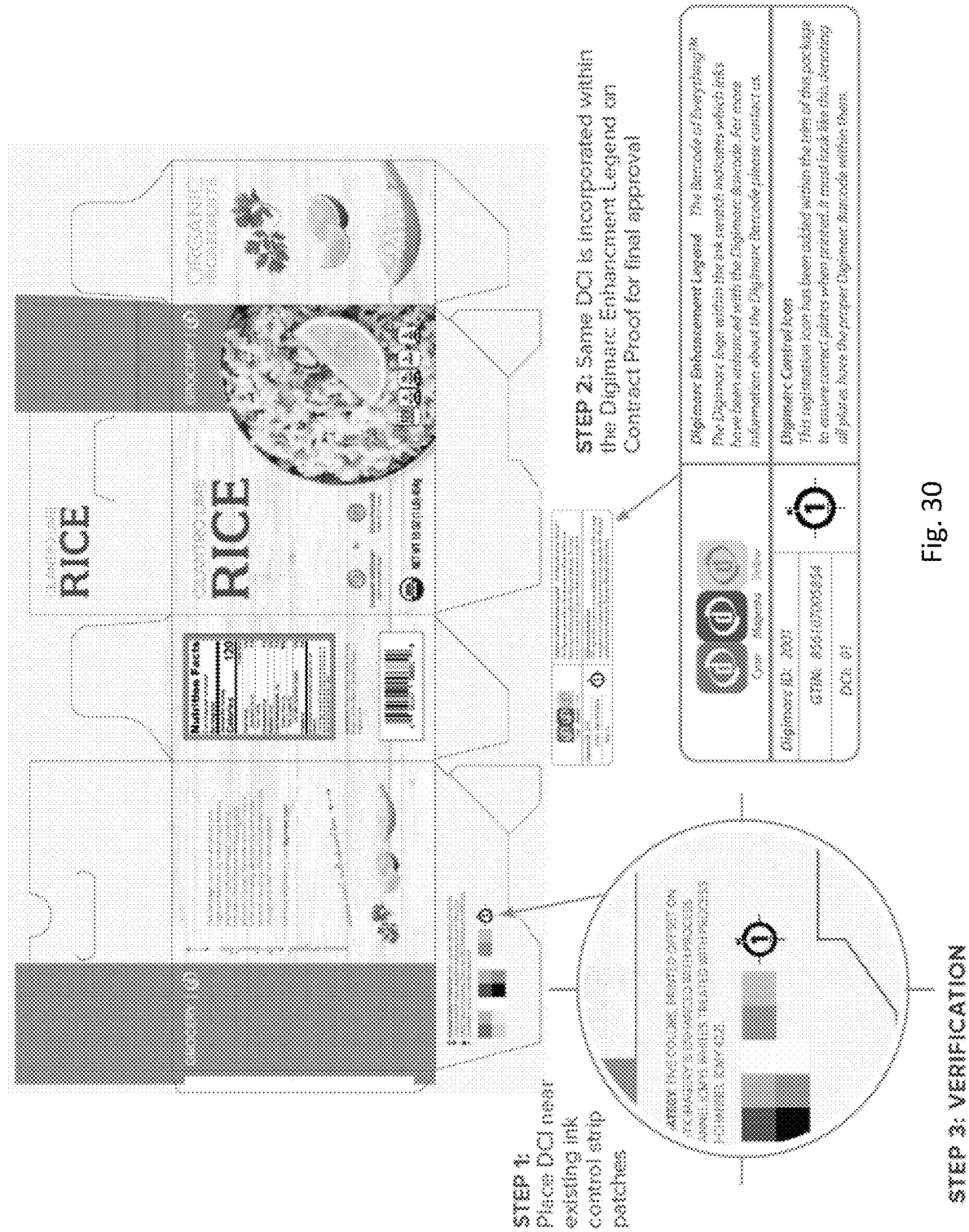
FIG. 30 is a graphic showing a package design including a control icon.

With reference to FIG. 30, a control icon (or "DCI" in the figure) can be aligned with an ink control strip (STEP 1). The DCI can be sized, e.g., to approximate the size of a traditional registration mark. For example, the DCI can be sized at 0.36"×0.36" or 0.25"×0.25" (or within a size range of 0.15" to 1.0"). The control strip and DCI are preferably printed in a trim area or in a package fold area. The same DCI can be incorporated within a contract proof for final client or customer approval (STEP 2). After printing, the DCI can be evaluated to ensure proper plate use, and/or to detect any unwanted plate reuse or misuse (STEP 3). The DCI within the package trim or fold area should match the DCI within the contract proof.

Verification may also involve image processing analysis of a control icon. For example, optical image data or spectral data corresponding to a printed control icon is obtained. The image data is analyzed to find expected features, e.g., the central shape (e.g., circle). A curve-fitting function can be used to identify the circle relative to an expected circle (size). See Coope, I.D. (1993), "Circle fitting by linear and nonlinear least squares," Journal of Optimization Theory and Applications, 76 (2): 381, which is hereby incorporated herein by reference. Once the central shape is found and resized, if needed, the process can search for smaller circles around the perimeter of the central object. If more than one (1) smaller circles are found near the perimeter, then a printing plate misuse or reuse is signaled.

Another approach identifies the central shape, e.g., using a curve-fitting function. Then, a character recognition machine is deployed to identify digits within the central shape. If more than one (1) digit is recognized, then a printing plate misuse or reuse is signaled.

Color or spectral analysis can also be used to identify a plate misuse or reuse. For example, a spectrometer can analyze lines of data across the control icon. If more than one (1) color is detected in the spatial area corresponding to the control icon, then there is, at a minimum, a plate mis-registration. Further inspection may reveal a plate misuse or reuse.

As a practical manner, any alpha-numeric number and corresponding version indicator can be assigned (e.g., randomly) for a first family member within a product family. Then, as other family members are identified, different numbers within the family set (e.g., a set of 60 family members) can be selected (e.g., randomly) for the other family member package designs.

While we have discussed specific color separations, shapes, line-segments, orientations, etc. for the illustrated FIG. 31A-31C control icons, other designs are contemplated. For example, the central shape may include an ellipse, triangle, rectangle or other shape, with the version indicator including a filled or non-filled dot, or other shapes such as an ellipse, triangle or rectangle, with a gap in the central shape. The registration indicators may also be positioned other than at 90 degrees, and may also include more than 4 line-segments (e.g., dashes). Additionally, the control icon may comprise a plurality of different colors including spot colors, and is not limited to CMYK colors. Many possible color combinations include, e.g., Spot 1, Spot 2, and K; or Spot 1, C, M, Y and K; or Spot 1 and/or Spot 2, C, M, Y and/or K, etc.

Figure 33:
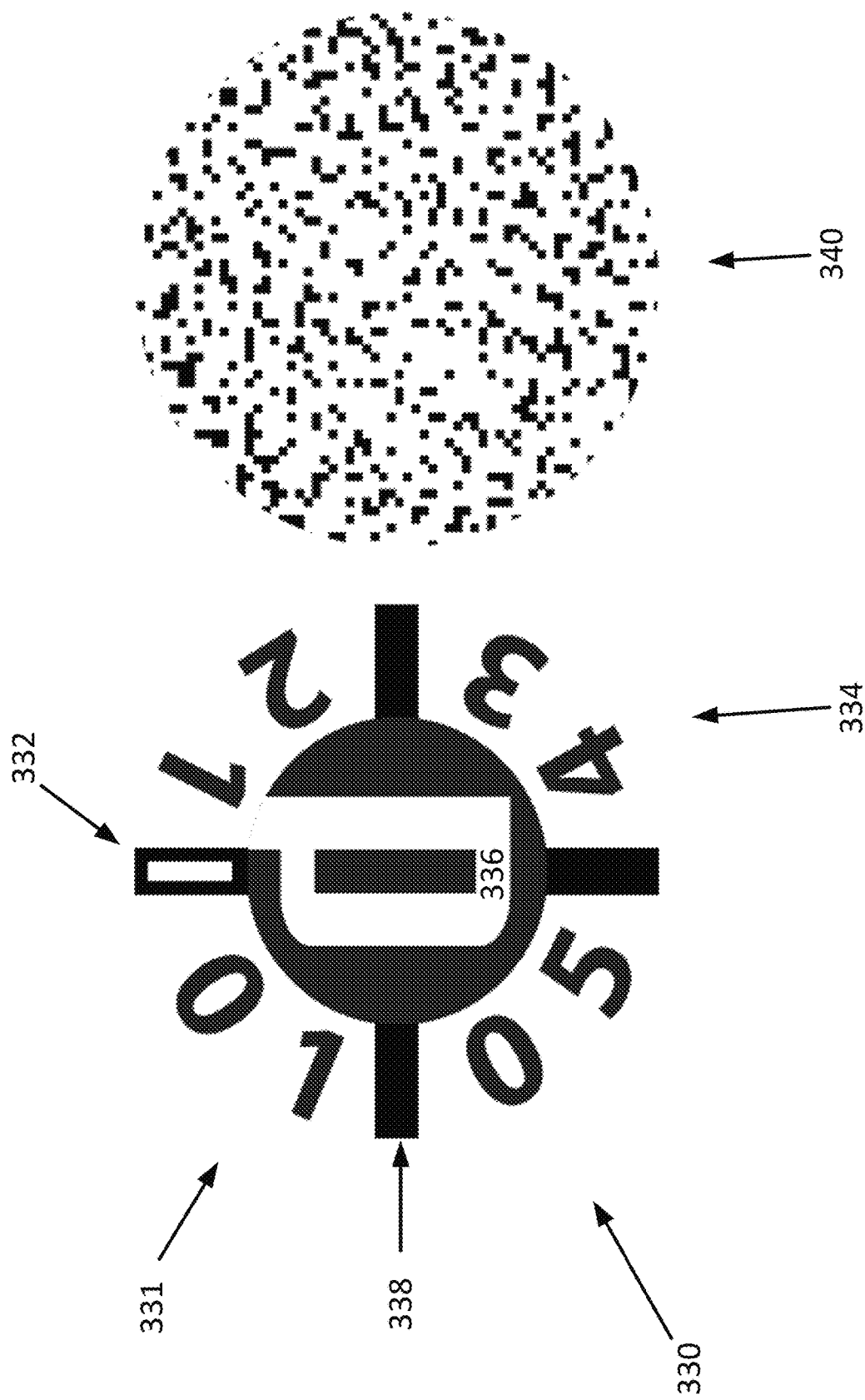
FIG. 33 is another control icon, including an identifier.

FIG. 33 illustrates yet another control icon 330 useful in identifying printing plate misuse or reuse. Control icon 330 includes a rotation indicator 331 (e.g., "01"), a separation structure (e.g., a cutout) 332, a product, design or package identifier 334 (e.g., "123450"), an orientation structure 336 and a plurality of registration indicators 338 (e.g., dashes or line segments). Separation structure 332 may serve as both separation structure and as a registration indicator. If 60 rotation angles are assigned to a product family, then the rotation indicator may vary from 01-60 depending on the number of family members. This rotation indicator can be randomly assigned (e.g., between 01-60) for a first family member, and randomly assigned for subsequent family members from remaining numbers 01-60. The separation structure 332 helps providing a starting clue or registration for the identifier 334. For example, the identifier 334 may follow the separation structure 332 clockwise around the orientation structure 336. Groups (e.g., pairs, triplets, etc.) of digits within the identifier 332 (and rotation indicator 331) may be separated by registration indicators 338. Orientation structure 336 (e.g., a lower case "d" or, optionally, an alpha-numeric digit matching the rotation indicator) helps to establish a base registration for the control icon. It preferably does not rotate regardless of family member rotation indicator 331.

With reference to FIGS. 34A and 34B, rotation indicator (e.g., "02" in FIG. 34B, and "01" in FIG. 34A), a separation structure, identifier 334 (e.g., "123460" in FIG. 34B, and "123450" in FIG. 34A), and registration indicators rotate between family members. As illustrated for a 60 family member set, package 123460 rotates clockwise 6 degrees relative to package 123450. If only 20 family members, the rotation would be 18 degrees. Of course, while we have illustrated a clockwise rotation, a control icon could be configured to rotate counter-clockwise as well.

FIG. 34A shows a package or design example having all printing plates matching rotation indicator and identifier. That is, all plates (e.g., CMYK and/or spot color(s)) have the same rotation indicator ("01") and identifier ("123450"). The control icon is crisp and dark black. FIG. 34B shows just a Cyan (C) plate from another package or design example, this one having a rotation indicator of ("02") and an identifier of "123460"). If one or more printing plates (or design layers) were reused, or otherwise are not associated with an intended family member, control icon 330 will have some design elements that are not congruent with other design elements. For example, and with reference to FIG. 34C, the black plate or separation from FIG. 34A is combined with the Cyan plate or separation from FIG. 34B. The result is an unwanted misuse or reuse. The result could be that two (2) or more GTINS are included in the product packaging, label or design, which may result in double charging or an inventory mishap.

FIG. 34C shows an orientation inconsistency due to using a plate or separation with rotation indicator 01 and a plate or separation with a rotation indicator 02. The Cyan structures are printed +6 degrees clockwise relative to the black structures. The rotation indicators themselves ("01" and "02") are inconsistent, providing yet another clue. And, the identifiers mismatch as well (1234 5 0 vs 1234 6 0). These inconsistencies provide clues, and a print or design containing such can be flagged as having potential problems. In practice, FIG. 34C illustrates the hardest rotation indicators to decipher results. For example, if the rotation indicators were 01 and 04, the spacing would be 24 degrees, and the difference in the spatial location of the black separation indicator and the Cyan separation indicator would be readily apparent, as shown in FIG. 34D. Additionally, if the FIG. 34C case included printing plate mis-registration, then one would expect to see Cyan inside the orientation structure (lower case "d" in FIG. 34), but that is not the case here.

Returning to FIG. 33, control icon 330 may include or be associated with a machine-readable code 340. The machine-readable code may include a raw (e.g., no attempt to hide in host content or adapt its elements to a human visual system has been made) encoded signal associated with each printing plate or color separation. If all plates match, e.g., as in the case of FIG. 34A, then the combined patterns from the color separations will yield a single composite machine-readable code. Only one product family member payload (e.g., a GTIN) will be recoverable from the single composite machine-readable code. If there is a printing plate or color separation mismatch, e.g., as is the case in FIG. 34C, then multiple machine-readable codes are contained within code 340. For example, these multiple machine-readable codes may carry multiple payload (e.g., with multiple GTIN).

A verifier tool such as discussed above with reference to FIGS. 19A-21B can be utilized to detect the multiple different codes. This can be carried out during the design stage, contract proof and prior to, during and/or after a print run.

As discussed above with reference to FIG. 30, control icon 330 may be placed adjacent to an ink control strip, and may be sized, e.g., with a side size range of 0.15"-1.0", but it is preferably sized 0.25"×0.25".

The image processing analysis described above with respect to control icons shown FIGS. 30-31C can be used to detect a mismatch of plates or color separations with the control icons shown in FIGS. 33-34C.

A variation of control icon 330 is shown in FIGS. 35-37B, with reference to control icon 430. FIG. 35 shows control icon 430, which includes a rotation indicator 431 (e.g., "01"), a product, design or package identifier 434 (e.g., "12345"), a central element including an orientation structure 436 (e.g., circular shape with a brand or other indictor "d"), a plurality of registration indicators 438 (e.g., dashes or line segments) and a separation structure (e.g., a cutout) 432. Separation structure 432 may serve as both separation structure and as a registration indicator, and in this variation. If 60 rotation angles are assigned to a product family, then the rotation indicator 431 may vary from 01-60 depending on the number of family members. This rotation indicator can be randomly assigned (e.g., between 01-60, or 01-20, or 01-90, etc.) for each product. The separation structure 432 helps providing a starting clue or registration for the identifier 434. For example, the identifier 434 may follow the separation structure 432 clockwise around the orientation structure 436. Groups (e.g., pairs, triplets, etc.) of digits within the identifier 432 (and rotation indicator 431) may be separated by registration indicators 338. The orientation structure 436 (e.g., a lower case "d" or, optionally, an alpha-numeric digit matching the rotation indicator) within the central shape helps to establish a base registration for the control icon. Rotation indicator 431, along with orientation structure 436, preferably do not rotate regardless of rotation assignment. Control icon can be variously sized, e.g., from 0.15"×.15" to 1"×1", etc. Currently, we prefer a 0.25"×0.25" size which corresponds well with a color patch in a control strip. See FIG. 37. Of course, the size can be varied according to control strip sizing, etc.

Figure 36A:
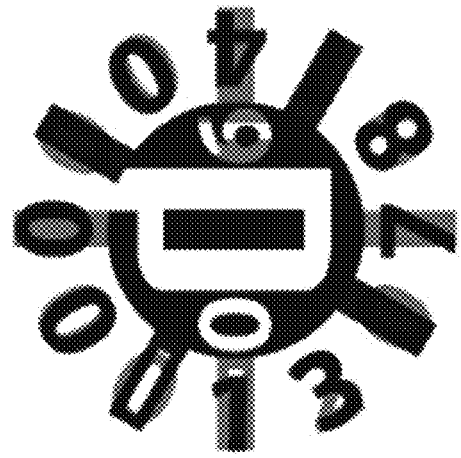
FIGS. 36A and 36B show different versions of the FIG. 35 control icon, and FIG. 36C show the control icon with a printing plate or color separation mismatch.
Figure 36B:
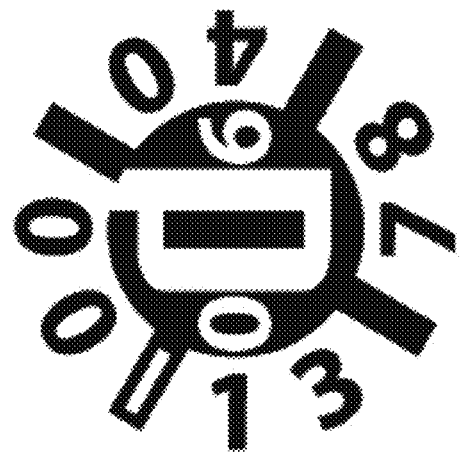
Figure 36C:
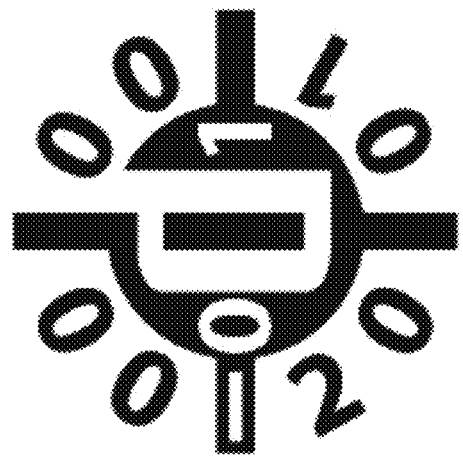

Effects of correct and mismatched printing plates are shown in FIGS. 36A-C. FIG. 36A shows a control icon 430 with an assigned rotation indicator of "01", and an identifier of "2001". The control icon is carried in each of cyan, magenta, yellow and black printing plates, and since the plates correctly match for this item, when printed the control icon is spatially aligned across the four (4) color separations and, thus, appears in registration. FIG. 36B shows a control icon 430 with an assigned rotation indicator of "06", and an identifier of "13784". Note that elements of the FIG. 36B control icon are rotated 36 degrees clockwise relative to the FIG. 36A control icon. This is because the FIG. 36B control icon is assigned rotation indicator 06, and with 60 rotation states, each rotation is separated by 6 degrees (6×6=36 degrees). The rotation indicators (dashes or line segments), the separation structure (cutout), and the identifier are all rotated clockwise by 36 degrees. As discussed above relative to FIG. 35, rotation indicator ("06"), along with orientation structure (circular shape with a "d"), do not rotate relative to the base rotation, "01". The control icon is carried in each of cyan, magenta, yellow and black printing plates, and since the plates correctly match for this item, when printed the control icon is spatially aligned across the four (4) color separations and, thus, appears in registration.

FIG. 36C shows benefits of the inventive control icon, including signaling a mismatch between two or more of the printing plates. In the illustrated example, cyan, yellow and black printing plates correspond to identifier "13784." But, a magenta plate with identifier "2001" is used instead of the correct "13784" plate. Consider the consequences if a package were printed as such. If a first encoded signal is carried in the cyan, yellow and/or black printing plates, and a second encoded signal is carried in the magenta printing plate, then a package, label or tag printed with these four printing plates could have multiple different codes, e.g., each carrying a different GTIN or other identifier. A customer could be inadvertently charged twice for a single item, and an inventory system could be erroneously affected. Returning to FIG. 36C, the icon includes a 01 rotation and a 06 rotation, which vary 36 degrees from one another. The rotation differences provide a visual que when mis-matched plates are combined.

A spectrophotometer can used to evaluate control icon 430. For example, scanline data can be obtained across, in or through an area corresponding to control icon 430. An alarm or signal can be generated if a color(s) other than black and white (or other substrate color) is detected within the control icon area.

While we have discussed specific color separations, shapes, line-segments, orientations, etc. for the illustrated FIG. 33-36C control icons, other designs are contemplated. For example, the central shape may include an ellipse, triangle, rectangle or other shape, with the rotation indicator including different placement, or other shapes such as an ellipse, triangle or rectangle, with a gap in the central shape. The registration indicators may also be positioned other than at 90 degrees, and may also include more or less than 4 line-segments. Additionally, the control icon may comprise a plurality of different colors including spot colors, and is not limited to CMYK colors. Many possible color combinations include, e.g., Spot 1, Spot 2, and/or K; or Spot 1, C, M, Y and/or K; or Spot 1 and/or Spot 2, C, M, Y and/or K, etc.

While not illustrated in FIG. 35, control icon 430 may include or be associated with a machine-readable code 340. The machine-readable code may include a raw (e.g., no attempt to hide in host content or adapt its elements to a human visual system has been made) encoded signal associated with each printing plate or color separation. In other implementation, the machine-readable code is provided as a background tint, e.g., with a cyan sparse mark, or with a 4% Cyan, 2% Yellow, 2% Magenta. If all printing plates match, e.g., as in the case of FIG. 36A, then the combined patterns from the color separations will yield a single composite machine-readable code. Only one product family member payload (e.g., a GTIN) will be recoverable from the single composite machine-readable code. If there is a printing plate or color separation mismatch, e.g., as is the case in FIG. 36C, then multiple machine-readable codes are contained within machine-readable code. For example, these multiple machine-readable codes may carry multiple payload (e.g., with multiple GTIN). A verifier tool such as discussed above with reference to FIGS. 19A-21B can be utilized to detect the multiple different codes. This can be carried out during the design stage, contract proof and prior to, during and/or after a print run.

Yet another control icon is shown with respect to FIGS. 38-42. This control icon includes a central shape (e.g., circle or ellipse or triangle or square), and inwardly (or outwardly in non-illustrated embodiments) facing registration indicators, and a rotation indicator (alternatively called an "orientation slice"). The rotation indicator preferably includes a shaded, hashed, speckled or otherwise ink filled region, e.g., shaped as a pizza slice, triangle or other shape. In alternative embodiments, the rotation indicator is void of ink except for an outline of its shape. The rotation indicator preferably includes or corresponds to a number or digit (e.g., a check digit), e.g., associated with a barcode carrying, e.g., a GTIN-12 or GTIN-14. The check digit for a GTIN is a form of redundancy check used for error detection for product identification. For example, in FIG. 38, a corresponding GTIN includes the check digit "4" (arrow points to the check digit "4"). This check digit is correlated with a rotation indicator for a corresponding control icon. FIG. 39 shows various and possible rotation indicators or orientation slices 0-9. The illustrated FIG. 38 check digit corresponds to the $4^{th}$ rotation, so it is selected as the rotation indicator (or orientation slice) for this package, label or hang tag's control icon. If the check digit was another number 0-9, then a correlated rotation indicator would be selected instead of the $4^{th}$ rotation.

Correct and mismatched printing plates (or mismatched color separations) are shown in FIGS. 40A-C. FIG. 40A shows a control icon with an assigned rotation indicator of "4", which corresponds to a GTIN check bit of "4". The control icon is carried in each of cyan, magenta, yellow and black printing plates, and since the plates correctly match for this item, when printed the control icon is spatially aligned across the four (4) color separations and, thus, appears in registration and only the $4^{th}$ rotation indicator is present. FIG. 40B shows a control icon with an assigned rotation indicator of "8", which corresponds to a GTIN check bit of "8". The control icon is carried in each of cyan, magenta, yellow and black printing plates, and since the plates correctly match for this item, when printed the control icon is spatially aligned across the four (4) color separations and, thus, appears in registration and only the 8th rotation indicator is seen.

FIG. 40C shows benefits of the inventive control icon, including signaling a mismatch between two or more of the printing plates/color separations. In the illustrated example, cyan, yellow and black printing plates correspond to $4^{th}$ rotation indicator (and to a check bit of "4"). But, a magenta plate with an $8^{th}$ registration indicator (corresponding to a GTIN with a check digit of "8") is used instead of the correct magenta printing plate. Consider the consequences if a package were printed as such. If a first encoded signal is carried in the cyan, yellow and/or black printing plates, and a second encoded signal is carried in the magenta printing plate, then a package, label or tag printed with these four printing plates could have multiple different codes, e.g., resulting in multiple, different GTINs or other identifiers. A customer could be inadvertently charged twice for a single item, and an inventory system could be erroneously affected. Returning to FIG. 40C, the icon includes both a $4^{th}$ rotation indicator and an $8^{th}$ rotation indicator. The presence of two (2) or more visible rotation indicators is a clue or signal that mismatched printing plates or color separations have been used for a print. The rotation indicator differences provide a visual clue when mis-matched plates or color separations are combined.

Figure 41:
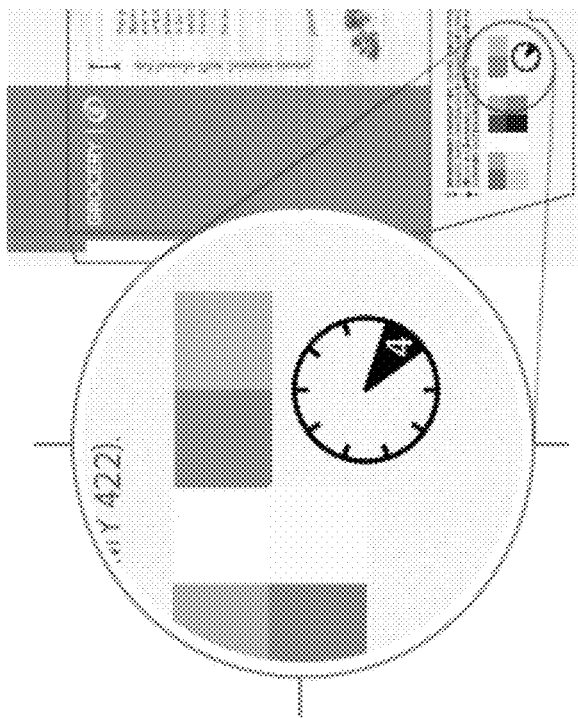
FIG. 41 is a graphic showing a portion of a package design including a control icon relative to a control strip.
Figure 37:
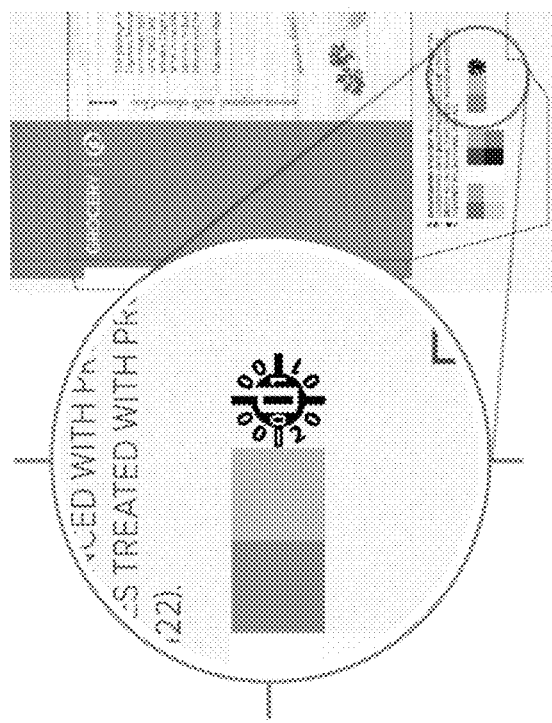
FIG. 37 is a graphic showing a portion of a package design including a control icon relative to a control strip.

The control icon can be sized for placement adjacent to a control strip, e.g., as shown in FIG. 41 or other trim or fold area. The control icon can be variously sized, e.g., 0.15"× .15" to 1.0"×1.0". The illustrated control icon in FIG. 38 was originally sized at ⅜"×⅜". A legend can accompany a proof sheet as shown in FIG. 42, which announces an expected rotation indicator. Of course, instead of tying a control icon component to a check digit, other digits or combination of digits can be used. However, using a check digit provide another check to ensure that the right printing plates have been used.

A spectrophotometer can be used to evaluate a control icon. For example, scanline data can be obtained across, in or through an area corresponding to a control icon. An alarm or signal can be generated if a color(s) other than black and white (or other substrate color) is detected within the control icon area. A machine-readable check can also be made of the 1-D barcode (e.g., read by a barcode reader to obtain the check digit) and of the control icon (e.g., imaged data can be OCR'ed). The check bit number can be matched to the rotation indicator number. An alert can be issued if the numbers do not match, or if multiple numbers are found within the expected control icon area.

We can optionally layer an encoded signal on, around or in the FIGS. 38-42 control icons. For example, the spatial area covered by the control icon can be layered with a CMY(K) tint, e.g., like a 4% Cyan, 2% Yellow, 2% Magenta, based encoded signal. Other suitable signaling techniques are described in assignee's, e.g., U.S. Pat. Nos. 9,754,341, 9,380,186, 9,245,308, 6,614,914 and US 2017-0024840 A1, which are each hereby incorporated herein by reference in its entirety.

In another embodiment, an encoded signal is layered on top of or within the central element of the FIGS. 38-42, e.g., using line modifications or displacements as discussed in assignee's U.S. Pat. No. 9,718,296, which is hereby incorporated herein by reference. The encoded signal can be evaluated to determine, e.g., if the packaging has been tampered with, copied or otherwise reproduced. For example, a correlation or signal strength metric can be generated from a detected encoded signal and compared with a threshold or predetermined value. Suitable correlation and strength metrics are described in the above section, and in, e.g., in assignee's U.S. Pat. No. 9,690,967, which is hereby incorporated herein by reference in its entirety. In this another embodiment, the control icon is preferably placed outside of the trim or fold areas. That is, it become a feature visible on a package, tag, or label.

Another technology to detect tampering or copying of a control icon includes a curve-fitting technique to determine how "out of true" the central element (e.g., circle) is. If the central element is too far out of true (e.g., as compared to a predetermined threshold), then a signal can be generated to alert an inspector or operator. Curve fitting can also be used to determine a displacement of a true center of the circle, compared to what it should be (e.g., a shift of centroid). These techniques can be used to determine authenticity of the packaging as a whole, and not necessarily just for the control icon. In this sense, a control icon may serve dual roles of printing plate misuse detection and product authentication.

We note that a control icon with properly matched plates might not appear black, e.g., depending on the colors used in a design. For example, a two-color design, one cyan and one a light spot color, may appear as a light Cyan. The dark black crispness discussed above (e.g., with reference to FIG. 33, FIG. 35 and/or FIG. 38) is for a design having CMYK plates. Of course, our control icons will work with many different combinations of colors, including spot colors and other process colors.

In addition to others, some possible combinations include:

A1. A method of detecting printing plate misuse, on a printing press having a plurality of printing plates configured to carry an encoded signal, said method comprising:

obtaining a verification icon comprising a plurality of design elements, with a first design element carried in a Cyan (C) color channel, a second design element carried in Magenta (M) color channel, a third design element carried in a Yellow (Y) color channel and a forth design element carried in a Black (K) color channel, the first design element, second design element, third design element and forth design element, cooperating when printing to produce the verification icon;

obtaining Cyan, Magenta, Yellow and Black printing plates;

using the printing plates, printing the verification icon on a substrate to yield a printed verification icon;

and evaluating the printed verification icon to determine if an orientation of the first design element, second design element, third design element and forth design element comprise a predetermined orientation arrangement, in which a deviation from the predetermined orientation arrangement indicates a printing plate misuse or reuse.

A2. The method of A1 in which the predetermined orientation arrangement comprises the same orientation for each of the first design element, second design element, third design element and forth design element.

A3. The method of A1 in which a deviation from the predetermined orientation and a detection of substrate color within the printed verification logo indicates a printing plate inconsistency.

B1. A method comprising:

providing a verification icon, the verification icon comprising a plurality of design elements, with a first design element carried in a Cyan (C) color channel, a second design element carried in Magenta (M) color channel, a third design element carried in a Yellow (Y) color channel and a forth design element carried in a Black (K) color channel, the first design element, second design element, third design element and forth design element contributing to the verification icon;

assigning a first orientation of the verification icon to a first product family member;

assigning a second orientation of the verification icon to a second product family member;

assigning a third orientation of the verification icon to a third product family member;

assigning a forth orientation of the verification icon to a forth product family member;

from a verification icon printed on a white substrate, determining a printing plate misuse or reuse based on an orientation of at least one of the first design element, second design element, third design element or forth design element.

B2. The method of B1 in which said determining a printing plate misuse or reuse determines based on the orientation and on a detection of white space on the substrate within the verification icon.

C1. A method of determining a printing plate inconsistency comprising:

generating a pseudo-random noise pattern;

representing the pseudo-random noise pattern in a first set of color channels through modifying data representing the first set of color channels, in which the modifying introduces a first modification polarity in each color channel of the first set of color channels, representing the pseudo-random noise pattern in a black color channel through modifying data representing the black color channel, in which the modifying introduces a second modification polarity in the black color channel that is inversely related to the polarity of the first modification polarity, spatially aligning the pseudo-random noise pattern in the first set of color channels and the pseudo-random noise pattern in a black color channel such that luminance or chrominance attributable to the pseudo-random noise pattern in the first set of color channels offsets or reduces luminance or chrominance attributable to the pseudo-random noise pattern in a black color channel, in which the spatial aligning in is the form of text or a 1D or 2D symbology.

C2. The method of C1 in which the form of the text or 1D or 2D symbology is printed on a substrate, and in which a printing plate inconsistency is determined when the text or 1D or 2D symbology is observable to a human observer under daylight conditions, positioned between 4-18 inches from the form.

D1. A method of monitoring a spectral difference between a substrate and one or more colors, the one or more colors configured to carry an encoded signal, said method comprising:

determining a minimum ink value and a maximum ink value of an encoded signal carrier;

determining a spectral reflectance difference at or around 660 nm between: i) the substrate without any ink and the minimum ink value, and ii) the substrate without any ink and the maximum ink value;

based on the difference of i and ii, determining a tolerance range;

printing the minimum ink value and the maximum ink value in a control strip area;

measuring the spectral reflectance of the substrate, the printed minimum ink and the printed maximum ink to yield measurements, and using the measurements to determine whether the printing press is maintaining printing within the determining tolerance range.

D2. The method of claim D1 in which the encoded signal comprises digital watermarking.

E1. An image processing method for detecting printing plates or print design layers inconsistency, said method comprising:

obtaining spectral reflectance data corresponding to a printed verification logo, the spectral reflectance data captured with a spectrophotometer, in which the verification logo is printed on a substrate having a first color, and in which the verification logo comprises a plurality of design elements, with a first design element carried in a second color channel, a second design element carried in a third color channel, a third design element carried in a fourth color channel, the first design element, second design element and third design element contributing to the verification logo, and in which the substrate comprises an encoded signal printed thereon, the encoded signal comprising a plural-bit payload;

obtaining expected colors associated with the verification logo;

determining how the spectral reflectance data corresponds to the expected colors, said determining yielding a determination;

based on the determination, generating a response associated with the printing plates or print design layers.

E2. The image processing method of E1 in which the spectrophotometer comprises a component of a closed-loop press monitoring system.

E3. The image processing method of E1 in which the expected colors are obtained from spectral reflectance data associated with a control strip printed on the substrate.

E4. The image processing method of E1 in which said determining determines that the spectral reflectance data corresponds to the first color, and the determination indicates printing plates or print design layers inconsistency.

E5. The image processing method of E1 in which the spectral reflectance data corresponds with an overprint of the first design element and the second design element or the third design element, and the determination indicates printing plates or print design layers inconsistency E6. The image processing method of E4, in which the response comprises a signal indicating the printing plates or print design layers inconsistency.

E7. The image processing method of E5, in which the response comprises a signal indicating the printing plates or print design layers inconsistency.

E8. The image processing method of E1 in which the plural-bit payload comprises data associated with the expected colors.

E9. The image processing method of E1 in which the spectral reflectance data corresponding to the printed verification logo comprise data corresponding to a plurality of samples.

E10. The image processing method of E9 in which the plurality of samples comprise scanline data.

E11. The image processing method of E9 in which said determining considers spectral reflectance data associated with each of the plurality of samples.

F1. A method of detecting printing plate misuse, on a printing press having a plurality of printing plates configured to carry an encoded signal, said method comprising:

obtaining a design comprising a plurality of design elements, the plurality of design elements comprising a central shape, a version indicator, an alpha-numerical digit, and registration indicators, the design being provided in a Cyan (C) color channel, a Magenta (M) color channel, a Yellow (Y) color channel and a Black (K) color channel, in which when the CMYK color channels are combined, the designs spatially align to form a control icon to detect printing plate misuse;

obtaining Cyan, Magenta, Yellow and Black printing plates;

using the printing plates, printing the designs on a substrate to yield a printed control icon;

evaluating the printed control icon to determine if the printed control icon comprises more than one (1) observable version indicator or more than one (1) observable alpha-numerical digit, said evaluating yielding a determination; and identifying a printing plate misuse based on the determination.

F2. The method of F1 in which the central shape comprises a circle, and the version indicator comprises a dot and a gap in the circle.

F3. The method of F2 in which the registration indicators comprises a plurality of line segments.

F4. The method of F3 in which design comprises an orientation guide, and the orientation guide is positioned relative to the alpha-numerical digit.

F5. The method of F4 in which the orientation guide comprises an underline below the alpha-numerical digit.

F6. The method of F1 in which the determination indicates that more than one (1) observable version indicator is present within the control icon.

F7. The method of F1 in which the determination indicates that more than one (1) observable alpha-numerical digit is present within the control icon.

G1. A method of detecting a printing plate inconsistency, said method comprising:

obtaining a substrate including a control icon printed thereon, the control icon comprises a design printed in each of a Cyan (C) color channel, a Magenta (M) color channel, a Yellow (Y) color channel and a Black (K) color channel, the design comprising a plurality of design elements, the plurality of design elements comprising a central shape, a rotation indicator, an alpha-numerical digit, and registration indicators, in which the design is spatially registered across the CMYK color channels to form the control icon when printed;

evaluating the control icon to determine if the printed control icon comprises more than one (1) observable rotation indicator or more than one (1) observable alpha-numerical digit, said evaluating yielding a determination; and identifying a printing plate misuse based on the determination.

H1. A method of detecting a printing plate mismatch, said method comprising:

obtaining a substrate including a control icon printed thereon, the control icon comprises a design printed in each of at least a first color channel, a second color channel, and a third color channel, in which each of the first color channel, second color channel and third color channel comprise a machine-readable encoded signal carried therein, the design comprising a plurality of design elements, the plurality of design elements comprising a rotation indicator, a separation structure, a product or package identifier, a central shape including an orientation structure, and a plurality of registration indicators, in which the design is spatially registered across the first color channel, second color channel and third color channels to form the control icon when printed;

evaluating the control icon to determine if the printed control icon comprises more than one (1) observable rotation, or more than one (1) observable separation structure, said evaluating yielding a determination; and identifying a printing plate mismatch based on the determination.

H2. The method of H1 in which the rotation indicator comprises numerical digits between 01 and 60, and the separation structure comprises a cutout structure, and the orientation structure comprises an alpha-numeric digit, and the plurality of registration indicators comprises dashes or line segments, in which a the rotation indicator is positioned within the central shape and a first numerical digit of the rotation indicator is positioned on a first side of the orientation structure and a second numerical digit of the rotation indicator is position on a second side of the orientation structure.

H3. The method of H1 in which the more than (1) observable rotation comprises at least two rotations separated from one another by at least 6 degrees.

H4. The method of H1 in which the determination identifies more than one (1) observable rotation by determining a color other than black or white is present within the control icon.

H5. The method of H4 in which the determination indicates that more than one (1) observable rotation indicator is present within the control icon.

H6. The method of H4 in which the determination indicates that more than one (1) observable separation structure is present within the control icon.

H7. The method of H4 in which the color other than black or white is determined through spectrophotometer data analysis.

H8. The method of H1 in which the determination identifies more than one (1) observable rotation indicator based on image analysis of the control icon, the image analysis indicator a mis-registration with the separation structure or with the plurality of registration indicators.

I1. A substrate for a retail package, hang tag or label, the substrate comprising:

an ink control strip printed in a trim area or fold area;

a control icon printed within or adjacent to the ink control strip, the control icon comprising a design printed with each of four (4) ink separations, the design comprising a plurality of design elements, the plurality of design elements comprising a central shape including an orientation indicator, a rotation indicator, registration indicators, a separation indicator, and an alpha-numeric identifier, the four (4) ink separations comprising a Cyan (C) color channel, a Magenta (M) color channel, a Yellow (Y) color channel and a Black (K) color channel;

a machine-readable encoded signal carried by at least the Cyan (C) color channel;

in which the control icon indicates a printing plate mismatch when it comprises more than one (1) observable rotation indicator, or more than one (1) observable separation structure.

I2. The substrate of I1 in which the central shape comprises a circle, and the rotation indicator comprises alpha-numerical digits.

I3. The substrate of I2 in which the registration indicators comprises a plurality of line segments.

I4. The substrate of I1 in which the control icon comprises more than one (1) observable rotation indicator.

I5. The substrate of I4 in which the more than one (1) observable rotation indicator is observable since the control icon comprises an observable color other than black or white.

I6. The substrate of I4 in which the more than one (1) observable rotation indicator is observable since the control icon comprises a mis-registration in two or more color channels for the separation structure or for the plurality of registration indicators.

I7. The substrate of I4 in which the more than one (1) observable rotation indicator is observable since the control icon comprises a mis-registration in two or more color channels alpha-numeric identifier.

I8. The substrate of I1 in which the machine-readable encoded signal is carried by at least the CMY color channels.

I9. The substrate of I7 in which the machine-readable encoded signal is carried by the K color channel.

I10. The substrate of I8 in which the machine-readable encoded signal comprises digital watermarking.

I11. The substrate of I1 in which the machine-readable encoded signal comprises digital watermarking.

I12. The method of I1 in which the machine-readable encoded signal comprises digital watermarking.

VI. Operating Environments

The components and operations of the various described embodiments can be implemented in modules. Notwithstanding any specific discussion of the embodiments set forth herein, the term "module" may refer to software, firmware and/or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. One such implementation is electronic circuitry that has been custom-designed and manufactured to perform some or all of the component acts, as an application specific integrated circuit (ASIC).

To realize such an implementation, some or all of the technology is first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes barcode and/or encoded signal detection operating on a specifically configured smartphone (e.g., iPhone 6 or Android device) or other mobile device, such phone or device. The smartphone or mobile device may be configured and controlled by software (e.g., an App or operating system) resident on the smartphone device. The resident software may include, e.g., a barcode decoder, digital watermark detector and detectability measure generator module.

Figure 8:
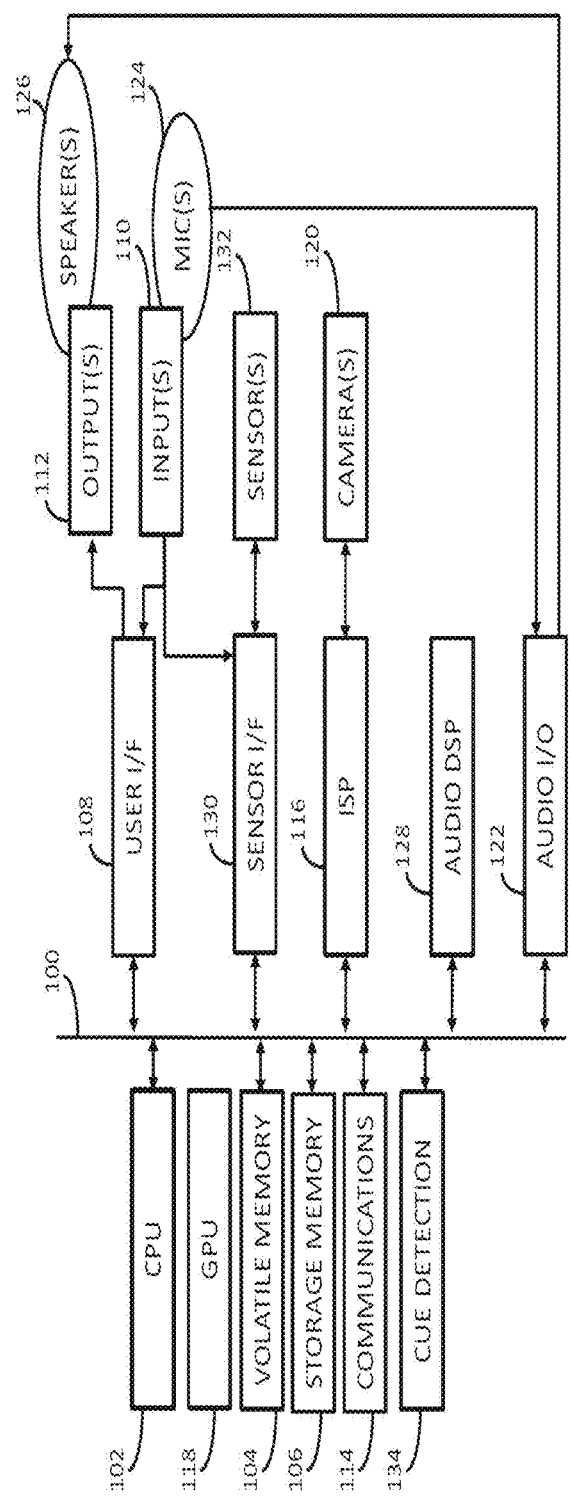
FIG. 8 is a diagram of an electronic device (e.g., a smartphone, mobile device, tablet, laptop or other electronic device).

For the sake of further illustration, FIG. 8 is a diagram of an electronic device (e.g., a smartphone, mobile device, tablet, laptop, or other electronic device) in which the components of the above encoder, decoder, and various Module embodiments may be implemented. It is not intended to be limiting, as the embodiments may be implemented in other device architectures or electronic circuitry.

Referring to FIG. 8, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 8 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A8 or A7. The A8 is built on a 64-bit architecture, includes a motion co-processor and is manufactured on a 20 nm process. The CPU 102 runs an operating system of the electronic device, runs application programs (e.g., mobile apps such as those available through application distribution platforms such as the Apple App Store, Google Play, etc., or custom designed to include watermark detection and object authentication) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. Watermark detection capabilities can be integrated into the operating system itself.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, an illumination source such as a flash or torch, a buzzer, a haptic actuator, a loud speaker, or the like or any combination thereof. In the case of an iPhone 6, the flash includes a True Tone flash including a dual-color or dual-temperature flash that has each color firing at varying intensities based on a scene to make sure colors and skin tone stay true.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's indigo press. An encoded object may include, e.g., a consumer packaged product, a label, a sticker, a logo, a driver's license, a passport or other identification document, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker. GPU 118 may also be configured to serve one or more functions of a watermark detector. In some cases GPU 118 searches for a watermark orientation component, while payload resolution is performed by the CPU 102.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensor(s) 132. Sensor 132 can, for example, include an accelerometer (e.g., for sensing acceleration, orientation, vibration, etc.), a magnetometer (e.g., for sensing the direction of a magnetic field), a gyroscope (e.g., for tracking rotation, orientation, or twist), a barometer (e.g., for sensing air pressure, from which relative elevation can be determined), a wind meter, a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 8, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, including all drawings, including all color drawings, and appendices, even if cited above in connection with specific of their teachings. These documents disclose technologies and teachings that can be incorporated into the arrangements detailed, and into which the technologies and teachings detailed herein can be incorporated.

The particular combinations of elements and features in the above-detailed embodiments are exemplary only; the interchanging and substitution of these teachings with other teachings in this and the incorporated-by-reference patents are also contemplated.

Many combinations will be evident from the above disclosure.

What is claimed is:

1. A substrate for a retail package, hang tag or label, the substrate comprising:
    a barcode including a check digit;
    a printed control icon, the printed control icon comprising
        a design printed with each of four (4) ink separations, the design comprising a plurality of design elements, the plurality of design elements comprising a central element, a first rotation indicator corresponding to the check digit, and a plurality of registration indicators, the four (4) ink separations comprising a Cyan (C) color channel, a Magenta (M) color channel, a Yellow (Y) color channel and a Black (K) color channel; and
    in which the printed control icon indicates a printing plate mismatch when it comprises the first rotation indicator and a second rotation indication, and in which authenticity of the substrate can be determined based on a displacement from a predetermined center of the central element or a printing plate mismatch can be determined based on the central element.

2. The substrate of claim 1 in which the central element comprises the first rotation indicator and the second rotation indicator, and in which the first rotation indicator comprises a numeric representation of the check digit, and in which the first rotation indicator is positioned at a rotation associated with the check digit.

3. The substrate of claim 2 in which the plurality of registration indicators comprises a plurality of line segments or hashes.

4. The substrate of claim 1 in which the printed control icon comprises the first rotation indicator and the second rotation indicator.

5. The substrate of claim 4 in which the second rotation indicator is observable since the printed control icon comprises an observable color other than black.

6. The substrate of claim 4 in which the second rotation indicator is observable since the printed control icon comprises a mis-match in two or more color channels.

7. The substrate of claim 4 in which the second rotation indicator is observable since the printed control icon comprises a mis-registration in two or more color channels for a numeric representation of the check digit.

8. The substrate of claim 1, in which the central element comprises a machine-readable encoded signal carried by at least the Cyan (C) color channel or the Black (K) color channel, the machine-readable encoded signal carried through line modifications to the central element.

9. The substrate of claim 8 in which the machine-readable encoded signal comprises digital watermarking.

10. A method of authenticating the substrate of claim 1 comprising:
obtaining image data corresponding to the printed control icon, in which the central element comprises a centroid; and
determining if the substrate is authentic through determining a centroid displacement from a predetermined center of the central element.

11. The substrate of claim 1, further comprising: an ink control strip printed in a trim area or fold area, in which the printed control icon is printed within or adjacent to the ink control strip.

12. An apparatus for evaluating a substrate, said apparatus comprising:
a spectrophotometer for obtaining data corresponding to the substrate, the substrate including a control icon printed thereon, the control icon comprising a design printed in each of at least a first color channel, a second color channel, and a third color channel, the design comprising a plurality of design elements, the plurality of design elements comprising a central element, a first rotation indicator, and a plurality of registration indicators, in which the first rotation indicator includes an orientation associated with a Global Trade Item Number (GTIN), and in which the design is spatially registered across the first color channel, second color channel and third color channels to form the control icon printed on the substrate;
one or more electronic processors configured for:
evaluating the data corresponding to the substrate to determine if the control icon comprises the first rotation indicator and a second rotation indicator, said evaluating yielding a determination based on detection of a color other than black within the control icon; and
identifying a printing plate mismatch based on the determination, in which authenticity of the substrate can be determined based on a displacement from a predetermined center of the central element or a printing plate mismatch identification can be determined based on the central element.

13. A method of printing a substrate for a retail package, hang tag or label, said method comprising:
printing a barcode including a check digit on the substrate;
printing a printed control icon on the substrate, the printed control icon comprising a design printed with each of four (4) inks, the design comprising a plurality of design elements, the plurality of design elements comprising a central element, a first rotation indicator corresponding to the check digit, and plurality of registration indicators, the four (4) inks comprising a Cyan (C) ink, a Magenta (M) ink, a Yellow (Y) ink and a Black (K) ink;
in which the printed control icon indicates a printing plate mismatch when it comprises the first rotation indicator and a second rotation indicator, and in which authenticity of the substrate can be determined based on a displacement from a predetermined center of the central element or a printing plate mismatch can be determined based on the central element.

14. The method of claim 13 in which the central element comprises a circle, and the first rotation indicator and the second rotation indicator, in which the first rotation indicator comprises a numeric representation of the check digit, in which the first rotation indicator is positioned at a rotation associated with the check digit.

15. The method of claim 14 in which the plurality of registration indicators comprises a plurality of line segments or hashes.

16. The method of claim 13 in which the printed control icon comprises the first rotation indicator and the second rotation indicator.

17. The substrate of claim 16 in which the second rotation indicator is observable since the printed control icon comprises an observable color other than black.

18. The method of claim 16 in which the second rotation indicator is observable since said printing a printed control icon on the substrate comprises printing with mis-registration between color plates for two or more inks.

19. The method of claim 16 in which the second rotation indicator is observable since said printing a printed control icon on the substrate comprises printing with mis-registration between color plates for inks printing a numeric representation of the check digit.

20. The method of claim 13, in which the central element comprises a machine-readable encoded signal carried by at least the Cyan (C) color channel or the Black (K) color channel, the machine-readable encoded signal carried through line modifications to the central element.

21. The method of claim 20 in which the machine-readable encoded signal comprises digital watermarking.

* * * * *